(12) United States Patent
Park et al.

(10) Patent No.: US 8,582,513 B2
(45) Date of Patent: Nov. 12, 2013

(54) APPARATUS AND METHOD FOR CONTROLLING INTER-CELL INTERFERENCE

(75) Inventors: Soon-gi Park, Daejeon-si (KR); Yeon-seung Shin, Daejeon-si (KR); Hyung-sub Kim, Seoul (KR); Yeong-jin Kim, Daejeon-si (KR); In-tae Hwang, Gwangju-si (KR); Gil-sang Yoon, Jeollanam-do (KR); Jeong-hwan Lee, Gwangju-si (KR)

(73) Assignees: Electronics and Telecommunications Research Institute, Daejeon-si (KR); Industry Foundation of Chonnam National University, Gwangju-si (KR)

( * ) Notice: Subject to any disclaimer, the term of this patent is extended or adjusted under 35 U.S.C. 154(b) by 645 days.

(21) Appl. No.: 12/636,102

(22) Filed: Dec. 11, 2009

(65) Prior Publication Data

US 2010/0151876 A1    Jun. 17, 2010

(30) Foreign Application Priority Data

Dec. 12, 2008    (KR) .................. 10-2008-0126823
May 14, 2009    (KR) .................. 10-2009-0042225

(51) Int. Cl.
*H04W 4/00* (2009.01)
*H04W 72/00* (2009.01)

(52) U.S. Cl.
USPC ........................................... 370/329

(58) Field of Classification Search
None
See application file for complete search history.

(56) References Cited

U.S. PATENT DOCUMENTS

| 7,792,088 B2 | 9/2010 | Ahn et al. |
| 8,068,785 B2 | 11/2011 | Ahn et al. |
| 2005/0096062 A1 | 5/2005 | Ji et al. |
| 2005/0272433 A1 | 12/2005 | Won et al. |
| 2006/0094363 A1 | 5/2006 | Kang et al. |
| 2008/0009244 A1 | 1/2008 | Lee |
| 2008/0130582 A1 | 6/2008 | Lee et al. |
| 2009/0047971 A1* | 2/2009 | Fu .................................. 455/450 |
| 2009/0245197 A1* | 10/2009 | Ma et al. ....................... 370/330 |
| 2011/0136496 A1* | 6/2011 | Klang et al. ............... 455/452.1 |

FOREIGN PATENT DOCUMENTS

| KR | 1020050048261 | 5/2005 |
| KR | 10-2005-0116011 | 12/2005 |
| KR | 1020060037572 | 5/2006 |
| KR | 1020060096091 | 9/2006 |
| KR | 1020070027468 | 3/2007 |
| KR | 10-2007-0121947 | 12/2007 |
| KR | 10-0883915 | 2/2009 |
| WO | WO 2007/029965 A1 * | 3/2007 |

* cited by examiner

*Primary Examiner* — Chirag Shah
*Assistant Examiner* — Srinivasa Reddivalam
(74) *Attorney, Agent, or Firm* — Nelson Mullins Riley & Scarborough LLP

(57) ABSTRACT

A technology for inter-cell interference control is provided. In one general aspect, the inter-cell interference may be controlled by resource allocation scheduling or power management. A cell may be divided into a plurality of regions. A constant available resource band and a selectively available band are allocated to each region. Each of the allocated resource bands is assigned with an interference characteristic. The resource allocation scheduling and the power management are performed according to the resources allocated to the respective regions and the interference characteristics assigned to the respective resources.

15 Claims, 40 Drawing Sheets

FIG.13

| PRB | 1/0/1 (node/sector/cell) | 2/0/2 (node/sector/cell) | 3/0/3 (node/sector/cell) |
|---|---|---|---|
| 0 | O | O | O |
| 1 | O | O | O |
| 2 | O | O | O |
| 3 | × | O | × |
| 4 | × | O | × |
| 5 | × | O | O |
| 6 | × | × | O |
| 7 | × | × | O |
| 8 | O | × | O |
| 9 | O | × | × |
| 10 | O | × | × |
| 11 | O | O | × |

FIG.20

| PRB | 1/0/1<br>(node/sector/cell) | 2/0/2<br>(node/sector/cell) | 3/0/3<br>(node/sector/cell) |
|---|---|---|---|
| 0 | × | × | × |
| 1 | × | × | × |
| 2 | × | × | × |
| 3 | × | O | × |
| 4 | × | O | O |
| 5 | × | O | O |
| 6 | × | × | O |
| 7 | O | × | O |
| 8 | O | × | O |
| 9 | O | × | × |
| 10 | O | O | × |
| 11 | O | O | × |

FIG.24

| PRB | 1/0/1 (node/sector/cell) | 2/0/2 (node/sector/cell) | 3/0/3 (node/sector/cell) |
|---|---|---|---|
| 0 | × | O | × |
| 1 | × | O | × |
| 2 | × | O | O |
| 3 | × | O | O |
| 4 | × | × | O |
| 5 | × | × | O |
| 6 | O | × | O |
| 7 | O | × | O |
| 8 | O | × | × |
| 9 | O | × | × |
| 10 | O | O | × |
| 11 | O | O | × |
| 12 | O | | |
| 13 | O | | |
| 14 | O | | |
| 15 | O | | |

FIG.26

| PRB | 1/0/1 (node/sector/cell) | 2/0/2 (node/sector/cell) | 3/0/3 (node/sector/cell) |
|---|---|---|---|
| 0 | × | O | × |
| 1 | × | O | × |
| 2 | × | O | O |
| 3 | × | O | O |
| 4 | × | × | O |
| 5 | × | × | O |
| 6 | O | × | O |
| 7 | O | × | O |
| 8 | O | × | × |
| 9 | O | × | × |
| 10 | O | O | × |
| 11 | O | O | × |
| 12 | O | O | |
| 13 | O | O | |
| 14 | O | | |
| 15 | O | | |

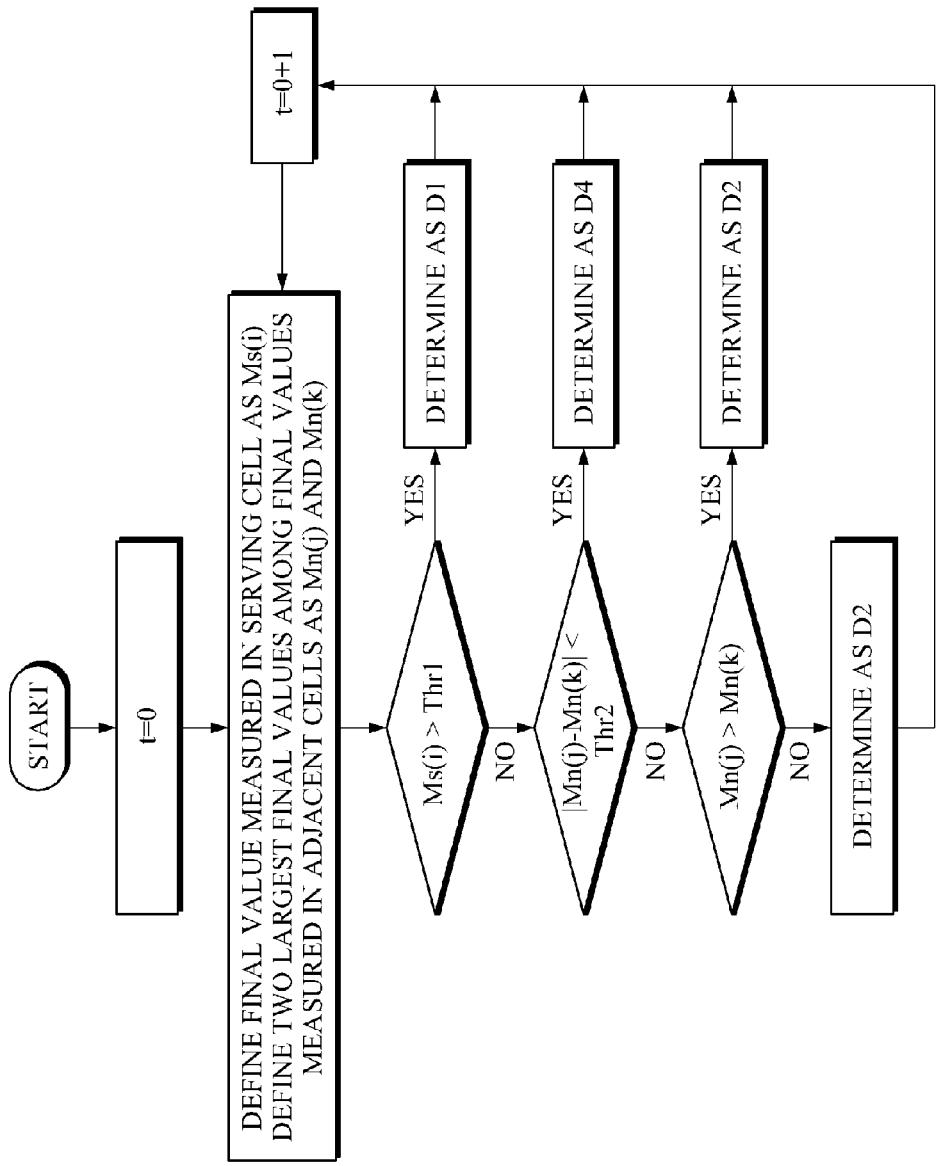

APPARATUS AND METHOD FOR CONTROLLING INTER-CELL INTERFERENCE

CROSS REFERENCE TO RELATED APPLICATION

This application claims the benefit under 35 U.S.C. §119 (a) of Korean Patent Application Nos. 10-2008-0126823, filed on Dec. 12, 2008, and 10-2009-0042225, filed on May 14, 2009, the disclosures of which are incorporated herein by reference for all purposes.

BACKGROUND

1. Field

The following description relates to a mobile communication technology, and more particularly, to a technology for mitigating the inter-cell interference.

2. Description of the Related Art

Recently, technologies for $4^{th}$ generation (4G) mobile communications have been actively studied. Especially, technologies regarding an expansion of transmission bandwidth, an advanced multi-antenna, improvement of uplink capacity, and mitigation of inter-cell interference have been researched. In $4^{th}$ generation mobile communications, the importance of inter-cell interference mitigation is increasing in terms of supporting a microcell for high frequency, a femtocell located in a building or a private area and providing a given user with a high transmission rate and a wireless relay to be located on a border region of cells to increase base station coverage area.

Various types of cells having small service areas cause increase of overlapping cell regions which are significantly affected by inter-cell interference, and thus a technique for controlling the inter-cell interference becomes prerequisite for improving data rate of a system.

A soft frequency reuse (SFR) technique is for increasing data transmission rate of a user equipment (UE) that is located on the border of a cell and considerably interfered by an adjacent cell. SFR technique is generalized from a fractional frequency reuse (FFR) technique, and in which each adjacent cell sets transmission powers for individual sub-bands differently from one another so that data transmission rate of the UE located on the border of the cell thus being significantly interfered by the adjacent cell can be increased.

Additionally, if a frequency reuse index of 1 is used, all cells use the same frequency and hence inter-cell interference becomes greater, while frequencies can be used to the maximum and consequently the system efficiency is increased. On the other hand, when the frequency reuse index is raised, the inter-cell interference is reduced but wastage of frequency resources is increased.

SUMMARY

The following description relates to an apparatus and method for controlling inter-cell interference, which suppress or control the inter-cell interference on the basis of a complemented a fractional frequency reuse (FFR) technique.

In one general aspect, there is provided an inter-cell interference control apparatus and method dividing a cell into a plurality of regions. The regions of the cell may be divided into a central region and peripheral regions, and the peripheral regions may be divided into regions which are adjacent to other cells and regions which are not adjacent to other cells.

In another general aspect, there is provided an inter-cell interference control apparatus an method determining a resource to be allocated to each of divided regions. If a resource is defined as a unit of a logical physical resource block, it is possible to allocate particular physical resource blocks may be allocated to each region. The allocated physical resource blocks may include constantly available physical resource blocks and selectively available physical resource blocks.

In yet another general aspect, there is provided an inter-cell interference control apparatus and method determining interference characteristics for respective resources in each region. When a plurality of physical resource blocks are allocated to a particular region, different interference characteristics may be assigned to the respective physical resource blocks according to the probability of occurrence of interference and probability of avoidance of interference.

In another general aspect, there is provided an inter-cell interference control apparatus and method performing resource allocation scheduling in consideration of a resource allocated to each region and an interference characteristic assigned to each resource. When a particular region is allocated with a plurality of physical resource blocks and the respective physical resources are assigned different interference characteristics according to the probability of occurrence of interference and probability of avoidance of interference, a physical resource block with a lower probability of occurrence of interference may be first allocated.

In another general aspect, there is provided an inter-cell interference control apparatus and method managing power control in consideration of a resource allocated to each region and an interference characteristic assigned to each resource. When a particular region is allocated with a plurality of physical resource blocks and the respective physical resources are assigned different interference characteristics according to the probability of occurrence of interference and probability of avoidance of interference, the maximum power may be set to higher for a physical resource block with a lower probability of occurrence of interference.

In another general aspect, there is provided an inter-cell interference control apparatus and method defining some of resources individually for particular purposes with various schemes and allocating the individually defined resources to each region in various manners.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 13 is a table showing resource information according to an exemplary embodiment.

FIG. 20 is a table showing resource information according to an exemplary embodiment.

FIG. 24 is a table showing resource information according to an exemplary embodiment.

FIG. 26 is a table showing resource information according to an exemplary embodiment.

FIG. 40 is a flowchart illustrating a method of detecting a location of a UE according to an exemplary embodiment.

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
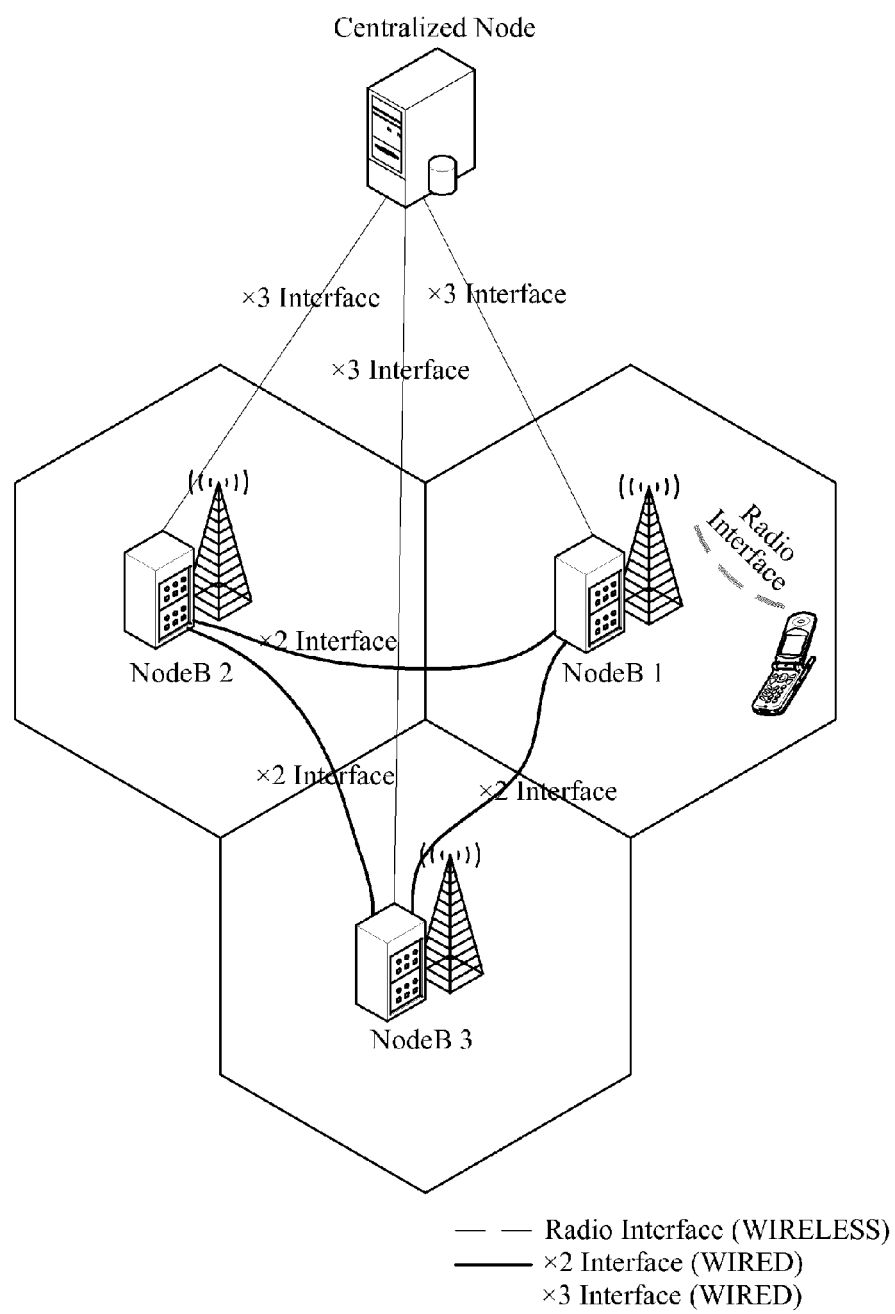
FIG. 1 illustrates a communication framework according to an exemplary embodiment.

FIG. 1 illustrates a communication framework according to an exemplary embodiment. Referring to FIG. 1, the communication framework includes a plurality of NodeBs and a central node. The central node manages the plurality of NodeBs, and each NodeB forms a cell allowing a user equipment (UE) to access the NodeB wirelessly.

In FIG. 1, resource management on the communication framework may be carried out in each NodeB, or in the central node. For example, in case of long term evolution (LTE), there is no central node, and thus resources may be managed in a distributed manner through cross-interfaces between NobeBs. Alternatively, in case of IMT-Advanced, a centralized resource management is conducted by use of a central node.

In FIG. 1, a radio interface (RI) indicates an interface between the UE and the NodeB, an X2 interface indicates an interface between the NodeBs, and an X3 interface indicates an interface between the central node and the NodeB.

In one exemplary embodiment, the central node, the NodeB, and the UE are possible to communicate messages for controlling inter-cell interference through the RI, the X2 interface, and the X3 interface, and also possible to adjust and avoid the inter-cell interference proactive or reactive based on the relevant messages.

There may be four types of messages for controlling the inter-cell interference as described below.

A message of type 1 is formed of (SBi, EBi) or (Sector_i_ID, SBi, EBi) when ICIC_FBS properties of corresponding cells are predetermined.

A message of type 2 is formed of (Ui, SBi, EBi) or (Ui, Sector_i_ID, SBi, EBi) when ICI_FBS properties of corresponding cells are not predetermined.

A message of type 3 is formed of {(U1, SB1, EB1), (U2, SB2, EB2)} or {(U1, Sector_1_ID, SB1, EB1), (U2, Sector_2_ID, SB2, EB2)} when ICIC_FBS properties of corresponding cells are different from one another.

A message of type 4 is formed of {U, (SB1, EB1), (SB2, EB2)} or {U, (Sector_1_D1, SB1, EB1), (Sector_2_ID, SB2, EB2)} when ICIC_FBS properties of corresponding cells are identical with one another.

The messages of type 1 and type 2 may be transmitted through the X2 interface, and the messages of type 3 and type 4 may be transmitted through the X3 interface.

A NodeB which receives the message allocates and administers resources using the received message. ICIC_FBS is determined by an interference control algorithm, and parameters of the message may be administered regularly or irregularly, or in a fixed or variable manner according to whether to administer the interference control semi-statically or dynamically.

Here, "{B(i)} or ICIC_FBS" indicates information on resources to be used by a cell. ICIC_FBS definition parameters may be represented by B(i), (SBi, EBi), Ui, and Section_i_ID as described above.

"B(i)" represents particular resources designated as prohibited bands with respect to an $i^{th}$ cell. B(i) is used in the cell for a specific purpose, and may be changed semi-statically regularly or irregularly. B(i) may be broadcasted to UEs in the corresponding cell. When a node is belonging to only one cell, only a single B(i) exists. In this case, there may be the intersection of B(i) in a serving cell and B(i) in an adjacent cell. Such B(i) may be initially predetermined or changed while operating according to policies of the central node or an operation, administration and maintenance (OAM) server. Furthermore, a separate Node itself may designate B(i) initially based on information received from neighboring Nodes, or change (Bi) while operating. Here, B(i) is a logical concept. For example, if a Physical Resource Blocks (PRBs) numbered from 0 to 11 is allocated to a first cell, B(1) may be possible to be allocated as PRBs numbered from 0 to 5. In this case, the allocated B(1), i.e., the PRBs from 0 to 5 can be used for a particular purpose according to predetermined policies. Although, convenience of explanation, B(i) is referred to as a "prohibited band", it may not qualify that B(i) indicates a region which is prohibited from being used.

"(SB1, EBi)" indicate a starting location and a finishing location of a frequency corresponding to B(i). "SBi" and "EBi" may be represented by frequency bands directly if the PRB is formed of contiguous subcarriers (in case of centralized PRB allocation). In the alternative, SBi and EBi may be represented indirectly by dividing the entire B(i) according to a predetermined length, and sequentially allocating PRBs in ascending or descending manner, and thereby the SBi and EBi can be logically defined based on the order of allocation. However, if non-contiguous subcarriers form a PRB (in case of distributed PRB allocation), it is impossible to represent SBi and EBi in the direct form of frequencies, and hence indirect representation for SBi and EBi is required.

"U(i)" indicates a property of B(i). For example, according to a value of U(i), B(i) may be utilized as either a preferred band or a non-preferred band.

"Sector_i_ID" indicates an identification (ID) of a node, a sector, or a cell which corresponds to B(i).

Figure 2:
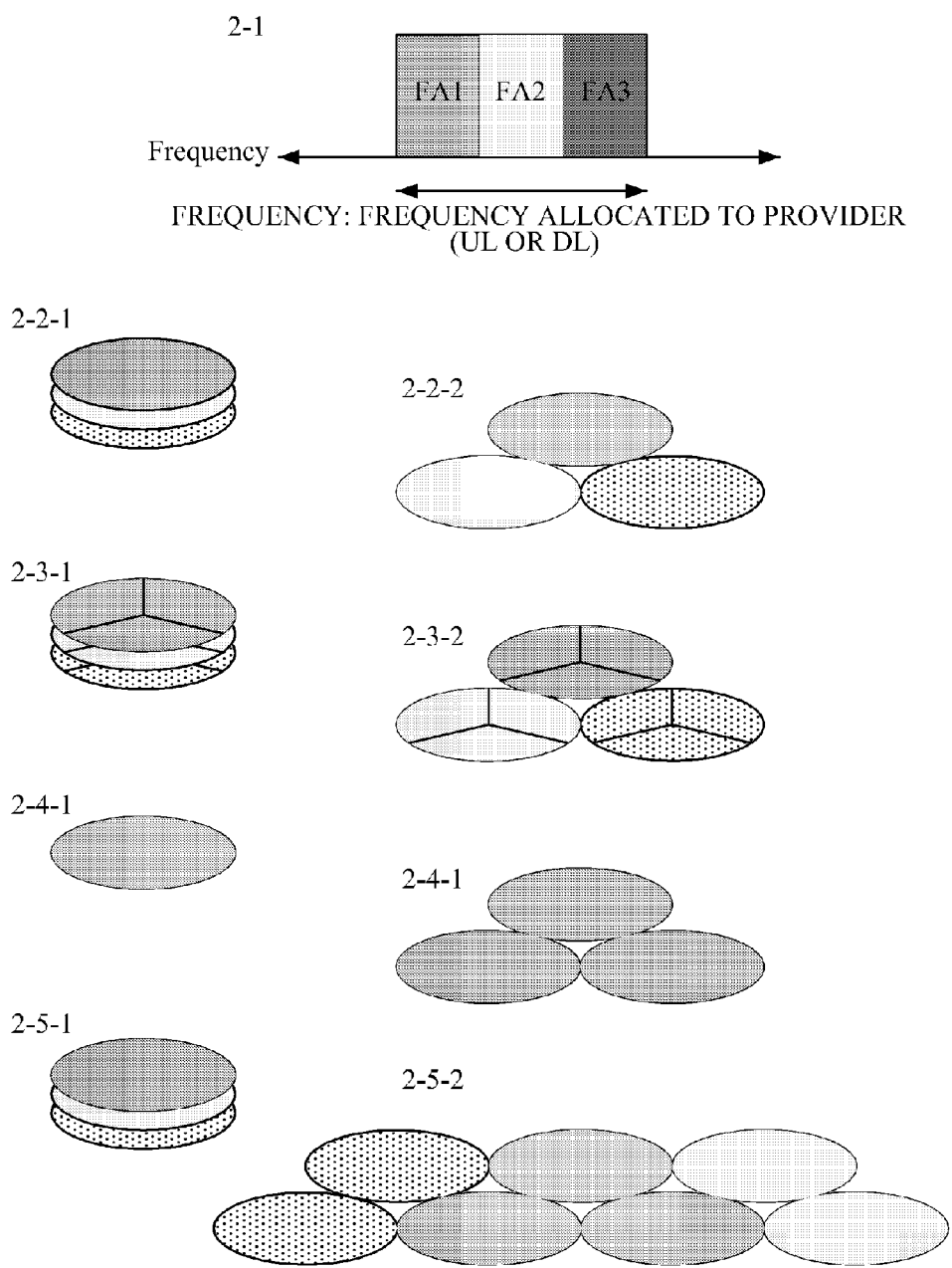
FIG. 2 is a diagram for showing characteristics of frequency reuse and a cell planning method according to an exemplary embodiment.

FIG. 2 is a diagram for showing characteristics of frequency reuse and a cell planning method according to an exemplary embodiment. In FIG. 2, reference numeral "2-1" represents frequency allocated to a provider for a mobile communication service that provides a certain wireless system. The allocated frequency band may be divided into several frequency assignments (FAs) according to a scheme supported by a wireless transmission system.

In FIG. 2, reference numeral 2-2-1 depicts allocated frequency band divided into three types, FA1, FA2, and FA3. If there is inter-cell interference, an index of frequency reuse can be set to 3 to conduct cell planning, as represented by reference number 2-2-2.

Additionally, to increase the total amount of data processed in a cell of a single base station, a directional antenna is employed for sectoring as represented by reference numeral 2-3-1, which indicates dividing each FA into three sectors using the directional antenna with respect to a base station. In this case, cell planning as represented by reference numeral 2-3-2 is possible.

In FIG. 2, reference numeral 2-4-1 depicts a case where only FA1 type is used if there is no interference as a characteristic of wireless transmission scheme. In this case, an index of frequency reuse is set to 1 as shown by 2-4-1 to perform cell planning.

Moreover, even if there is no inter-cell interference, when a provider is allocated with FA2 and FA3 types of frequencies, then cell planning as shown by 2-5-2 may be possible. In this case, if the same wireless scheme is used for the entire cells, when a wireless connected UE is moved from one FA1 cell to another FA1 cell, it is defined as an intra-frequency handover, and the UE is moved from a cell to a different type of cell, e.g., from an FA1 cell to an FA2 cell, it is defined as an inter-frequency handover.

The index of frequency reuse may be set to 1 if the wireless connection scheme is not affected by inter-cell interference. However, when there is an inherent inter-cell interference exists due to the wireless transmission scheme, cell planning may be conducted by dividing frequencies allocated to the provider such that an index of frequency reuse is set to 2 or more, or alternatively cell planning may be conducted while the index of frequency reuse is set to 1 while adding a special interference mitigation method.

Figure 3:
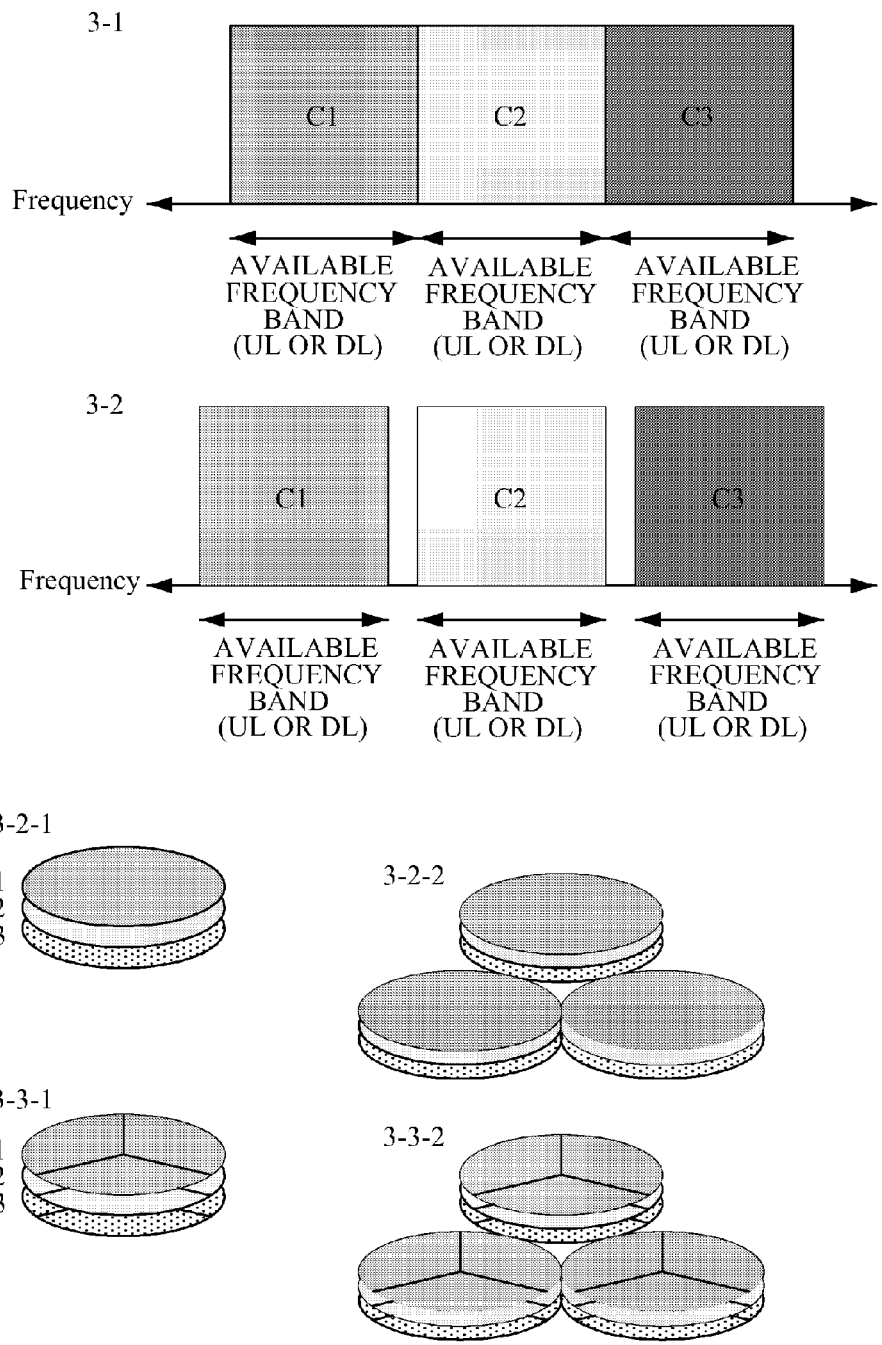
FIG. 3 illustrates characteristics of frequency reuse and a cell planning method according to an exemplary embodiment.

FIG. 3 illustrates characteristics of frequency reuse and a cell planning method according to an exemplary embodiment. The method in FIG. 3 is conformed to carrier aggregation scheme. According to this method, if frequency carriers available for improving the total data process performance of a cell are represented by C1, C2, and C3, one base station uses the whole frequency carriers simultaneously.

In FIG. 3, C1, C2, and C3 may be allocated sequentially as illustrated by 3-1, or non-sequentially as illustrated by 3-2. In addition, all of C1, C2, and C3 may be allocated to one provider, or they may be allocated to different providers.

Moreover, when there is no interference, cell planning can be carried out on each of C1, C2, and C3 as shown by 3-2-2. For example, depending on a capability of a UE, all of C1, C2, and C3 can be utilized. Moreover, use of a directional antenna in sectoring can increase the total amount of data processed by a cell, as illustrated by 3-3-2.

Figure 4:
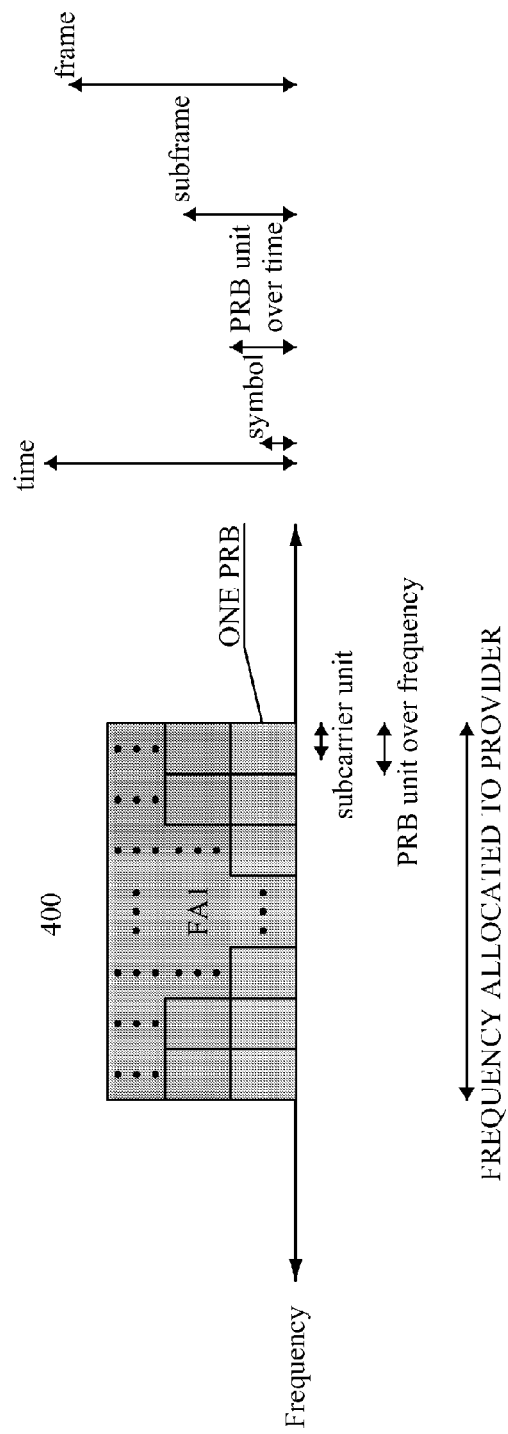
FIG. 4 is a diagram illustrating resources according to an exemplary embodiment.

FIG. 4 is a diagram illustrating resources according to an exemplary embodiment. In FIG. 4, resources 400 to be allocated to a provider has a frequency axis formed of allocated frequency band, and a time axis formed of a frame, a subframe, a physical resource block (PRB) unit over time, and a symbol.

For example, on the time axis, one frame may be formed of several subframes, and one subframe may be formed of several PRB units, and one PRB unit may be formed of several symbols. Furthermore, a number of subcarriers on the frequency axis form a PRB unit on the frequency axis.

In FIG. 4, when numerous contiguous subcarriers form a PRB unit on the frequency axis, such PRB unit may be referred to as a centralized PRB. Unlike the above, non-contiguous subcarriers may be put together to form a PRB unit, which may be referred to as a distributed PRB. In use of the distributed PRB, frequency-selective fading is less likely to occur, compared to the centralized PRB.

In one exemplary embodiment, "resources" may be a PRB formed of PRB units, collection of PRBs, or frequency band corresponding to the PRB.

Figure 5:
FIG. 5 is a block diagram illustrating an interference control apparatus according to an exemplary embodiment.

FIG. 5 is a block diagram illustrating an interference control apparatus 500 according to an exemplary embodiment. Referring to FIG. 5, the interference control apparatus 500 may be mounted in a base station node that manages a cell in a mobile communication system. The apparatus 500 may include an obtaining unit 501, a determining unit 502, and a controlling unit 503.

The obtaining unit 501 obtains information regarding resources to be used by a serving cell and adjacent cells. For example, the obtaining unit 501 may be an interface module provided to a base station node, and the obtained information may be ICIC_FBS which is information about resources.

The base station node may exchange type 1 or type 2 of messages with a neighboring base station node and generate the information about resources, or obtain the information by receiving type 3 or type 4 of messages from an OAM server or a central node.

The determining unit 502 may be a resource management module on an L3 layer in the base station node.

Furthermore, the determining unit 502 divides a serving cell into a plurality of regions, and allocates the resources to the respective regions. For example, the serving cell may be divided into a central region and a peripheral region, and the peripheral region may be divided into an adjacent region which is adjoining to another cell and a non-adjacent region which is not close to other cells. Here, the determining unit 502 may assign resources for each region. The allocated resources are to be allocated to a UE which is located at a corresponding region. For instance, the entire resources are allocated for the central region (Ω, e.g., PRB #0~PRB #11), and remaining resources after resource reservation for interference control may be allocated to the peripheral region. For example, resource of [Ω-B(1)] can be allocated for the peripheral region. Here, the resources allocated for the peripheral region may include resources to be always allocated and resource to be selectively allocated, which will be described later.

In addition, the determining unit 502 specifies interference properties for each resource. In allocation schedule for resource or interference control by the resource management, the interference properties may be used as basic information for interference control. In the exemplary embodiment, four types of interference properties may be used.

A first interference characteristic (IFZ) is possible to be assigned to a resource which does not cause interference. A second interference characteristic (LIZ) may be assigned to a resource which may cause interference, but which can avoid interference by controlling power. A third interference characteristic (ICZ) may be assigned to a resource which may cause interference, but which can avoid interference by physical interference cancellation with a UE. A fourth interference characteristic (HIZ) may be assigned to a resource which may cause interference, but which can avoid interference by exchanging messages with another cell. The interference avoidance by means of exchanging messages with another cell may refer to, for example, a case where if a given cell desires to exclusively use a particular resource, the cell includes relevant information in an X2 message and transmits the X2 message to adjacent cells to inform of the exclusive use of the resource and then the cell is given an exclusive right to use the resource to avoid the interference from the other cells.

The controlling unit 503 may be a resource management module on an L2 layer or an L1 layer of the base station node. Additionally, the controlling unit 503 schedules allocation of resources and conducts power control for the resources according to location of a UE in a serving cell. For example, the controlling unit 503 allocates resources designated by the determining unit 502 according to the location of the UE, and performs power control for the allocation resources. At this time, the allocation order of a resource or at what level of power the allocated resource will be managed may be controlled in consideration of the interference characteristic assigned to each resource. For example, a resource having the first interference characteristic (IFZ) may be allocated prior to the other resources, or the maximum power value is used for managing the resource of the first interference characteristic (IFZ).

Figure 6:
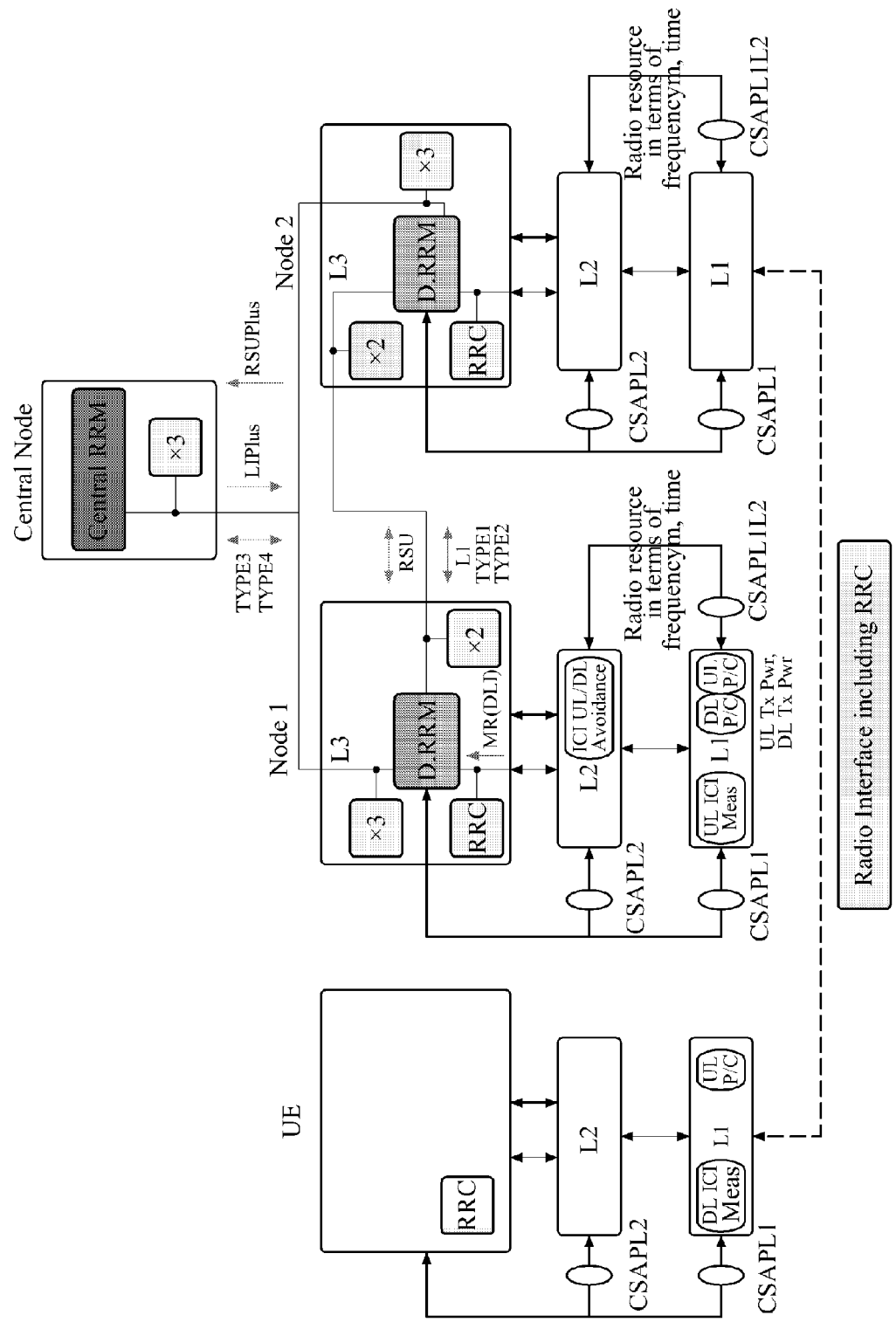
FIG. 6 is a diagram illustrating an interference control apparatus in association with a communication framework according to an exemplary embodiment.

FIG. 6 is a diagram illustrating an interference control apparatus in association with a communication framework according to an exemplary embodiment. In FIG. 6, a first node (Node 1 in FIG. 6) and a second node (Node 2 in FIG. 6) receive ICIC_FBS from a central node, and each cell formed by the first and second nodes is assumed as a cell without sectoring.

Referring to FIG. 6, the central node sends ICIC_FBS to each node through a message of type 4. For example, the first node can receive information such as {(U1, SB1, EB1), (U2, SB2, EB2), ... }. If receiving such message, the first node can find out that resources from SB1 to EB1 among the resources allocated to the first node are designated for a special purpose, and can learn the property of the designated resource (whether the resource is in a preferred band or non-preferred band) based on U1. Also, it can be found out that resource property information of the neighboring second node.

Distributed radio resource management (D.RRM) present in an L3 layer of the first node divides its own cell into regions based on B, U, SB, and EB of its own cell and of an adjacent cell, and allocates resources to the respective regions. Then, the D.RRM determines an interference characteristic (IFZ, LIZ, ICZ, HIZ and the like) for each resource.

The D.RRM transmits information of resource allocated to each region and interference characteristic assigned to the resource to an L2 layer through a CSAPL2 interface, and to an L1 layer through a CSAPL1 interface.

During this state, the D.RRM detects a location of a currently connected UE and which region the current location is belonging to based on a measurement report of UE RRC. Information of the location of UE and the information of corresponding region is transmitted to the L2 layer through the CSAPL2 interface. The L2 layer allocates the resource designated to the corresponding region to the UE. At this time, the order of allocation can be determined in consideration of the interference characteristic assigned to each UE. Additionally, the information of the location of UE and the region corresponding to the location is transmitted to the L1 layer through the CASPL1 interface. The L1 layer restricts downlink power. Moreover, the L1 layer offers information to the UE through RRC, and makes the UE to restrict uplink power based on the information. Here, the uplink power can be restricted in consideration of interference characteristic assigned to the corresponding resource.

Resources allocated to the respective regions and interference properties of the respective resources may different with algorithms. By using such characteristics, a central node controls interference information through the X3 interface in a centralized manner, or if there is no central node, nodes exchange the interference information with one another through the X2 interfaces and mange the interference information mutually in a distributed manner. The interference information is stored in the L3 layer of a node. When the interference information is provided to the L2 of the node through the CSAPL2 interface, the L2 layer provides information of resources which is expected to cause resource interference or of resources which have already caused resource interference, or interference cancellation information such that interference can be avoided or at least scheduling can be conducted to avoid interference. Also, measurement (e.g., CQI) through a CASPL1L2 interface can be used as well for the scheduling in consideration of the interference.

Furthermore, the L3 provides the interference information to the L1 layer through the CSAPL1 interface to proactively or reactively intervene in power control of the L1 layer of the node. In this case, uplink (UL) interference may be measured by the L1 of the node and then informed to the L3 of the node through the CSAPL1 interface, and downlink (DL) interference may be measured by an L1 of a UE and informed to an L3 of the UE, and then the DL interference is informed to an RRC of the node through an RRC message.

A load indication message may be defined in the X2 interface, and a node can identify Ux, SBx, EBx, and Sector_i_ID of another node corresponding to the distributed RRM (D.RRM) of the node by exchanging a message of type 1 or type 2 with the other node. The load indication (LI) message enables inter-cell interference control, and changed data for inter-cell interference control may be collected through Resource Status Update (RSU). This update may be performed by communication between nodes, one transmitting to the other node a resource status request message (RSReq) for collecting data and the other node receiving the RSReq and sending a resource status response message (RSRsp) in response.

All information described above which is managed by the D.RRM that is a separate node is possible to be utilized for of inter-cell interference control and mitigation. In addition, in use of the X3 interface, the central node may provide Ux, SBx, EBx, and Sector_i_ID to each node through a message of Type 3 or Type 4 in view of cell planning, or inversely the central node may collect and manage the information.

Furthermore, like in the X2 interface, data for inter-cell interference control may be collected from each node through RSUPlus process, and such collection may be performed by RSUPlus between the central node and a corresponding node using RSReqPlus and RsRspPlus. The RSUPlus informs the central node of an update of resource information including interference information of the corresponding node.

The LI has UL interference overload indication (OI) information of each PRB embedded on the basis of sectors (i.e., cell IDs including sector IDs) managed by a node, sectors managed by the NodeB is provided with UL high interference indication (HII) of each PRB which corresponds to a sector (i.e., cell IDs including sector IDs) managed by a target NodeB, and simultaneously averaged DL maximum Tx power of each PRB is provided to each sector of a node that generates the LI. The corresponding node which has received the LI takes into consideration OI information (high, medium, and low) of each PRB measured on the basis of sectors and HII (high and low) provided for each sector of the node which has received LI influential with a sector of the node providing the LI, such that the node can mitigate interference through UL power control or avoid interference through UL scheduling. Moreover, it is possible to mitigate interference through DL power control in consideration of DL Maximum Tx power for each sector of the node providing the LI.

Figure 7:
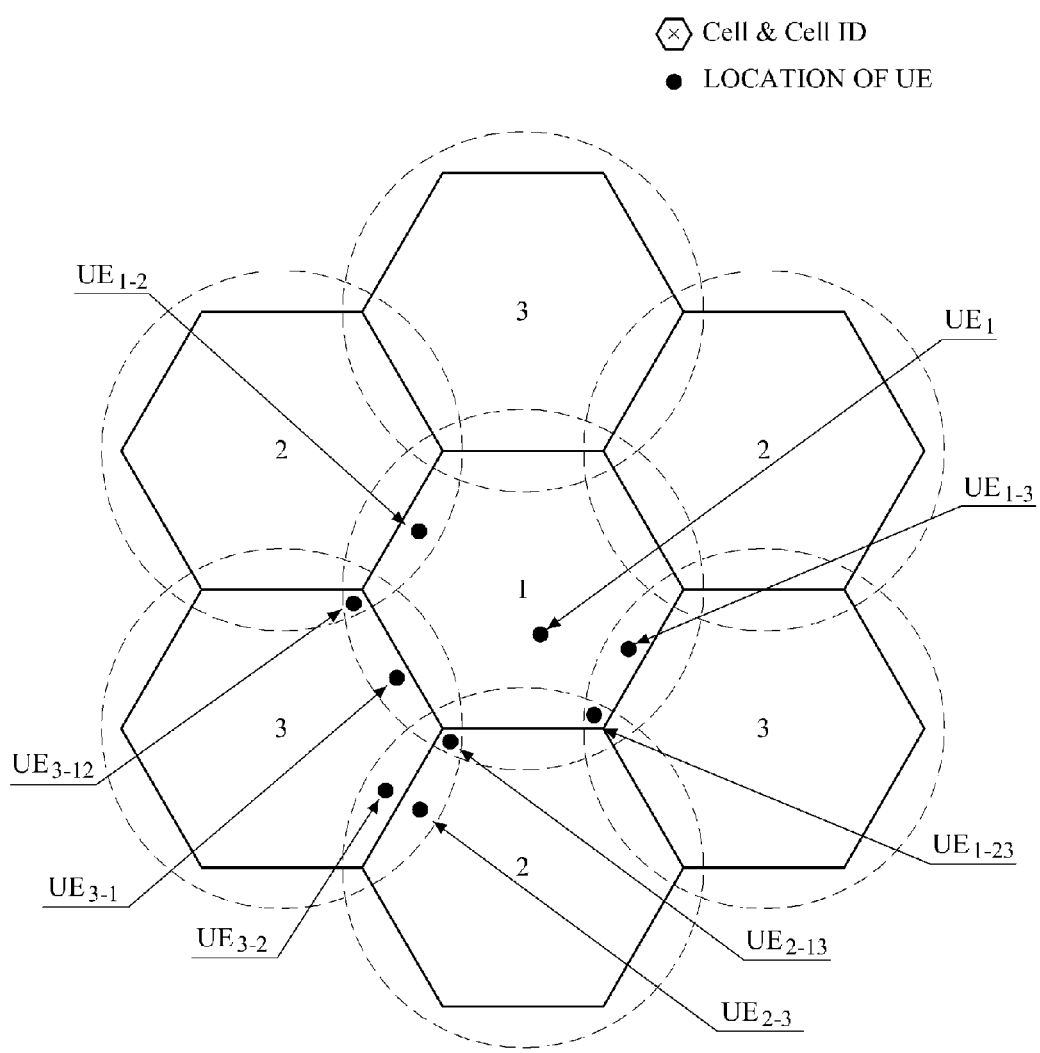
FIG. 7 illustrates locations of UEs and regions of cells according to an exemplary embodiment.

FIG. 7 illustrates locations of UEs according to an exemplary embodiment. Referring to FIG. 7, $UE_1$ is located inside a cell 1, and $UE_{1-3}$, $UE_{1-2}$, and $UE_{1-23}$ are located on the border of cells. As illustrated, $UE_{1-3}$ is located on the border of the cell 1 and adjacent to a cell 3, $UE_{1-2}$ is located on the border of the cell 1 and adjacent to a cell 2, and $UE_{1-23}$ is located on the border of the cell 1 and adjacent to the cell 2 and the cell 3.

The inter-cell interference control in the exemplary embodiment is performed under the consumption that locations of UEs can be recognized as illustrated in FIG. 7. The locations of UEs are identified by use of location information such as global positioning system (GPS), time of arrival (TOA), time difference of arrival (TDOA), and received signal received power (RSRP).

In one example, a UE located inside a cell is managed with power adequate for communication without interfering with other cells, and is allowed to use all frequency bands in the cell, and hence the maximum performance of the UE can be achieved. Since the performance of UE located on the border of a cell is not affected by allocation of available frequency band to the UE, assurance of high signal-to-interference noise ratio (SINR) may be given a priority.

Figure 8:
FIG. 8 is a table showing resource information according to an exemplary embodiment.

FIG. 8 is a table showing resource information according to an exemplary embodiment. Referring to FIG. 8, the resource information is configured on a RPB basis. In FIG. 8, if B(i) is defined as a resource designated for a specific purpose, the entire band Ω for the cell 1, the cell 2, and the cell 3 is between 0 and 11, B(1) is 0, 1, 2, 3, and 4, B(2) is 4, 5, 6, 7, 8, and 9, and B(3) is 0, 1, 8, 9, 10, and 11.

Various embodiments of a method of controlling inter-cell interference will be described in detail below.

Embodiment 1-1

B(i) which is the resource that a peripheral region (CEU) of a serving cell i (Cell_i) avoids being allocated is defined, so that frequency of B(i) is not used for CEU of Cell_i. Moreover, in case of a cell center region (ICU), the entire band of frequency can be used for ICU under the condition that ICU is managed with appropriate power such that CEU or ICU of an adjacent cell j is not interfered.

If there is an adjacent cell Cell_j which causes interference, CEU of Cell_i is allowed to use some of the resource B(j) which CEU of Cell_j avoids being allocated.

For example, the $UE_{1-2}$ located in the cell 1 and adjacent to the cell 2 is allowed to use some of the frequency band of B(2) of the cell 2, i.e., a common region between a band obtained by subtracting a region of B(1) from the entire band S2 and a region of B(2).

Figure 9:
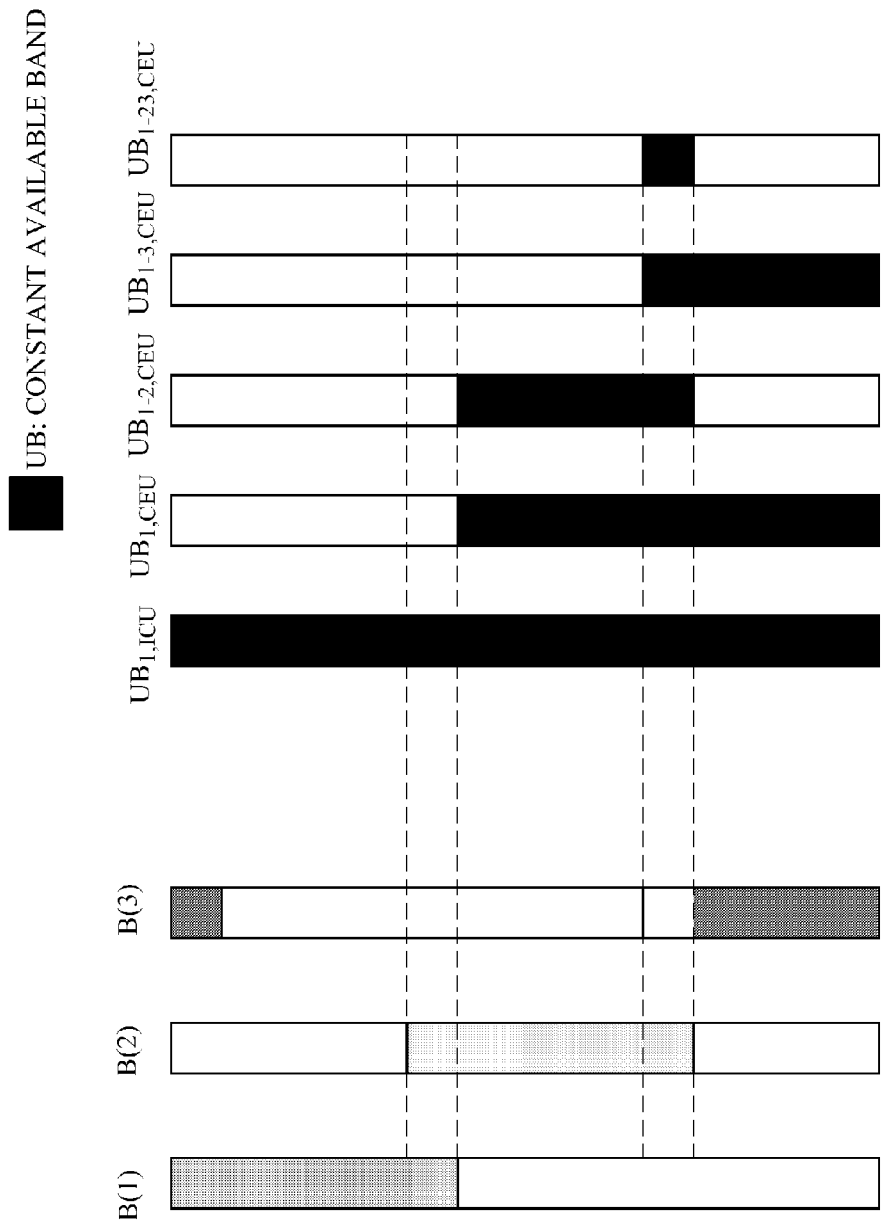
FIG. 9 is a diagram illustrating resource bands available to each region according to an exemplary embodiment 1-1.

Available frequency bands may be represented by equations as below.

$$UB_{1,ICU} = \Omega \quad \text{Equation 1}$$

$$UB_{1,CEU} = \Omega - B(1) \quad \text{Equation 2}$$

$$UB_{1-2,CEU} = UB_{1,CEU} \cap B(2) \quad \text{Equation 3}$$

$$UB_{1-3,CEU} = UB_{1,CEU} \cap B(3) \quad \text{Equation 4}$$

$$UB_{1-23,CEU} = UB_{1,CEU} \cap B(2) \cap B(3) \quad \text{Equation 5}$$

Where frequency bands B(1), B(2), and B(3) which the cells 1, 2, and 3 respectively avoid being allocated are defined in FIG. 8 and FIG. 9 in consideration of the notation used in FIG. 7, a frequency band available to the $UE_{1, ICU}$ which is located inside the cell 1 is the entire frequency band i.e., Ω, as represented by Equation 1, and the frequency band available to $UE_{1, CEU}$ located on the border of the cell is a band obtained by subtracting B(1) from Ω, as represented by Equation 2.

Where $UB_{1, CEU}$ is described in detail by regions, on the border of the cell 1, $UE_{1-2, CEU}$ adjacent to the cell 2 may use the frequency band which is intersection of frequency band available to $UB_{1, CEU}$ and B(2) as represented by Equation 3. $UE_{1-3, CEU}$ located on the border of the cell 1 and adjacent to the cell 3 may use the frequency band which is intersection of frequency band available to $UB_{1, CEU}$ and B(3), as represented by Equation 4. $UE_{1-23, CEU}$ may use the frequency band which is intersection of frequency band available to $UB_{1, CEU}$, B(2), and B(3), as represented by Equation 5.

In this regard, referring to FIG. 9 again, the constant available frequency bands of the respective $UE_{1,\ ICU}$, $UE_{1,\ CEU}$, $UE_{1-2,\ CEU}$, $UE_{1-3,\ CEU}$, and $UE_{1-23,\ CEU}$ may be $UB_{1,\ ICU}$ in Equation 1, $UB_{1,\ CEU}$ in Equation 2, $UB_{1-2,\ CEU}$ in Equation 3, $UB_{1-3,\ CEU}$ in Equation 4, and $UB_{1-23,\ CEU}$ in Equation 5.

Figure 10:
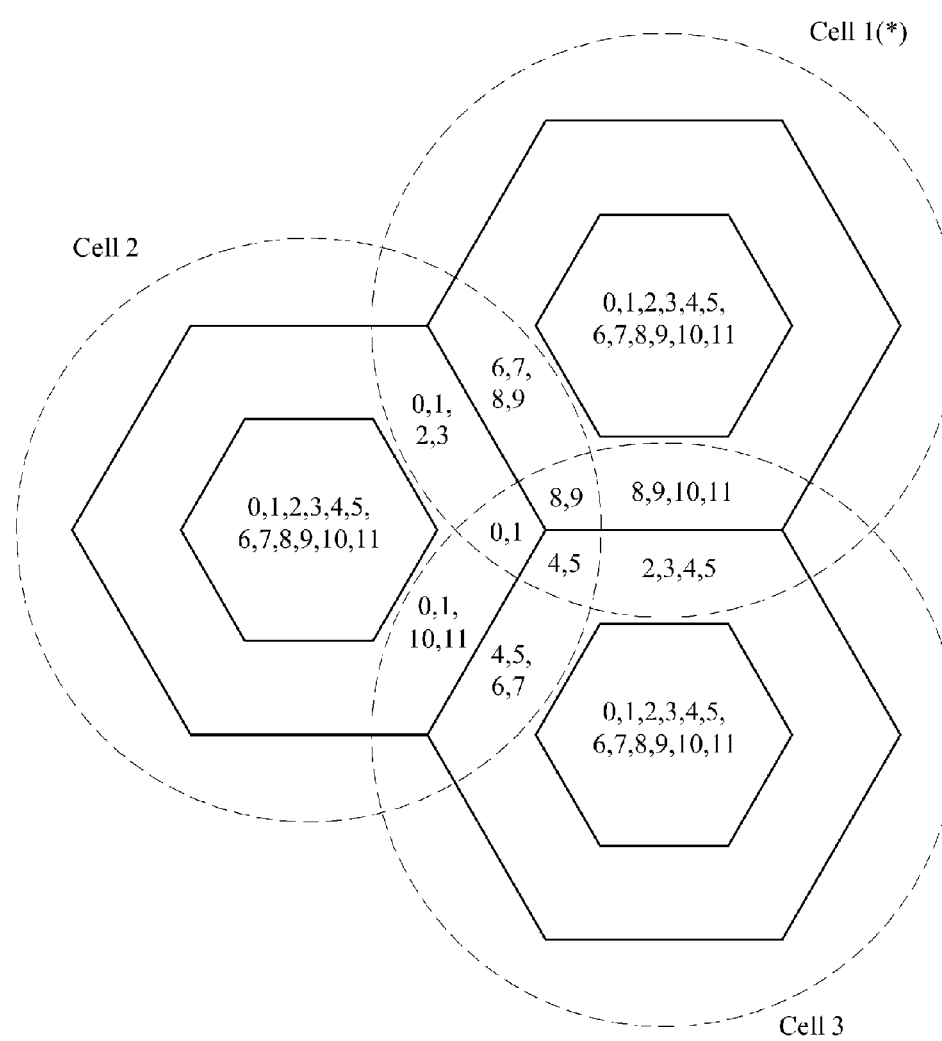
FIG. 10 illustrates the available resource bands and interference characteristics for each region according the exemplary embodiment 1-1.

Referring to FIG. 8 again, in view of PRBs, B(1) for the cell 1 is defined as 0, 1, 2, 3, 4, and 5, B(2) for the cell 2 is defined as 4, 5, 6, 7, 8, and 9, and B(3) for the cell 3 is defined as 8, 9, 10, 0, and 1. FIG. 10 illustrates the available frequency bands for the respective UEs, i.e., $UE_{1,\ ICU}$, UE1-23, CEU, $UE_{1-2, CEU}$, $UE_{1-3, CEU}$, $UE_{2-13, CEU}$, $UE_{3-12, CEU}$, $UE_{2-1, CEU}$, $UE_{3-1, CEU}$, $UE_{2-3, CEU}$, $UE_{3-2, CEU}$, $UE_{2, ICU}$, and $UE_{3, ICU}$, by use of PRBs in conjunction with FIG. 7.

In FIG. 10, the $UE_{1,\ ICU}$ located in the center of the cell 1 can use the entire band ranging from 0 to 11. Since PRBs from 0 to 5, among the entire band, which are belonging to B(1) region are available to UEs located in CEUs of adjacent cells, appropriate power is required for using such PRBs. PRBs 6 and 7 among the band ranging from 6 to 11 available to the cell 1 are common with B(2) of the adjacent cell 2, but not with B(3) of the adjacent cell 3, and PRBs 10 and 11 among the band available band to the cell 1 are common with B(3) of the adjacent cell 3, but not with B(2) of the adjacent cell 2. Thus, PRBs 6, 7, 10, and 11 are relatively less affected by interference. PRBs 8 and 9 among the band 6 to 11 available to the cell 1 are common with B(2) of the cell 2 and B(3) of the cell 3, which are not used by both the cell 2 and the cell 3, and thus the probability of occurrence of interference is very low.

In FIG. 10, in a region where the dotted-lined circles of the cell 1, the cell 2 and the cell 3 overlap, 8 and 9 are available to $UE_{1-23,\ CEU}$ of the cell 1, and 8 and 9 are not used by CEU of the cell 2, (i.e., $UE_{2-3, CEU}$, $UE_{2-13, CEU}$, $UE_{2-3, CEU}$) and CEU of the cell 3 (i.e., $UE_{3-1, CEU}$, $UE_{3-12, CEU}$, $UE_{3-2, CEU}$). Therefore, interference is least likely to occur between the CEU of the cell 1 and the CEU of the cell 2 or the CEU of the cell 3.

In FIG. 10, in a region where the dotted-lined circles of the cell 1 and the cell 2 overlap, except for the region where all three dotted-lined circles of the cells 1, 2, and 3 overlap, $UE_{1-2,\ CEU}$ of the cell 1 can use 6 and 7 among 6, 7, 8, 9, 10, and 11 available to the cell 1, which are common with B(2), but not with B(3) and 8 and 9 among 6, 7, 8, 9, 10, and 11 which are common with B(3), but not with B(2). In this case, since 8 and 9 are belonging to B(2) and B(3), the probability of occurrence of interference is lower than in 6 and 7.

In FIG. 10, in a region where the dotted-lined circles of the cell 1 and the cell 3 overlap, except for the region where all three dotted-lined circles of the cells 1, 2, and 3 overlap, $UE_{1-3,\ CEU}$ of the cell 1 can use 10 and 11 among 6, 7, 8, 9, 10, and 11 available to the cell 1 which are common with B(3), but not with B(2) and 8 and 9 among the 6, 7, 8, 9, 10, and 11 available to the cell 1 which are common with both B(3) and B(2). In this case, since 8 and 9 are belonging to B(2) and B(3), the probability of interference occurrence is lower than in 10 and 11.

In the region where the dotted-lined circles of the cells 1, 2, and 3 overlap together, $UE_{2-13}$, CEU of the cell 2 can use a common band i.e., 0 and 1, between a band of Ω2 except B(2), B(1) and B(2). Here, since 0 and 1 are resources that are not used by CEU of the cell 1 and CEU of the cell 3, the probability of interference occurrence is considerably low. I In FIG. 10, in the region where the dotted-lined circles of the cells 1, 2, and 3 overlap together, $UE_{3-12,\ CEU}$ of the cell 3 can use a common band i.e., 4 and 5, of a band of Ω3 except B(3), B(1) and B(2). In this case, because 4 and 5 are resources which are not used by the CEU of the cell 1 and the CEU of the cell 2, the probability of interference occurrence is significantly low.

In a region where the dotted-lined circles of the cell 1 and the cell 2 overlap together, except for the region where all three dotted-lined circles of the cells 1, 2, and 3 overlap, $UE_{2-1,\ CEU}$ of the cell 2 can use 0, 1, 2, and 3 (i.e., a common band between the available resources, 0, 1, 2, 3, 10, and 11 and B(1)). Here, the probability of interference occurrence with respect to the resources 0, 1, 2, and 3 is relatively low in relation with CEU of the cell 1.

In a region where the dotted-lined circles of the cell 1 and the cell 3 overlap, except for the region where all three dotted-lined circles of the cells 1, 2, and 3 overlap together, $UE_{3-1,\ CEU}$ of the cell 3 can use 2, 3, 4, and 5 (i.e., a common band of the available resources, 2, 3, 4, 5, 6, and 7 and B(1)). In this case, the probability of interference occurrence with respect to the resources 2, 3, 4, and 5 is relatively low in relation with CEU of the cell 1.

In FIG. 10, in a region where the dotted-lined circles of the cells 2 and 3 overlap, except the region where all three dotted-lined circles of the cells 1, 2, and 3 overlap, $UE_{2-3,\ CEU}$ of the cell 2 can use 0, 1, 10, and 11 (i.e., resources belonging to B(3), from among the resources 1, 2, 3, 10, and 11 available to CEU of the cell 2). Since 0 and 1 are resources which are not used in CEU of the cell 1, it can be concluded, in view of the cell 1, that these resources do not interfere with CEU of the cell 1.

In addition, in a region where the dotted-lined circles of the cells 2 and 3 overlap, except the region where all three dotted-lined circles of the cells 1, 2, and 3 overlap, $UE_{3-2,\ CEU}$ can use 4, 5, 6, and 7 (i.e., resources belonging to B(2), from among the resources 2, 3, 4, 5, 6, and 7 available to CEU of the cell 3). In this case, since 4 and 5 are resources that are not used in CEU of the cell 1, it can be considered, in view of the cell 1, that these resources do not interfere with CEU of the cell 1. Moreover, since 6 and 7 are not adjacent to $UE_{3-2,\ CEU}$ and $EU_{1-2,\ CEU}$ while they are used in CEU of the cell 1, it can be considered, in view of the cell 1, that 6 and 7 do not directly interfere with CEU of the cell 1.

Furthermore, in FIG. 10, since ICU ($UE_{2,\ ICU}$) of the cell 2 and ICU ($UE_{3,\ ICU}$) of the cell 3 are managed with an appropriate power, it can be considered, in view of the cell 1, that they do not interfere with ICU ($UE_{1,\ ICU}$) of the cell 1 or CEU ($UE_{1,\ CEU}$), and $UE_{2,\ ICU}$ and $UE_{3,\ ICU}$ are allowed to use the entire band as $UE_{1,\ ICU}$ does.

Embodiment 1-2

In this embodiment, a common available band AB is defined, which has a frequency reuse index is 1 in all cells, and an unavailable band B(i) for each cell is established based on the entire band Ω except the common available band AB.

For example, ICU which is the central region of the cell uses the entire band a Generally, a peripheral region of the cell uses a band from the entire band Ω except for the common available band AB and the unavailable band B(i). In addition, the peripheral region of the cell selectively uses the common available band AB according to a predetermined condition. Here, the predetermined condition may be the case in which the peripheral region of the cell can avoid interference by the interference cancellation at a UE while using the common available band AB, or the case in which an exclusive use of the common available band AB is secured by communicating messages with other cells.

As shown in FIG. 13, in view of PRBs, 0, 1, and 2 are defined as the common available band AB for the cells 1, 2, and 3. B(1) is defined as 3, 4, 5, 6, and 7, and B(2) is defined as 6, 7, 8, 9, and 10, and B(3) is defined as 3, 4, 9, 10, and 11.

Figure 11:
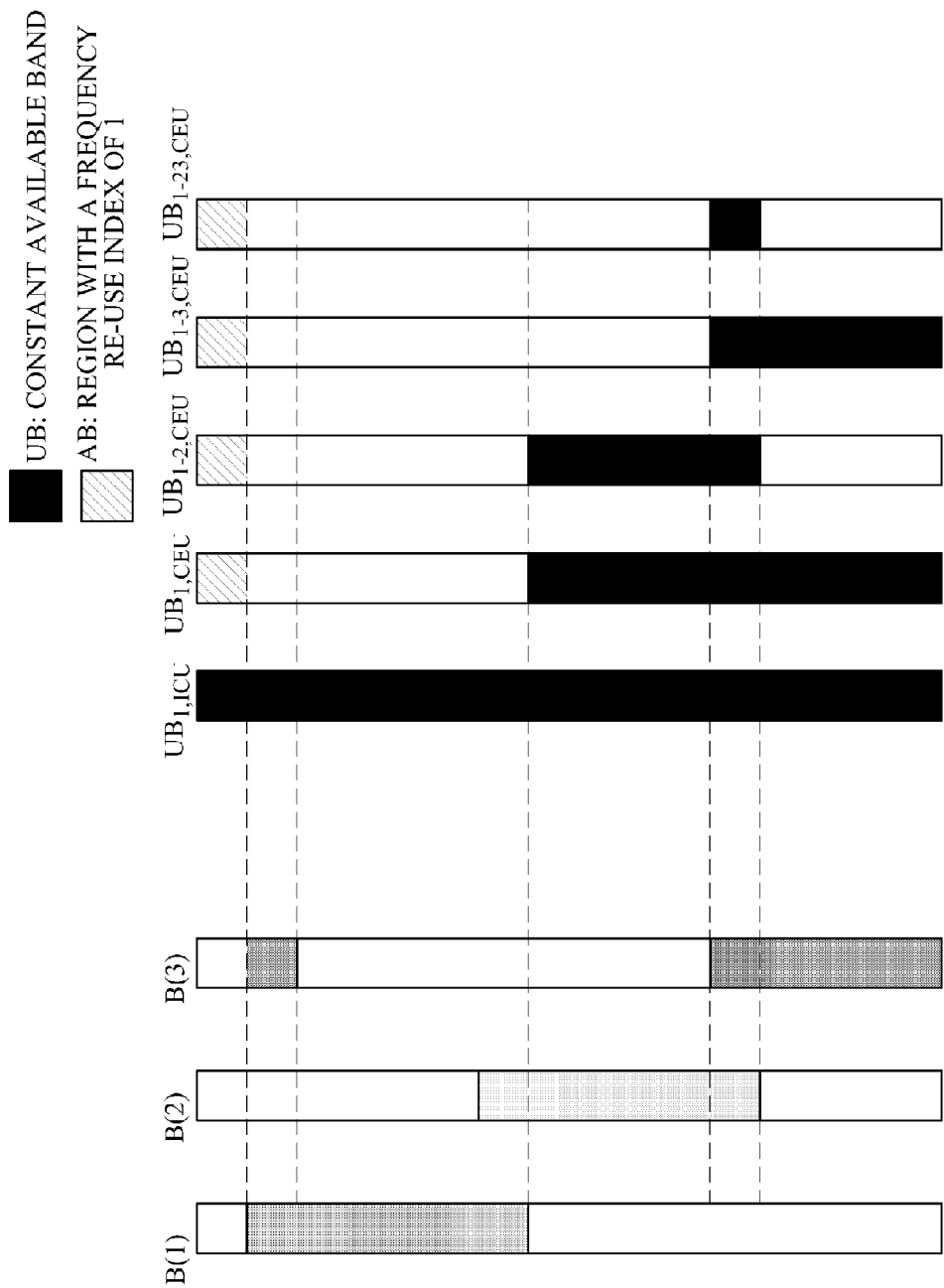
FIG. 11 illustrates resource bands available to each region according to an exemplary embodiment 1-2.

That is, as shown in FIG. 11, B(1), B(2), and B(3) are defined in a frequency band of the entire band Ω except the common available band AB. Here, $UE_{1,ICU}$ which can use the entire band Ω, avoids interference to other adjacent cells by managing power appropriately in using the entire band Ω. A band available to $UE_{1,CEU}$ includes a constant available band and a conditionally available band. The constant available band of the $UE_{1,CEU}$ is the available band except B(1) from the band available to $UE_{1,CEU}$, and the conditionally available band is the common available band AB.

Fundamentally, since CEUs of adjacent cells also use the common available band AB, interference to $UB_{1,CEU}$ may occur when a UE on the border of the adjacent cell and a UE on the border of the serving cell are using the AB. Hence, measures to avoid such interference are needed in using the common available band AB.

In one example, the serving cell signals the information about the use of the band AB to the other cells. For example, $UE_{1-2,CEU}$ which wishes to use the common available band AB may inform of the use of the band AB to the cell 2 and the cell 3, and be given exclusive use of the band AB. In another solution, the common available band AB can be used when it is possible to perform interference cancellation at any time.

In FIG. 11, in the region of the cell 1, a band available to $UE_{1-2,CEU}$ which is close to the cell 2 may be $UB_{1-2,CEU}$ (i.e., an intersection of the constant available band [Ω-AB-B(1)] and B(3), and the conditionally available band AB).

In FIG. 11, in the region of the cell 1, a band available to $UE_{1-3,CEU}$ which is close to the cell 3 may be $UB_{1-3,CEU}$ (i.e., an intersection of the constant available band [Ω-AB-B(1)] and B(3), and the conditionally available band AB).

In addition, in the region of the cell 1, a band available to $UE_{1-23,CEU}$ which is close to the cell 2 and the cell 3 may be $UB_{1-23,CEU}$ (i.e., an intersection of the constant available band [Ω-AB-B(1)], B(2) and B(3), and the conditionally available band AB).

In use of the conditionally available band AB, there may occur one or two interferences. To avoid such interferences, as one solution, the AB may be freely used if interference cancellation is possible, and as another solution, a given cell may issue a message notifying of the exclusive use of the band AB through the X2 interface to the other cells and the cells that receive the message may be prohibited to use the band AB.

Relations between the above-described bands and UEs may be represented by equations as below.

$$AB = \text{"region with a frequency reuse index of 1"} \quad \text{Equation 6}$$

$$UB_{1,ICU} = \Omega \quad \text{Equation 7}$$

$$UB_{1,CEU} = \Omega - AB - B(1) \quad \text{Equation 8}$$

$$UB_{1-2,CEU} = UB_{1,CEU} \cap B(2) \quad \text{Equation 9}$$

$$UB_{1-3,CEU} = UB_{1,CEU} \cap B(3) \quad \text{Equation 10}$$

$$UB_{1-23,CEU} = UB_{1,CEU} \cap B(2) \cap B(3) \quad \text{Equation 11}$$

For example, a resource band available to the central region of the cell 1 can be represented by Equation 7. Additionally, a resource band available to a peripheral region of the cell 1 may be primarily presented by Equation 8, and may be selectively defined by Equation 6.

Hereinafter, the resource band available to the peripheral region of the cell 1 will be described in detail in view of the specified regions of the cell 1. UE1-2, CEU can use an intersection of UB1, CEU and B(2) at all times, and AB can be selectively used. In similar, UE1-3, CEU can use an intersection of UB1, CEU and B(3) at all times, and selectively use the AB according to a condition, as shown in FIG. 10. Also, UE1-23, CEU can use an intersection of B(2) and B(3) at all times, and selectively use the AB according to a condition.

In this regards, referring to FIG. 11 again, the bands constantly available to $UE_{1,CEU}$, and $UE_{1-23,CEU}$ are $UB_{1,ICU}$ of Equation 7, $UB_{1,CEU}$ of Equation 8, $UB_{1-2,CEU}$ of Equation 9, $UB_{1-3,CEU}$ of Equation 10, and $UB_{1-23,CEU}$ of Equation 11, respectively. Also, all UEs can selectively use the common available band AB of Equation 6.

Figure 12:
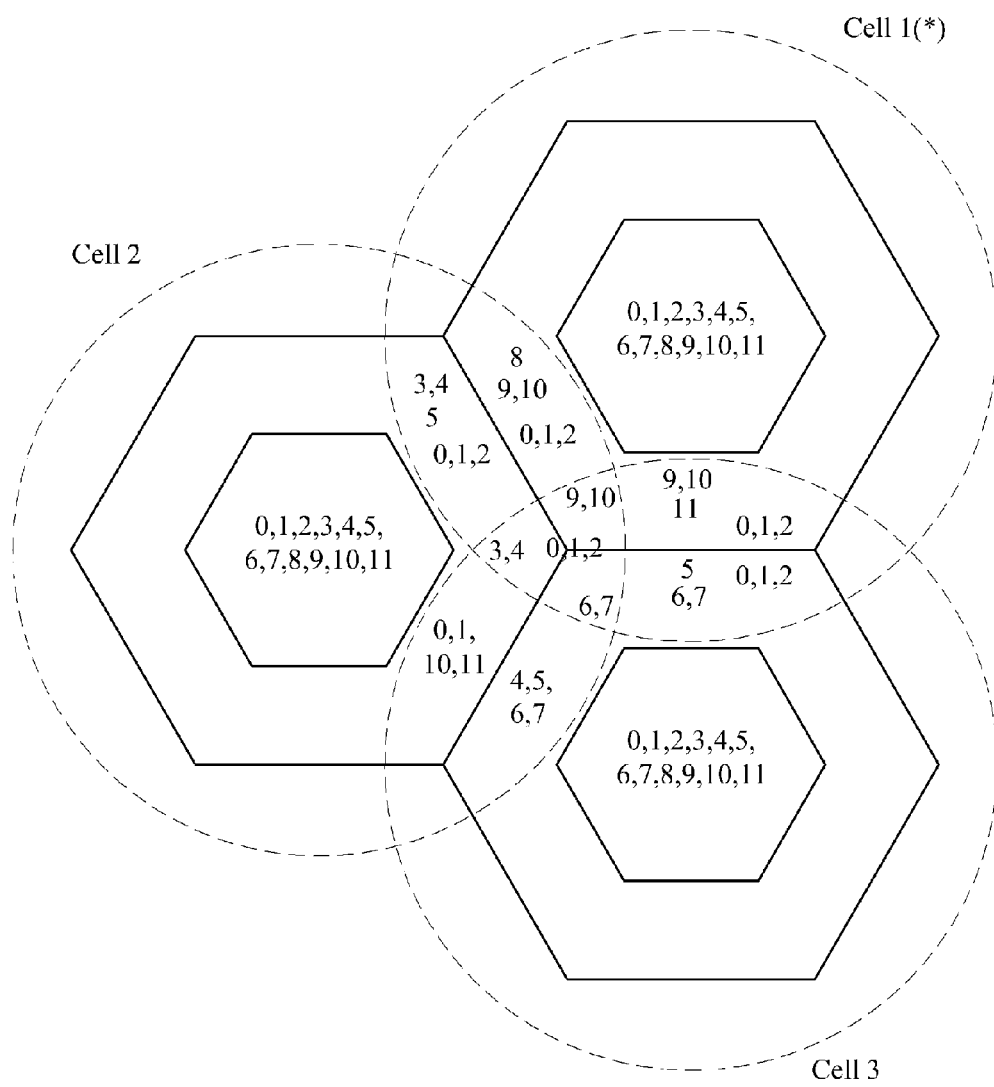
FIG. 12 illustrates the available resource bands and interference characteristics for each region according to the exemplary embodiment 1-2.

FIG. 12 illustrates bands shown as PRBs available to $UE_{1,ICU}$, $UE_{1-23,CEU}$, $UE_{1-2,CEU}$, $UE_{1-3,CEU}$, $UE_{2-13,CEU}$, $UE_{3-12,CEU}$, $UE_{2-1,CEU}$, $UE_{3-1,CEU}$, $UE_{2-3,CEU}$, $UE_{3-2,CEU}$, $UE_{2,ICU}$, and $UE_{3,ICU}$ in view of the cell 1.

In FIG. 12, the $UE_{1,ICU}$ located at the center of the cell 1 can use the entire band ranging from 0 to 11. Here, 0, 1, and 2 are belonging to AB band, which can be used when exclusive use signaling or interference cancellation occurs. Since 3, 4, 5, 6, and 7 are belonging to B(1), which can be used by CEU of adjacent cells, they need to be managed with an appropriate power. Since 9 and 10 are bands which neither of the cells 2 and 3 uses, no interference takes place. Because 8 and 11 are belonging, respectively, to B(2) and B(3), they are comparatively less affected by interference.

In FIG. 12, since all of 0, 1, and 2 have the frequency reuse index of 1, they are defined as being used by all cells 1, 2, and 3, and a cell which provides interference cancellation or is allowed exclusive use of the resources can use the resources 0, 1, and 2.

In a region where the dotted-lined circles of the cells 1, 2, and 3 overlap, $UE_{1-23,CEU}$ located at the cell 1 is possible to use 0, 1, and 2 according to a condition. 9 and 10 are belonging to B(2) and B(3) among 8, 9, 10, and 11 which are remaining in the entire band except AB and B(1), and thus they can be used at all times. Here, since 9 and 10 are not used by CEU of adjacent cells, they can be bands which are not affected by interference.

In FIG. 12, in a region where the dotted-lined circles of the cells 1 and 2 overlap, except the region where all three dotted-lined circles of the cells 1, 2, and 3 overlap, $UE_{1-2,CEU}$ located at the cell 1 may be allowed to use 0, 1, and 2 according to a condition. Since 8, 9, and 10 are belonging to B(2) among 8, 9, 10, and 11 which are remaining in the entire band except AB and B(1), and thus they can be used at all times. Here, 9 and 10 are belonging to B(3) as well, and hence they can be interference-free bands.

In addition, in a region where the dotted-lined circles of the cells 1 and 3 overlap, except the region where all three dotted-lined circles of the cells 1, 2, and 3, $UE_{1-3,CEU}$ located at the cell 1 may be allowed to use 0, 1, and 2 according to a condition. Since 9, 10, and 11 are belonging to B(3) among 8, 9, 10, and 11 which are remaining in the entire band except AB and B(1), and thus they can be used at all times. Here, 9 and 10 are belonging to B(2) as well, and therefore they can be interference-free bands.

In the region where all three dotted-lined circles of the cells 1, 2, and 3, $UE_{2-13,CEU}$ located at the cell 2 may be allowed to use 0, 1, and 2 according to a condition. Since 3 and 4 are belonging to both B(1) and B(3) among 3, 4, 5, and 11 which are remaining in the entire band except AB and B(2), and thus they can be used at all times. Here, because 3 and 4 are not used by CEU of the adjacent cells, they may not incur interference.

In FIG. 12, in the region where the dotted-lined circles of the cells 1 and 3 overlap, except the region where all three dotted-lined circles of the cells 1, 2, and 3, $UE_{21,CEU}$ located at the cell 2 may be allowed to use 0, 1, and 2 according to a condition. Since 3, 4, and 5 are belonging to both B(1) and B(2) among 5, 6, 7, and 8 which are remaining in the entire band except AB and B(3), and thus they can be used at all times. Here, because 6 and 7 are not used by CEU of the adjacent cells, they may not incur interference.

In FIG. 12, in the region where all three dotted-lined circles of the cells 1, 2, and 3, $UE_{3\text{-}12,\,CEU}$ located at the cell 3 may be allowed to use 0, 1, and 2 according to a condition. Since 6 and 7 are belonging to both B(1) and B(2) among 5, 6, 7, and 8 which are remaining in the entire band except AB and B(3), and thus they can be used at all times. Here, because 6 and 7 are not used by CEU of the adjacent cells, they may not incur interference.

In FIG. 12, in the region where the dotted-lined circles of the cells 1 and 2 overlap, except the region where all three dotted-lined circles of the cells 1, 2, and 3, $UE_{21,\,CEU}$ located at the cell 2 may be allowed to use 0, 1, and 2 according to a condition. Since 3, 4, and 5 are belonging to B(1) among 3, 4, 5, and 11 which are remaining in the entire band except AB and B(3), and thus they can be used at all times. Here, since 3 and 4 are not used by CEU of the cell 3, they can be considered as interference-free bands.

In the region the dotted-lined circles of the cells 1 and 3 overlap, except the region where all three dotted-lined circles of the cells 1, 2, and 3, $UE_{3\text{-}1,\,CEU}$ located in the cell 3 may be allowed to use 0, 1, and 2 according to a condition. Since 5, 6, and 7 are belonging to B(1) among 3, 4, 5, and 11 which are remaining in the entire band except AB and B(3), and thus they can be used at all times. Here, since 6 and 7 are not used by CEU of the cell 2, they can be considered as interference-free bands.

In the region the dotted-lined circles of the cells 2 and 3 overlap, except the region where all three dotted-lined circles of the cells 1, 2, and 3, $UE_{2\text{-}1,\,CEU}$ located in the cell 2 may be allowed to use 0, 1, and 2 according to a condition. Since 3, 4, and 11 are belonging to B(3) among 3, 4, 5, and 11 which are remaining in the entire band except AB and B(2), and thus they can be used at all times. Here, since 3 and 4 are not used by CEU of the cell 1, they can be considered as interference-free bands.

In the region the dotted-lined circles of the cells 2 and 3 overlap, except the region where all three dotted-lined circles of the cells 1, 2, and 3, $UE_{2\text{-}3,\,CEU}$ located in the cell 2 may be allowed to use 0, 1, and 2 according to a condition. Since 3, 4, and 11 are belonging to B(3) among 3, 4, 5, and 11 which are remaining in the entire band except AB and B(2), and thus they can be used at all times. Here, since 3 and 4 are not used by CEU of the cell 1, they can be considered as interference-free bands.

In the region the dotted-lined circles of the cells 2 and 3 overlap, except the region where all three dotted-lined circles of the cells 1, 2, and 3, $UE_{3\text{-}2,\,CEU}$ located in the cell 3 may be allowed to use 0, 1, and 2 according to a condition. Since 6, 7, and 8 are belonging to B(2) among 5, 6, 7, and 8 which are remaining in the entire band except AB and B(3), and thus they can be used at all times. Here, since 6 and 7 are not used by CEU of the cell 1, they can be considered as interference-free bands.

In FIG. 12, since $UE_{2,\,ICU}$ of the cell 2 and $UE_{3,\,ICU}$ of the cell 3 are managed with an appropriate power, it can be regarded that these ICUs do not cause interference to $UE_{1,\,ICU}$ of the cell 1 in view of the cell 1, and $UE_{2,\,ICU}$ of the cell 2 and $UE_{3,\,ICU}$ of the cell 3 can use the entire band $\Omega$ like $UE_{1,\,ICU}$.

Embodiment 1-3

Like embodiment 1-1, B(i) which is the resource that a peripheral region (CEU) of a serving cell i (Cell_i) avoids being allocated is primarily defined. A band corresponding to B(i) is not generally used for CEU of the Cell_i, and some of B(i) are, additionally, allowed to be used according to a condition. Moreover, the entire band is allowed to be used for a central region (ICU) of the Cell_i under the precondition that ICU of the Cell_i is managed with an appropriate power and thus does not cause interference to CEU or ICU of an adjacent cell j.

For example, $UE_{1\text{-}2,\,CEU}$ uses primarily the entire band $\Omega$ except B(1), and selectively uses some of B(1). The selective use of part of B(1) is allowed when interference cancellation is possible or when exclusive use of the band can be assigned by inter-cell signaling.

In the current embodiment, in addition to Equations 1, 2 3, 4, and 5, equations below are used for representing a band available to CEU of the cell 1.

$$C1B_{1\text{-}2,CEU} = B(1) \cap B(2) \qquad \text{Equation 12}$$

$$C1B_{1\text{-}3,CEU} = B(1) \cap B(3) \qquad \text{Equation 13}$$

$$C1B_{1\text{-}23,CEU} = B(1) \cap [B(2) \cap B(3)] = CB_{1\text{-}2,CEU} \cap C1B_{1\text{-}3,CEU} \qquad \text{Equation 14}$$

Here, these equations represent resources selectively available to CEU of the cell 1.

Figure 14:
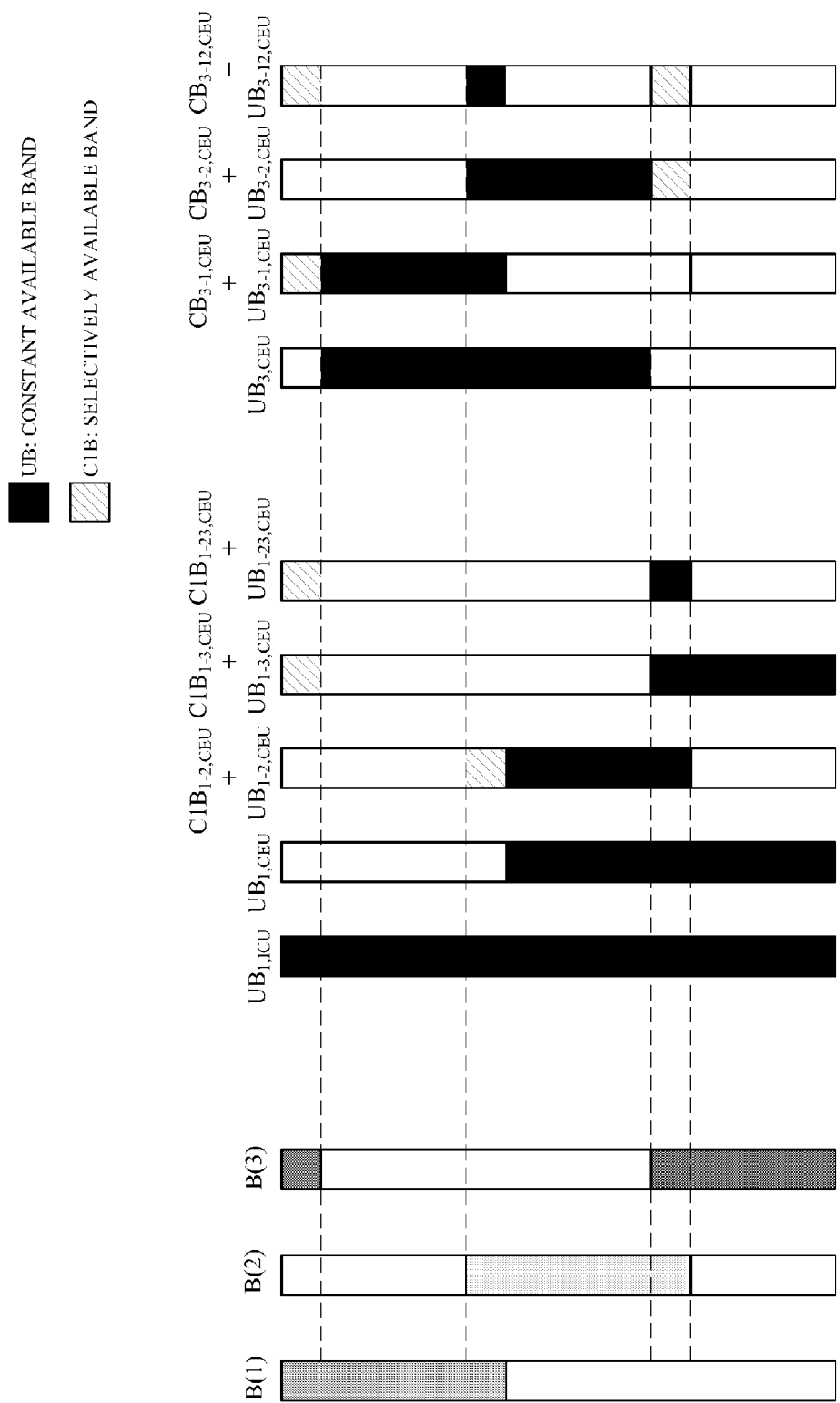
FIG. 14 illustrates resource bands available each region according to an exemplary embodiment 1-3.

FIG. 14 illustrates resource bands available to the respective regions according to the current exemplary embodiment.

Referring to FIG. 14, the central region ($UE_{1,\,ICU}$) of the cell 1 can use a resource corresponding $UB_{1,\,ICU}$. $UB_{1,\,ICU}$ may be the entire resource $\Omega$ allocated to the cell 1. The peripheral region ($UE_{1,\,CEU}$) of the cell 1 is allowed to primarily use a resource corresponding to $UB_{1,\,CEU}$. UB1, CEU may be resources remaining in the entire resource $\Omega$ except B(1). Moreover, the peripheral region ($UE_{1,\,CEU}$) of the cell 1 may selectively use a resource corresponding to C1B.

For example, on the border of the cell 1, $UE_{1\text{-}2,\,CEU}$ adjacent to the cell 2 can use a band corresponding to an intersection of $UB_{1,\,CEU}$ and B(2) at all times, and can selectively use $C1B_{1\text{-}2,\,CEU}$, i.e., a band corresponding to an intersection of B(1) and B(2) as represented by Equation 12.

In the same manner, on the border of the cell 1, $UE_{1\text{-}3,\,CEU}$ adjacent to the cell 3 can use a band corresponding to an intersection of $UB_{1,\,CEU}$ and B(3) at all times, and can selectively use $C1B_{1\text{-}3,\,CEU}$, i.e., a band corresponding to an intersection of B(1) and B(3) as represented by Equation 13.

Also, on the border of the cell 1, $UE_{1\text{-}23,\,CEU}$ adjacent to the cell 2 and the cell 3 can use a band corresponding to an intersection of $UB_{1,\,CEU}$, B(2) and B(3) at all times, and can selectively use $C1B_{1\text{-}23,\,CEU}$, i.e., a band corresponding to the intersection of the union of B(2) and B(3) and B(1), as represented by Equation 13.

Here, if all cells request to use C1B, there may generate one or two interference regions.

To avoid such interference, in one example, a cell is allowed to use C1B freely when the cell can provide interference cancellation, and in another example, exclusive use of C1B by one cell is informed to other cells using X2 interface, and the informed cells are prohibited from using C1B.

FIG. 8 illustrates resources belonging to the respective B(1), B(2), and B(3) in view of PRBs.

In FIG. 8, it is defined that B(1) of the cell 1 includes 0, 1, 2, 3, 4, and 5, B(2) of the cell 2 includes 4, 5, 6, 7, 8, and 9 and B(3) of the cell 3 includes 0, 1, 8, 9, 10, and 11. In addition, FIG. 15 illustrates PRBs available to each region.

Figure 15:
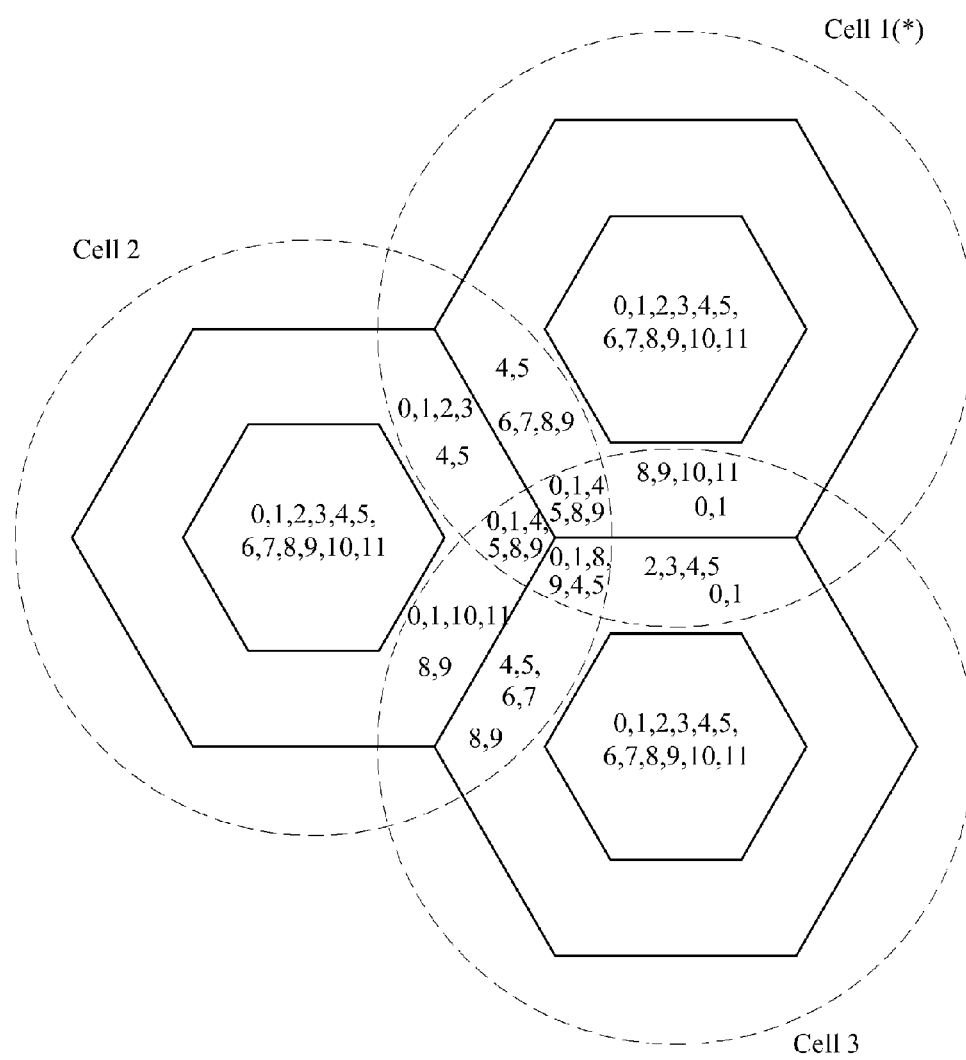
FIG. 15 illustrates the available resource bands and interference characteristics for each region according to the exemplary embodiment 1-3.

In FIG. 15, $UB_{1,\,ICU}$ of the cell 1 can use the entire band ranging from 0 to 11. Interference can be prevented by managing resources from 0 to 11 with an appropriate power.

In FIG. 15, in a region where all three dotted-lined circles of the cells 1, 2, and 3, $UE_{1-23, CEU}$ located in the cell 1 can use 8 and 9 at all times, which are commonly belonging to B(2) and B(3) from among the entire band Ω except B(1). In addition, 4 and 5 can be used selectively since they are commonly belonging to B(1) and B(2), and 0 and 1 can also be used selectively because they are commonly belonging to B(1) and B(3). Consequently, resources to be allocated to $UE_{1-23, CEU}$ can be 8, 9, 0, 1, 4, and 5. Among these resources, since 8 and 9 are not used by other cells, the probability of interference occurrence is very low, whereas the probability of interference occurrence with respect to 0, 1, 4, and 5 is relatively high since they can be used by $UE_{2-13, CEU}$ or $UE_{3-12, CEU}$.

In FIG. 15, in the region the dotted-lined circles of the cells 1 and 2 overlap, except the region where all three dotted-lined circles of the cells 1, 2, and 3, $UE_{1-2, CEU}$ located in the cell 1 can use 6, 7, 8, and 9 at all times since they are commonly belonging to B(2) and the entire band Ω except B(1). In addition, 4 and 5 can be used selectively since they are commonly belonging to B(1) and B(2). Thus, resources to be allocated to $UE_{1-2, CEU}$ can be 6, 7, 8, 9, 4, and 5. From among these resources, since 6, 7, 8, and 9 are not used by CEU of the cell 2, it can be understood that the probability of interference occurrence is very low, and 4 and 5 may cause interference since they are selectively used by CEU of the cell 2.

In FIG. 15, in a region the dotted-lined circles of the cells 1 and 3 overlap, except the region where all three dotted-lined circles of the cells 1, 2, and 3, $UE_{1-3, CEU}$ located in the cell 1 can use 8, 9, 10, and 11 at all times since they are commonly belonging to B(3) and the entire band Ω except B(1). In addition, 0 and 1 can be used selectively since they are commonly belonging to B(1) and B(3). Thus, resources to be allocated to $UE_{1-3, CEU}$ can be 0, 1, 8, 9, 10, and 11. From among these resources, since 8, 9, 10, and 11 are not used by CEU of the cell 3, it can be understood that the probability of interference occurrence is considerably low, and 0 and 1 may cause interference since they are selectively used by CEU of the cell 3.

In FIG. 15, in the region where all three dotted-lined circles of the cells 1, 2, and 3, $UE_{2-13, CEU}$ located in the cell 2 can use 0 and 1 at all times since they are commonly belonging to B(1) and B(3) in the entire band Ω except B(2). In addition, 4 and 5 can be used selectively since they are commonly belonging to B(2) and B(1), and 8 and 9 can also be selectively used since they are commonly belonging to B(2) and B(3). Thus, resources to be allocated to $UE_{2-13, CEU}$ can be 0, 1, 4, 5, 8, and 9. From among these resources, since 0 and 1 are not used by CEU of another cell, it can be understood that the probability of interference occurrence is significantly low, and 4, 5, 8, and 9 may cause interference since they are used by the adjacent $UE_{1-23, CEU}$ or $UE_{3-12, CEU}$.

In FIG. 15, in the region where all three dotted-lined circles of the cells 1, 2, and 3, $UE_{3-12, CEU}$ located in the cell 3 can use 4 and 5 at all times since they are commonly belonging to B(1) and B(2) in the entire band Ω except B(3). In addition, 0 and 1 can be used selectively since they are commonly belonging to B(3) and B(1), and 8 and 9 can also be selectively used since they are commonly belonging to B(3) and B(2). Hence, resources to be allocated to $UE_{3-12, CEU}$ can be 0, 1, 4, 5, 8, and 9. From among these resources, since 4 and 5 are not used by CEU of another cell, the probability of interference occurrence is significantly low, and 0, 1, 8, and 9 may cause interference since they may be used by the adjacent $UE_{1-23, CEU}$ or $UE_{2-13, CEU}$.

In FIG. 15, in the region the dotted-lined circles of the cells 1 and 2 overlap, except the region where all three dotted-lined circles of the cells 1, 2, and 3, $UE_{2-1, CEU}$ located in the cell 2 can use 0, 1, 2, and 3 at all times since they are commonly belonging to B(1) and the entire band Ω except B(2). In addition, 4 and 5 can be selectively used since they are commonly belonging to B(2) and B(1). Hence, resources to be allocated to $UE_{2-1, CEU}$ can be 0, 1, 2, 3, 4, and 5. From among these resources, since 0, 1, 2, and 3 are not used by CEU of the cell 1, the probability of interference occurrence is significantly low, and 4 and 5 may cause interference since they can be used by CEU of the cell 1.

In FIG. 15, in the region the dotted-lined circles of the cells 1 and 3 overlap, except the region where all three dotted-lined circles of the cells 1, 2, and 3, $UE_{3-1, CEU}$ located in the cell 3 can use 2, 3, 4, and 5 at all times since they are commonly belonging to B(1) and the entire band Ω except B(3). In addition, 0 and 1 can be selectively used since they are commonly belonging to B(3) and B(1). Hence, resources to be allocated to $UE_{3-1, CEU}$ can be 0, 1, 2, 3, 4, and 5. From among these resources, since 2, 3, 4, and 5 are not used by CEU of the cell 1, it is considered that the probability of interference occurrence is significantly low, and 0 and 1 may cause interference since they can be used by CEU of the cell 1.

In FIG. 15, in the region the dotted-lined circles of the cells 1 and 2 overlap, except the region where all three dotted-lined circles of the cells 1, 2, and 3, $UE_{2-1, CEU}$ located in the cell 2 can use 0, 1, 2, and 3 at all times since they are commonly belonging to B(1) and the entire band Ω except B(2). In addition, 4 and 5 can be selectively used since they are commonly belonging to B(2) and B(1). Hence, resources to be allocated to $UE_{2-1, CEU}$ can be 0, 1, 2, 3, 4, and 5. From among these resources, since 0, 1, 2, and 3 are not used by CEU of the cell 1, the probability of interference occurrence is significantly low, and 4 and 5 may cause interference since they can be used by CEU of the cell 1. In FIG. 15, in the region the dotted-lined circles of the cells 1 and 3 overlap, except the region where all three dotted-lined circles of the cells 1, 2, and 3, $UE_{3-1, CEU}$ located in the cell 3 can use 2, 3, 4 and 5 at all times since they are commonly belonging to B(1) and the entire band Ω except B(3). In addition, 0 and 1 can be selectively used since they are commonly belonging to B(3) and B(1). Hence, resources to be allocated to $UE_{3-1, CEU}$ can be 0, 1, 2, 3, 4, and 5. From among these resources, since 2, 3, 4, and 5 are not used by CEU of the cell 1, the probability of interference occurrence can be considered as being very low, and 0 and 1 may cause interference since they can be used by CEU of the cell 1.

In FIG. 15, in the region the dotted-lined circles of the cells 2 and 3 overlap, except the region where all three dotted-lined circles of the cells 1, 2, and 3, $UE_{2-3, CEU}$ located in the cell 2 can use 0, 1, 10, and 11 at all times since they are commonly belonging to B(3) and the entire band Ω except B(2). In addition, 8 and 9 can be selectively used since they are commonly belonging to B(2) and B(3). Hence, resources to be allocated to $UE_{2-3, CEU}$ can be 0, 1, 8, 9, 10, and 11. From among these resources, since 0, 1, 10, and 11 are not used by CEU of the cell 3, the probability of interference occurrence is significantly low, and 8 and 9 may cause interference since they can be used by CEU of the cell 3.

In FIG. 15, in the region the dotted-lined circles of the cells 2 and 3 overlap, except the region where all three dotted-lined circles of the cells 1, 2, and 3, $UE_{3-2, CEU}$ located in the cell 3 can use 4, 5, 6, and 7 at all times since they are commonly belonging to B(2) and the entire band Ω except B(3). Additionally, 8 and 9 can be selectively used since they are commonly belonging to B(3) and B(2). Consequently, resources to be allocated to $UE_{3-2, CEU}$ can be 4, 5, 6, 7, 8, and 9. From among these resources, since 4, 5, 6, and 3 are not used by CEU of the cell 2, it can be considered that the probability of interference occurrence is significantly low, and 8 and 9 may cause interference since they can be used by CEU of the cell 2.

In FIG. 15, $UE_{2,\,ICU}$ at the center of the cell 2 and $UE_{3,\,ICU}$ at the center of the cell 3 also can use the entire bandwidth like $UE_{1,\,ICU}$ of the cell 1.

Embodiment 1-4

The embodiment 1-4 is based on the embodiment 1-3. A difference from the embodiment 1-3 is Equation 14 in the embodiment 1-3 which is modified as below:

$$C1B_{1\text{-}23,CEU} = B(1) \cap B(2) \cap B(3) \qquad \text{Equation (15)}$$

Figure 16:
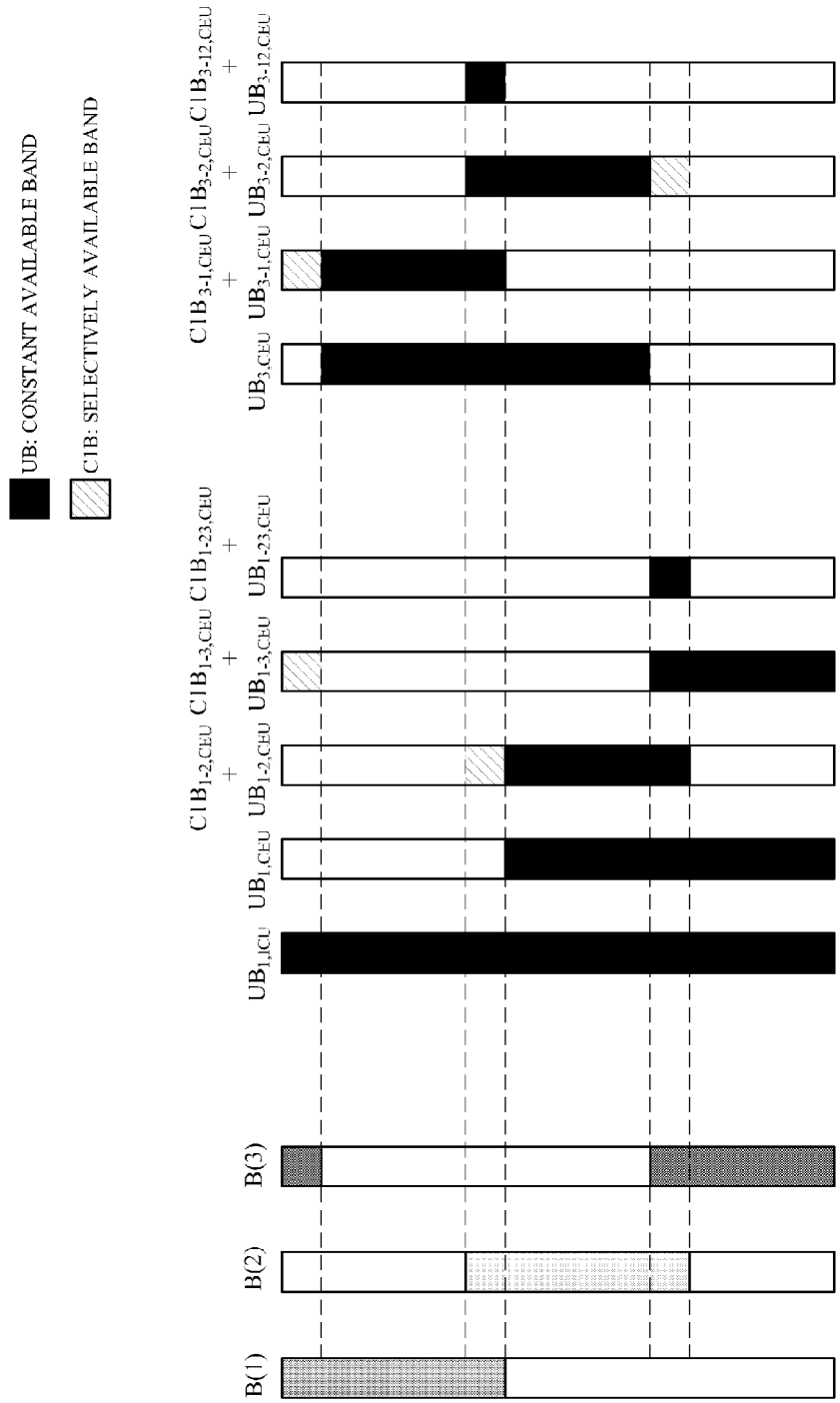
FIG. 16 illustrates resource bands available to each region according to an exemplary embodiment 1-4.

FIG. 16 illustrates resources available to each region according to the current embodiment.

Referring to FIG. 16, $UE_{1,\,ICU}$ of the cell 1 can use a resource corresponding to $UB_{1,\,ICU}$. $UB_{1,\,ICU}$ may be the entire resource $\Omega$ allocated to the cell 1. $UE_{1,\,CEU}$ of the cell 1 which is a peripheral region of the cell 1 can primarily use $UB_{1,\,CEU}$. $UB_{1,\,CEU}$ may be resources corresponding to bands of the entire resource $\Omega$ except B(1). In addition, $UE_{1,\,CEU}$ of the cell 1 can selectively use resources corresponding to C1B.

For example, on the border of the cell 1, $UE_{1\text{-}2,\,CEU}$ adjacent to the cell 2 can use a band corresponding to the intersection of $UB_{1,\,CEU}$ and B(2) at all times, and can selectively use $C1B_{1\text{-}2,\,CEU}$, i.e., the intersection of B(1) and B(2) as represented by Equation 12.

In the same manner, on the border of the cell 1, $UE_{1\text{-}3,\,CEU}$ adjacent to the cell 3 can use bands corresponding to the intersection of $UB_{1,\,CEU}$ and B(3) at all times, and can selectively use $C1B_{1\text{-}3,\,CEU}$, i.e., the intersection of B(1) and B(3) as represented by Equation 13.

On the border of the cell 1, $UE_{1\text{-}23,\,CEU}$ adjacent to the cell 2 and the cell 3 can use a band corresponding to the intersection of $UB_{1,\,CEU}$, B(2) and B(3) at all times, and can selectively use $C1B_{1\text{-}23,\,CEU}$, i.e., the intersection of B(1), B(2) and B(3). In this case, since there is no common band between B(1), B(2), and B(2), $C1B_{1\text{-}23,\,CEU}$ does not have a corresponding band.

When all cells 1, 2, and 3 request to use C1B, there may occur one or two interferences. To suppress such interferences, all cells are allowed to freely use C1B if they provide interference cancellation, or an exclusive use of C1B by one cell is notified to the other cells through an X2 interface and the other cells receiving the notification are prohibited from the use of C1B.

The resources available and unavailable to the respective cells 1, 2, and 3 are shown in FIG. 8 on a PRB basis.

In FIG. 8, B(1) of the cell 1 includes 0, 1, 2, 3, 4, and 5, B(2) of the cell 2 includes 4, 5, 6, 7, 8, and 9, and B(3) of the cell 3 includes 0, 1, 8, 9, 10, and 11. In addition, FIG. 17 illustrates available PRBs for each cell according to the current embodiment.

Figure 17:
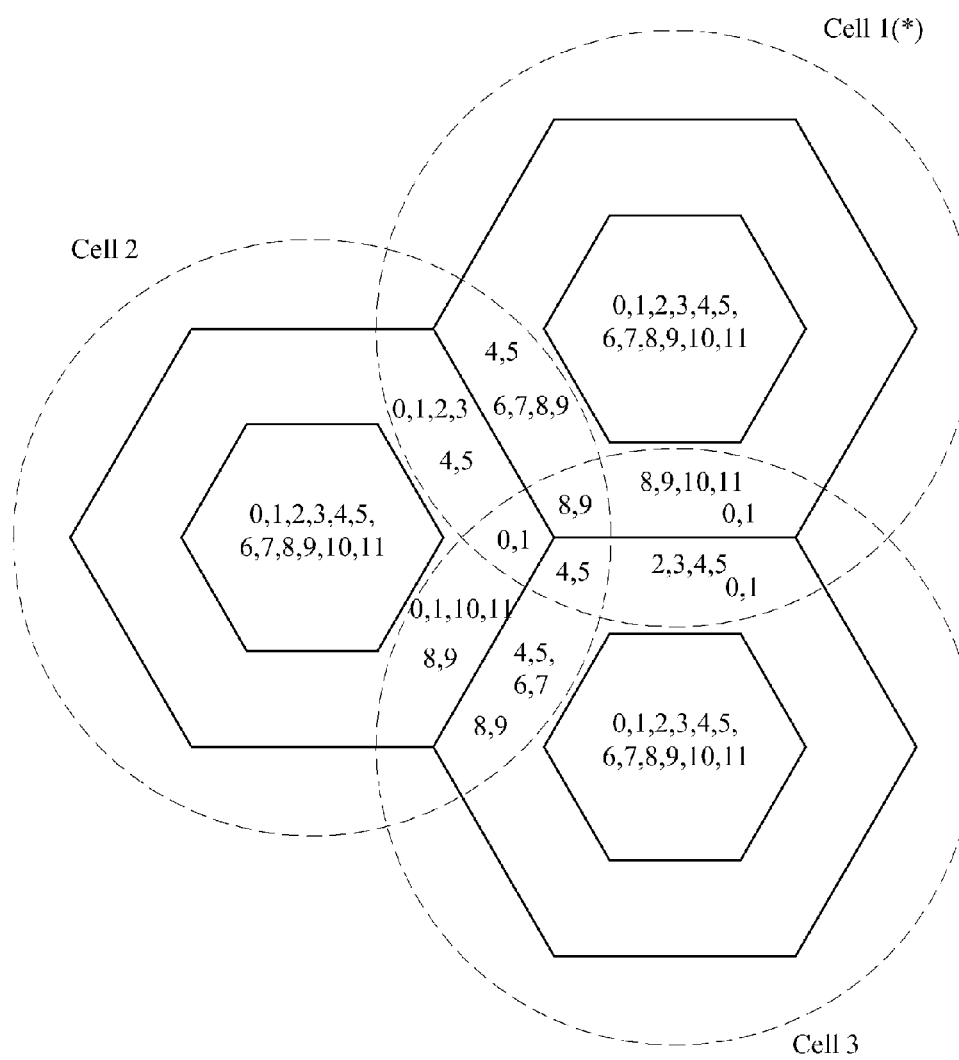
FIG. 17 illustrates the available resource bands and interference characteristics for each region according to the exemplary embodiment 1-4.

In FIG. 17, $UE_{1,\,ICU}$ at the center of the cell 1 can use the entire bands from 0 to 11. The resources from 0 to 11 can be managed with an appropriate power in order to prevent interference.

In FIG. 17, in a region where all three dotted-lined circles of the cells 1, 2, and 3, $UE_{1\text{-}23,\,CEU}$ located in the cell 1 can use 8 and 9 at all times since they are commonly belonging to B(2), B(3) and the entire band $\Omega$ except B(1). Additionally, a conditionally available band corresponds to $C1B_{1\text{-}23,\,CEU}$ as represented by Equation 15, but there is no corresponding band in FIG. 17. Thus, 8 and 9 are possible to be allocated to $C1B_{1\text{-}23,\,CEU}$, and they are not used by CEUs of other cells, the probability of interference occurrence is significantly low.

In FIG. 17, in a region the dotted-lined circles of the cells 1 and 2 overlap, except the region where all three dotted-lined circles of the cells 1, 2, and 3, $UE_{1\text{-}2,\,CEU}$ located in the cell 1 can use 6, 7, 8, and 9 7 at all times since they are commonly belonging to B(2) and the entire band $\Omega$ except B(1). Additionally, 4 and 5 can be selectively used since they are commonly belonging to B(1) and B(2). Accordingly, resources to be allocated to $UE_{1\text{-}2,\,CEU}$ can be 6, 7, 8, 9, 4, and 5. From among these resources, since 6, 7, 8, and 9 are not used by CEU of the cell 2, it can be considered that the probability of interference occurrence is significantly low, and 4 and 5 may cause interference since they can be conditionally used by CEU of the cell 2.

In FIG. 17, in a region the dotted-lined circles of the cells 1 and 3 overlap, except the region where all three dotted-lined circles of the cells 1, 2, and 3, $UE_{1\text{-}3,\,CEU}$ located in the cell 1 can use 8, 9, 10, and 11 at all times since they are commonly belonging to B(3) and the entire band $\Omega$ except B(1). Additionally, 0 and 1 can be selectively used since they are commonly belonging to B(1) and B(3). Hence, resources to be allocated to $UE_{1\text{-}3,\,CEU}$ can be 0, 1, 8, 9, 10, and 11. From among these resources, since 8, 9, 10, and 11 are not used by CEU of the cell 3, it can be considered that the probability of interference occurrence is very low, and 0 and 1 may cause interference since they can be used by CEU of the cell 3.

In FIG. 17, in the region where all three dotted-lined circles of the cells 1, 2, and 3, $UE_{2\text{-}13,\,CEU}$ located in the cell 2 can use 0 and 1 at all times since they are commonly belonging to B(1), B(3) and the entire band $\Omega$ except B(2). Additionally, a conditionally available band corresponds to $C1B_{2\text{-}13,\,CEU}$ as represented by Equation 15, but there is no corresponding band in FIG. 17. Hence, resources to be allocated to $UE_{2\text{-}13,\,CEU}$ can be 0 and 1, and since they are not used by CEUs of the other cells, the probability of interference occurrence is very low.

In FIG. 17, in the region where all three dotted-lined circles of the cells 1, 2, and 3, $UE_{3\text{-}12,\,CEU}$ located in the cell 3 can use 4 and 5 at all times since they are commonly belonging to B(1), B(2) and the entire band $\Omega$ except B(3). In addition, a conditionally available band corresponds to $C1B_{3\text{-}12,\,CEU}$ as represented by Equation 15, but there is no corresponding band in FIG. 17. Thus, resources to be allocated to $UE_{3\text{-}12,\,CEU}$ can be 4 and 5 and because they are not used by CEUs of the other cells, the probability of interference occurrence is significantly low.

In FIG. 17, in a region the dotted-lined circles of the cells 1 and 2 overlap, except the region where all three dotted-lined circles of the cells 1, 2, and 3, $UE_{2\text{-}1,\,CEU}$ located in the cell 2 can use 0, 1, 2, and 3 at all times since they are commonly belonging to B(1) and the entire band $\Omega$ except B(2). Additionally, 4 and 5 can be selectively used since they are commonly belonging to B(2) and B(1). Hence, resources to be allocated to $UE_{2\text{-}1,\,CEU}$ can be 0, 1, 2, 3, 4, and 5. From among these resources, because 0, 1, 2, and 3 are not used by CEU of the cell 1, it can be regarded that the probability of interference occurrence is very low, and 4 and 5 may cause interference since they can be selectively used by CEU of the cell 1.

In FIG. 17, in a region the dotted-lined circles of the cells 1 and 3 overlap, except the region where all three dotted-lined circles of the cells 1, 2, and 3, $UE_{3\text{-}1,\,CEU}$ located in the cell 3 can use 2, 3, 4, and 5 at all times since they are commonly belonging to B(1) and the entire band $\Omega$ except B(3). Additionally, 0 and 1 can be selectively used since they are commonly belonging to B(3) and B(1). Hence, resources to be allocated to $UE_{3\text{-}1,\,CEU}$ can be 0, 1, 2, 3, 4, and 5. From among these resources, because 2, 3, 4 and 5 are not used by CEU of the cell 1, it can be regarded that the probability of interference occurrence is very low, and 0 and 1 may cause interference since they can be selectively used by CEU of the cell 1.

In FIG. 17, in a region the dotted-lined circles of the cells 2 and 3 overlap, except the region where all three dotted-lined circles of the cells 1, 2, and 3, $UE_{2\text{-}3,\ CEU}$ located in the cell 2 can use 0, 1, 10, and 11 at all times since they are commonly belonging to B(3) and the entire band $\Omega$ except B(2). Additionally, 8 and 9 can be selectively used since they are commonly belonging to B(2) and B(3). Consequently, resources to be allocated to $UE_{2\text{-}3,\ CEU}$ can be 0, 1, 8, 9, 10, and 11. From among these resources, because 0, 1, 10 and 11 are not used by CEU of the cell 3, it can be regarded that the probability of interference occurrence is very low, and 8 and 9 may cause interference since they can be selectively used by CEU of the cell 3.

In FIG. 17, in a region the dotted-lined circles of the cells 2 and 3 overlap, except the region where all three dotted-lined circles of the cells 1, 2, and 3, $UE_{3\text{-}2,\ CEU}$ located in the cell 3 can use 4, 5, 6, and 7 at all times since they are commonly belonging to B(2) and the entire band $\Omega$ except B(3). Additionally, 8 and 9 can be selectively used since they are commonly belonging to B(3) and B(2). Hence, resources to be allocated to $UE_{3\text{-}2,\ CEU}$ can be 4, 5, 6, 7, 8, and 9. From among these resources, because 4, 5, 6, and 7 are not used by CEU of the cell 2, it can be regarded that the probability of interference occurrence is very low, and 8 and 9 may cause interference since they can be selectively used by CEU of the cell 2.

In FIG. 17, $UE_{2,\ ICU}$ of the cell 2 and $UE_{3,\ ICU}$ of the cell 3 can use the entire band like $UE_{1,\ ICU}$ of the cell 1 does.

Embodiment 1-5

In the current embodiment, a common unused band AXB is defined, which are not used by all cells, and B'(i) which is a band unavailable to each cell is defined in the entire band $\Omega$ except the AXB. That is, in the above-described embodiments, B(i) can be represented by the sum of AXB and B'(i).

For example, ICU located at the center of a cell uses the entire band, and CEU located at a peripheral region of the cell uses the entire band except B'(i) and AXB, but can selectively use some of B'(i) or AXB.

In the use of some of B'(i) or AXB, it needs to be considered that interference cancellation is possible or that the exclusive use by one cell can be ensured by inter-cell signaling.

Figure 18:
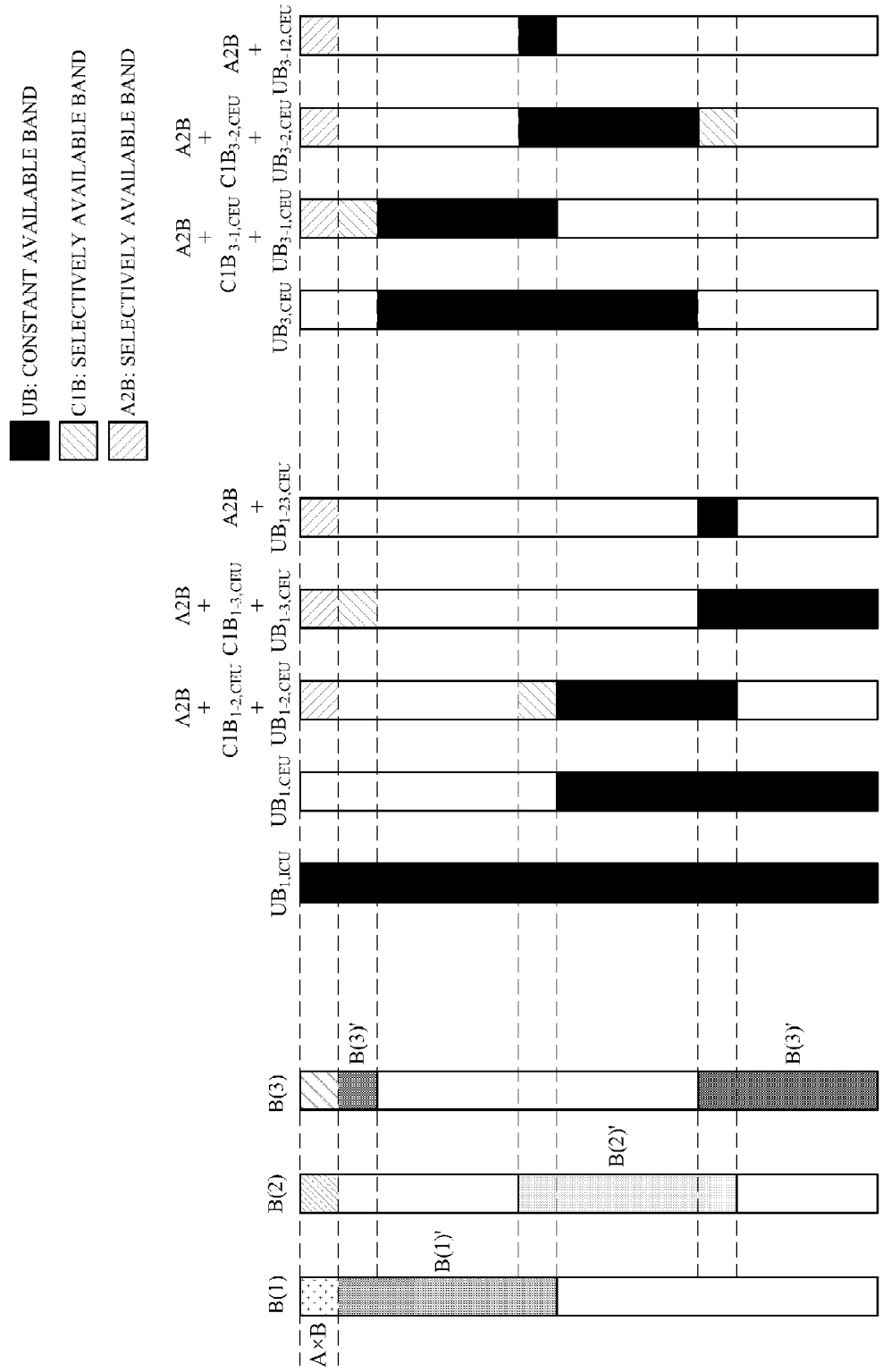
FIG. 18 illustrates resource bands available to each region according to an exemplary embodiment 1-5.

FIG. 18 illustrates resources available to the respective cells 1, 2, and 3.

Referring to FIG. 18, B(1), B(2), and B(3) denote bands unavailable to the respective cells 1, 2, and 3. Therefore, B(1) may be represented by AXB+B'(1). UB indicates a resource band which is always available to the cell, and each of C1B and A2B indicate a resource band selectively available to the cell. For example, C1B may be a part of B'(i), and A2B may be AXB.

In specific, the above resource bands can be represented by equations below.

$$AXB = \text{"common frequency-unavailable region"} \quad \text{Equation 16}$$

$$B(1) = AXB + B'(1) \quad \text{Equation 17}$$

$$B(2) = AXB + B'(2) \quad \text{Equation 18}$$

$$B(3) = AXB + B'(3) \quad \text{Equation 19}$$

$$UB_{1,ICU} = \Omega \quad \text{Equation 20}$$

$$UB_{1,CEU} = \Omega - [AXB + B'(1)] \quad \text{Equation 21}$$

$$UB_{1\text{-}2,CEU} = UB_{1,CEU} \cap B'(2) \quad \text{Equation 22}$$

$$UB_{1\text{-}3,CEU} = UB_{1,CEU} \cap B'(3) \quad \text{Equation 23}$$

$$UB_{1\text{-}23,CEU} = UB_{1,CEU} \cap B'(2) \cap B'(3) \quad \text{Equation 24}$$

$$C1B_{1\text{-}2,CEU} = B'(1) \cap B'(2) \quad \text{Equation 25}$$

$$C1B_{1\text{-}3,CEU} = B'(1) \cap B'(3) \quad \text{Equation 26}$$

$$C1B_{1\text{-}23,CEU} = B'(1) \cap B'(2) \cap B'(3) \quad \text{Equation 27}$$

For example, on the border of the cell 1, $UE_{1\text{-}2,\ CEU}$ adjacent to the cell 2 can use a band corresponding to the intersection of $UB_{1,\ CEU}$ and B'(2) constantly, and can selectively use $C1B_{1\text{-}2,\ CEU}$, i.e., a band corresponding to the intersection of B'(1) and B'(2) as represented by Equation 25. Also, $UE_{1\text{-}2,\ CEU}$ can selectively use A2B which corresponds to AXB.

In the same manner, on the border of the cell 1, $UE_{1\text{-}3,\ CEU}$ adjacent to the cell 3 can constantly use a band corresponding to the intersection of $UB_{1,\ CEU}$ and B'(3) and can selectively use $C1B_{1\text{-}3,\ CEU}$, i.e., a band corresponding to the intersection of B'(1) and B'(3) as represented by Equation 26. In addition, A2B which corresponds to AXB can be used selectively.

Additionally, on the border of the cell 1, $UE_{1\text{-}23,\ CEU}$ adjacent to both the cells 2 and 3 can use a band corresponding to the intersection of $UB_{1,\ CEU}$, B'(2) and B'(3) at all times, and can selectively use $C1B_{1\text{-}23,\ CEU}$, i.e., the intersection of B'(1), B'(2), and B'(3) as represented by Equation 27. In this case, since there is no common region between B'(1), B'(2), and B'(3), $C1B_{1\text{-}3,CEU}$ does not have a corresponding band. Furthermore, A2B which corresponds to AXB can be selectively used.

Here, if all cells request to use C1B or A2B, there may occur one or more interferences, and hence, measures to avoid such interference are needed in using the selectively available band C1B or A2B.

In one example, C1B or A2B is allowed to be freely used when interference cancellation is possible. In another example, exclusive use of C1B or A2B by a cell is notified to the other cells and the other cells receiving the notification are prohibited from the use of the band.

FIG. 20 is a table showing resources which are available and unavailable to the respective cells in view of PRBs.

In FIG. 20, B(1) of the cell 1 includes 0, 1, 2, 3, 4, 5, and 6, B(2) of the cell 2 includes 0, 1, 2, 6, 7, 8, and 9, and B(3) of the cell 3 includes 0, 1, 2, 3, 4, 9, 10, and 11. AXB includes 0, 1, and 2. As the result, B'(1) comes to include 3, 4, 5, and 6.

Figure 19:
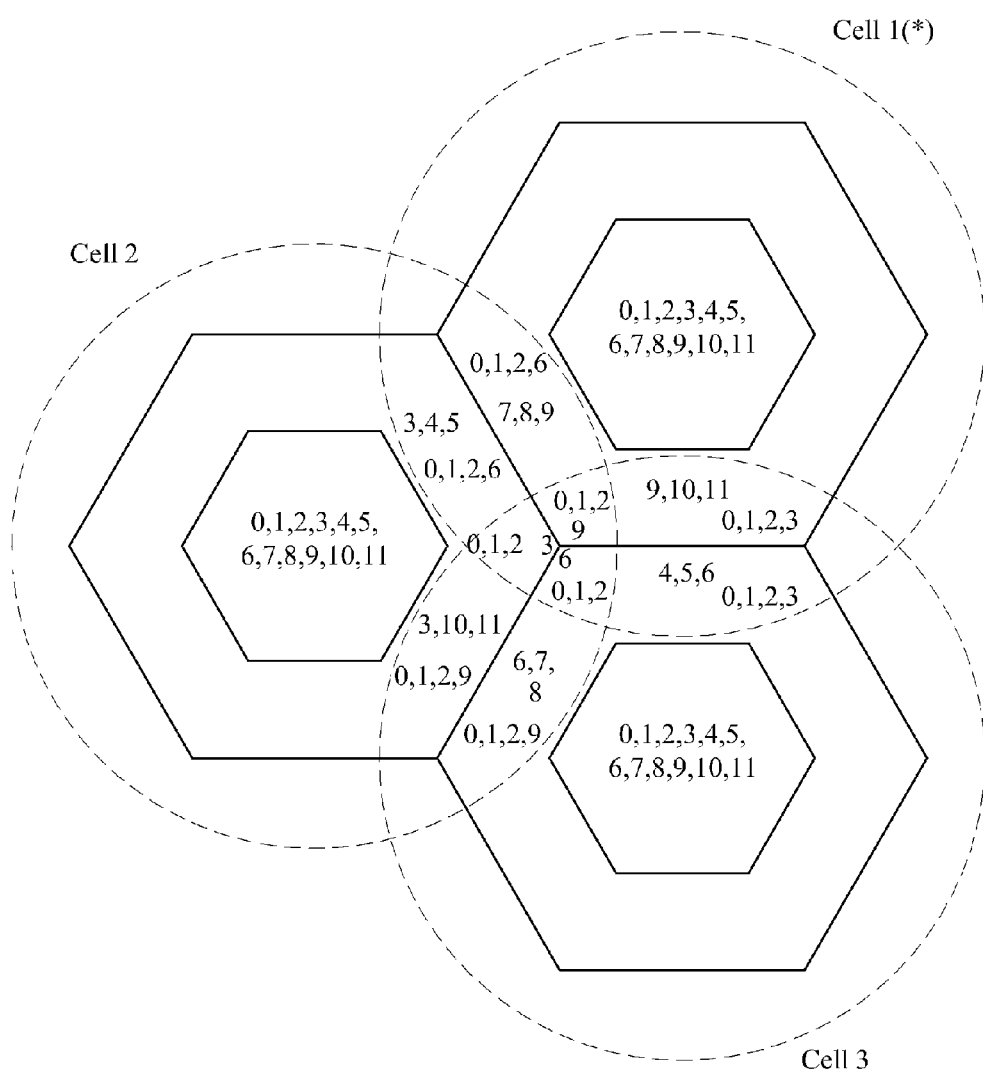
FIG. 19 illustrates the available resource bands and interference characteristics for each region according to the exemplary embodiment 1-5.

FIG. 19 illustrates available PRBs of each cell according to the current embodiment.

In FIG. 19, in a region where all three dotted-lined circles of the cells 1, 2, and 3, $UE_{1\text{-}23,\ CEU}$ located in the cell 1 can use 9 constantly since it is commonly belonging to B'(2), B'(3) and the entire band $\Omega$ except B(1). Additionally, a first selectively available band is $C1B_{1\text{-}23,CEU}$, which does not have a corresponding band. A second selectively available band is AXB which includes 0, 1, and 2. Consequently, resources allocated to $UE_{1\text{-}23,\ CEU}$ can be 0, 1, 2, and 9. From among these resources, because 9 is not used by CEUs of the other cells, the probability of interference occurrence is very low, and 0, 1, and 2 may cause interference since they can be selectively used by CEUs of the other cells.

In FIG. 19, in a region the dotted-lined circles of the cells 1 and 2 overlap, except the region where all three dotted-lined circles of the cells 1, 2, and 3, $UE_{1\text{-}2,\ CEU}$ located in the cell 1 can use 7, 8, and 9 constantly since they are commonly belonging to B'(2) and the entire band Ω except B(1). Additionally, 6 can be selectively used since it is commonly belonging to B'(1) and B'(2). Also, 0, 1, and 2 can be selectively used because they are included in AXB. Hence, resources to be allocated to $UE_{1-2,\ CEU}$ can be 0, 1, 2, 6, 7, 8, and 9. From among these resources, because 7, 8, and 9 are not used by CEU of the cell 2, it is reasonable to consider that the probability of interference occurrence is very low, and 0, 1, 2, and 6 may cause interference since they can be selectively used by CEU of the cell 2.

In FIG. 19, in a region the dotted-lined circles of the cells 1 and 3 overlap, except the region where all three dotted-lined circles of the cells 1, 2, and 3, $UE_{1-3,\ CEU}$ located in the cell 1 can use 9, 10, and 11 at all times since they are commonly belonging to B'(3) and the entire band Ω except B(1). In addition, 3 can be selectively used since it is commonly belonging to B'(1) and B'(3). Moreover, 0, 1, and 2 can be selectively used since they are belonging to AXB. Consequently, resources to be allocated to $UE_{1-3,\ CEU}$ can be 0, 1, 2, 3, 9, 10, and 11. From among these resources, since 9, 10, and 11 are not used by CEU of the cell 3, it may be regarded that the probability of interference occurrence is significantly low, and 0, 1, 2, and 3 may cause interference since they can be selectively used by CEU of the cell 3.

In FIG. 19, in the region where all three dotted-lined circles of the cells 1, 2, and 3, $UE_{2-13,\ CEU}$ located in the cell 2 can use 3 at all times since it is commonly belonging to B'(1), B'(3) and the entire band Ω except B(2). Additionally, a first selectively available band is $C1B_{2-13,CEU}$, as represented by Equation 27, which does not have corresponding band. A second selectively available band is AXB which includes 0, 1, and 2. Consequently, resources to be allocated to $UE_{2-13,\ CEU}$ can be 0, 1, 2, and 3. From among these resources, since 3 is not used by CEUs of the other cells, the probability of interference occurrence is significantly low, and 0, 1, and 2 may cause interference since they can be selectively used by CEUs of any other cells.

In FIG. 19, in the region where all three dotted-lined circles of the cells 1, 2, and 3, $UE_{3-12,\ CEU}$ located in the cell 3 can use 6 at all times since it is commonly belonging to B'(1), B'(2) and the entire band Ω except B(3). Additionally, a first selectively available band is $C1B_{3-12,CEU}$, as represented by Equation 27, which does not have a corresponding band. A second selectively available band is AXB which includes 0, 1, and 2. Consequently, resources to be allocated to $UE_{3-12,\ CEU}$ can be 0, 1, 2, and 6. From among these resources, since 6 is not used by CEUs of other cells, it may be regarded that the probability of interference occurrence is significantly low, and 0, 1, and 2 may cause interference since they can be selectively used by CEUs of the other cells.

In FIG. 19, in a region the dotted-lined circles of the cells 2 and 3 overlap, except the region where all three dotted-lined circles of the cells 1, 2, and 3, $UE_{2-1,\ CEU}$ located in the cell 2 can use 3, 4, and 5 at all times since they are commonly belonging to B'(1) and the entire band Ω except B(2). In addition, 6 can be selectively used because it is commonly belonging to B'(2) and B'(1). Also, 0, 1, and 2 which are belonging to AXB can be selectively used. Thus, resources to be allocated to $UE_{2-1,\ CEU}$ can be 0, 1, 2, 3, 4, 5, and 6. From among these resources, since 3, 4, and 5 are not used by CEU of the cell 1, it is considered that the probability of interference occurrence is significantly low, and 0, 1, 2, and 6 may cause interference since they can be selectively used by CEU of the cell 1.

In FIG. 19, in a region the dotted-lined circles of the cells 1 and 3 overlap, except the region where all three dotted-lined circles of the cells 1, 2, and 3, $UE_{3-1,\ CEU}$ located in the cell 3 can use 4, 5, and 6 at all times since they are commonly belonging to B'(1) and the entire band Ω except B(3). In addition, 3 can be selectively used because it is commonly belonging to B'(3) and B'(1). Also, 0, 1, and 2 which are belonging to AXB can be selectively used. Hence, resources to be allocated to $UE_{3-1,\ CEU}$ can be 0, 1, 2, 3, 4, 5, and 6. From among these resources, since 4, 5, and 6 are not used by CEU of the cell 1, it is considered that the probability of interference occurrence is significantly low, and 0, 1, 2, and 3 may cause interference since they can be selectively used by CEU of the cell 1.

In FIG. 19, in a region the dotted-lined circles of the cells 2 and 3 overlap, except the region where all three dotted-lined circles of the cells 1, 2, and 3, $UE_{2-3,\ CEU}$ located in the cell 2 can use 3, 10, and 11 at all times since they are commonly belonging to B'(3) and the entire band Ω except B(2). In addition, 9 can be selectively used because it is commonly belonging to B'(2) and B'(3). Also, 0, 1, and 2 which are belonging to AXB can be selectively used. Hence, resources to be allocated to $UE_{2-3,\ CEU}$ can be 0, 1, 2, 3, 9, 10, and 11. From among these resources, since 3, 10, and 11 are not used by CEU of the cell 3, it is considered that the probability of interference occurrence is significantly low, and 0, 1, 2, and 9 may cause interference since they can be selectively used by CEU of the cell 3.

In FIG. 19, in a region the dotted-lined circles of the cells 2 and 3 overlap, except the region where all three dotted-lined circles of the cells 1, 2, and 3, $UE_{3-2,\ CEU}$ located in the cell 3 can use 6, 7, and 8 at all times since they are commonly belonging to B'(2) and the entire band Ω except B(3). In addition, 9 can be selectively used because it is commonly belonging to B'(3) and B'(2). Also, 0, 1, and 2 which are belonging to AXB can be selectively used. Therefore, resources to be allocated to $UE_{3-2,\ CEU}$ can be 0, 1, 2, 6, 7, 8, and 9. From among these resources, since 6, 7, and 8 are not used by CEU of the cell 2, it is considered that the probability of interference occurrence is significantly low, and 0, 1, 2, and 9 may cause interference since they can be selectively used by CEU of the cell 2.

In FIG. 19, $UE_{2,\ ICU}$ of the cell 2 and $UE_{3,\ ICU}$ of the cell 3 can use the entire band like $UE_{1,\ ICU}$ of the cell 1.

Embodiment 1-6

The current embodiment is implemented primarily using the same scheme as the embodiment 1-5. However, in the region where more than three cells overlap, AXB is not used.

For example, the central region (ICU) of a cell uses the entire band, and a peripheral region (CEU) of the cell uses basically the entire band except for B'(i) and AXB, and selectively uses a part of B'(i) or AXB. As described above, AXB is not used in the region where more than three cells overlap.

Figure 21:
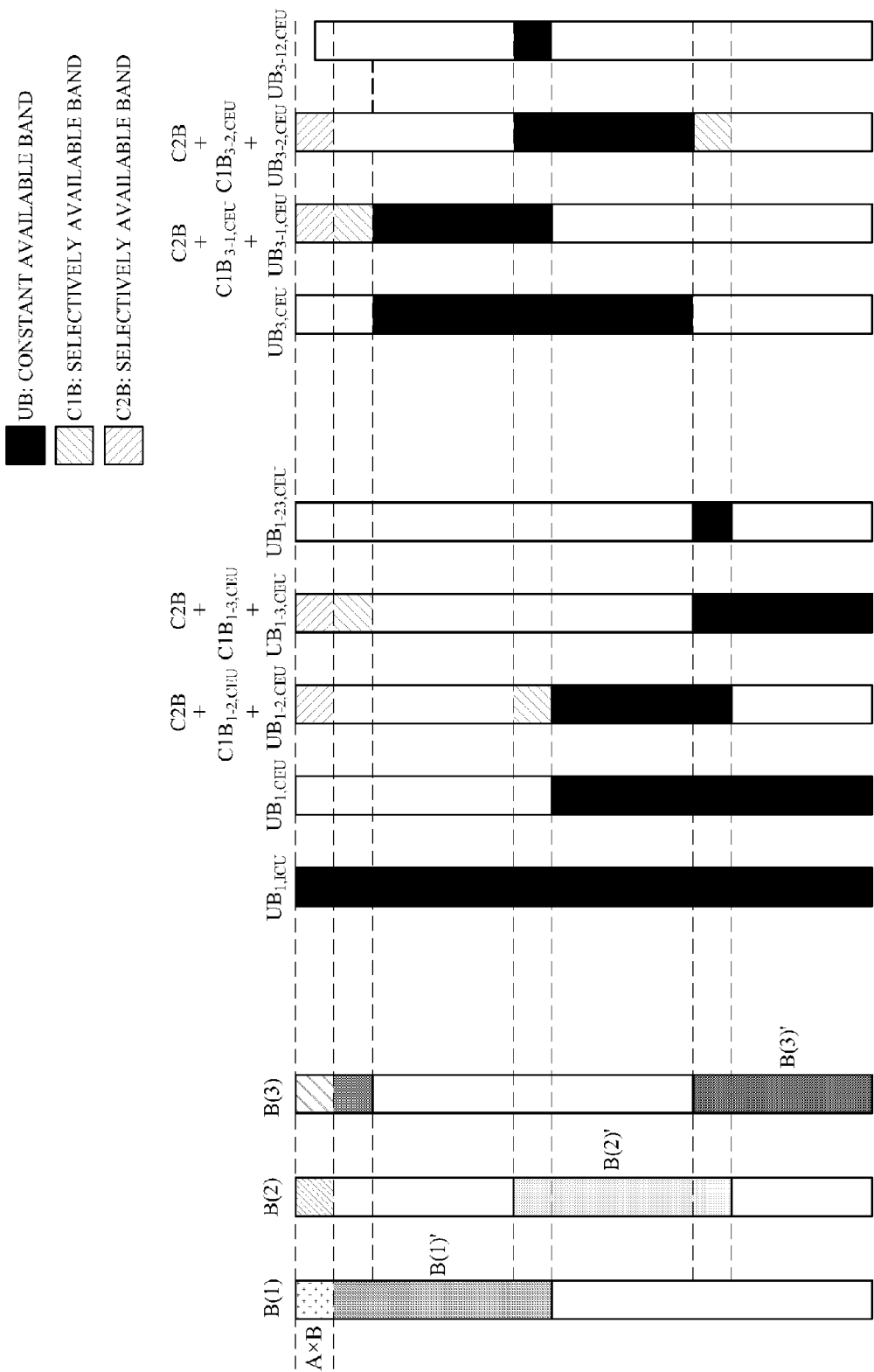
FIG. 21 illustrates resource bands available to each region according to an exemplary embodiment 1-6.

FIG. 21 illustrates resources available to the respective cells 1, 2, and 3 according to the current embodiment. Referring to FIG. 21, B(1), B(2), and B(3) denote unavailable bands for the respective cells 1, 2, and 3. Moreover, AXB denotes a common unused band. Thus, B(1) can be represented by AXB+B'(1). UB denotes a constant available resource band, and C1B and C2B denote selectively available resource bands. For example, C1B may be a part of B'(1), and C2B may be AXB.

In specific, the above resource bands can be represented by equations 16 through 27.

For example, on the border of the cell 1, $UE_{1-2,\ CEU}$ adjacent to the cell 2 can use a band corresponding to the intersection of $UB_{1,\ CEU}$ and B'(2) constantly, and selectively use $C1B_{1-2,\ CEU}$, i.e., the intersection of B'(1) and B'(2) as represented by Equation 25. Also, $UE_{1-2, CEU}$ can selectively use C2B which corresponds to AXB.

Likewise, on the border of the cell 1, $UE_{1-3, CEU}$ adjacent to the cell 3 can constantly use a band corresponding to the intersection of $UB_{1, CEU}$ and B'(3), and can selectively use $C1B_{1-3, CEU}$, i.e., a band corresponding to the intersection of B'(1) and B'(3). Also, $UE_{1-3, CEU}$ can selectively use C2B which corresponds to AXB.

Furthermore, on the border of the cell 1, $UE_{1-23, CEU}$ adjacent to the cell 2 and the cell 3 can use a band corresponding to the intersection of $UB_{1, CEU}$, B'(2), and B'(3) at all times, and can selectively use $C1B_{1-23, CEU}$, i.e., a band corresponding to the intersection of B'(1), B'(2), and B'(3). In this case, there is no common region, $C1B_{1-23, CEU}$ does not have a corresponding band. In addition, unlike the embodiment 1-5, AXB is not used by $UE_{1-23, CEU}$.

When all cells request to use C1B or C2B, there may occur one or two interference, and to suppress such interferences, all cells are allowed to freely use C1B or C2B if they provide interference cancellation, or an exclusive use of C1B or C2B by one cell is notified to the other cells through an X2 interface and the other cells receiving the notification are prohibited from the use of the resources.

FIG. 20 is table showing resources which are available and unavailable to the respective cells in view of PRBs.

In FIG. 20, B(1) of the cell 1 includes 0, 1, 2, 3, 4, 5, and 6, B(2) of the cell 2 includes 0, 1, 2, 6, 7, 8, and 9, and B(3) of the cell 3 includes 0, 1, 2, 3, 4, 9, 10, and 11. AXB includes 0, 1, and 2. As the result, B'(1) comes to include 3, 4, 5, and 6.

Figure 22:
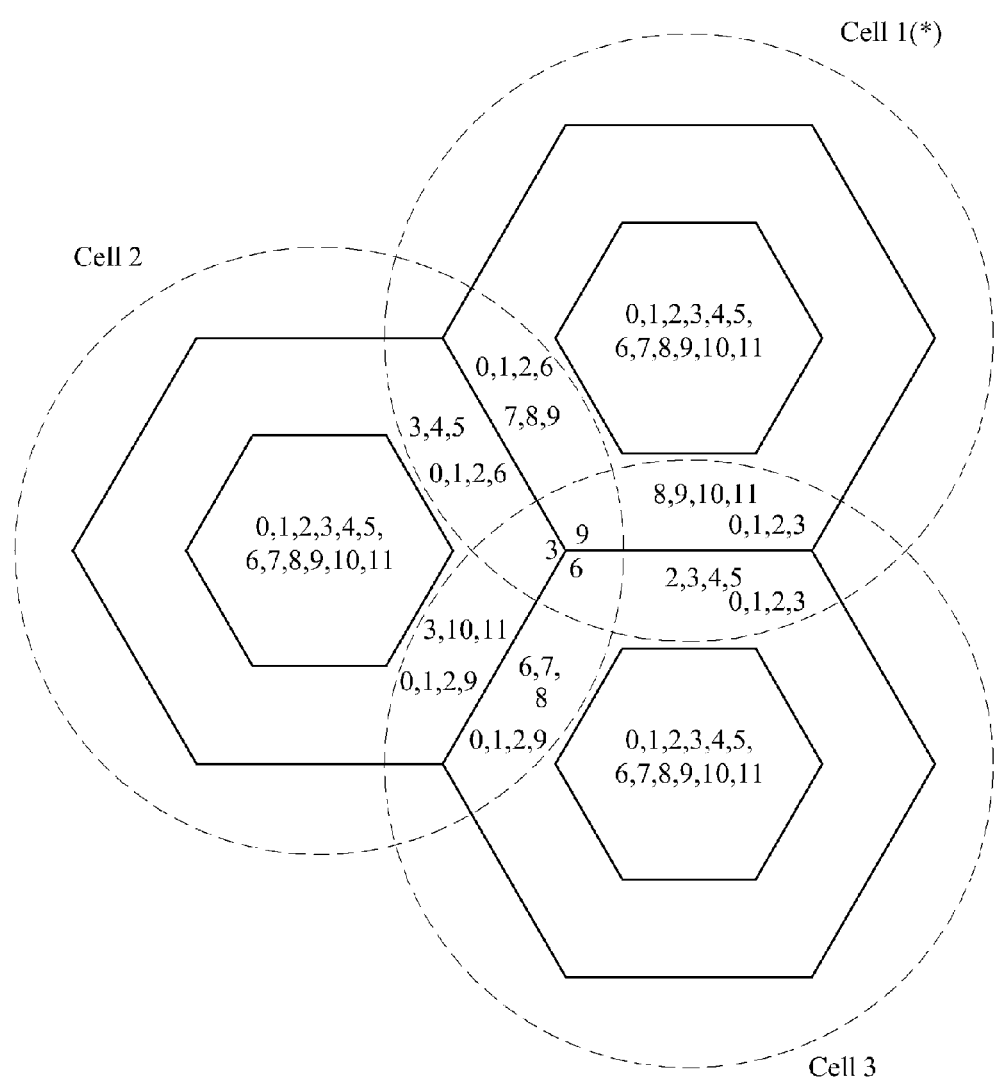
FIG. 22 illustrates the available resource bands and interference characteristics for each region according to the exemplary embodiment 1-6.

FIG. 22 illustrates available PRBs of each cell according to the current embodiment.

In FIG. 22, $UE_{1, ICU}$ located at the center of the cell 1 can use the entire band ranging from 0 to 11. Resources from 0 to 11 may be managed with an appropriate power in order to prevent interfere occurrence.

In FIG. 22, in a region where all three dotted-lined circles of the cells 1, 2, and 3, $UE_{1-23, CEU}$ located in the cell 1 can use 9 constantly since it is commonly belonging to B'(2), B'(3) and the entire band Ω except B(1). Additionally, a first selectively available band is $C1B_{1-23,CEU}$, as represented by Equation 27, which does not have a corresponding band. Consequently, resources allocated to $UE_{1-23, CEU}$ can be 9. Since 9 is not used by CEUs of the other cells, the probability of interference occurrence is very low.

In FIG. 22, in a region the dotted-lined circles of the cells 1 and 2 overlap, except the region where all three dotted-lined circles of the cells 1, 2, and 3, $UE_{1-2, CEU}$ located in the cell 1 can use 7, 8, and 9 constantly since they are commonly belonging to B'(2) and the entire band Ω except B(1). Additionally, 6 can be selectively used since it is commonly belonging to B'(1) and B'(2). Moreover, 0, 1, and 2 can be selectively used because they correspond to AXB. Therefore, resources to be allocated to $UE_{1-2, CEU}$ can be 0, 1, 2, 6, 7, 8, and 9. From among these resources, because 7, 8, and 9 are not used by CEU of the cell 2, it is reasonable to consider that the probability of interference occurrence is significantly low, and 0, 1, 2, and 6 may cause interference since they can be selectively used by CEU of the cell 2.

In FIG. 22, in a region the dotted-lined circles of the cells 1 and 3 overlap, except the region where all three dotted-lined circles of the cells 1, 2, and 3, $UE_{1-3, CEU}$ located in the cell 1 can use 9, 10, and 11 at all times since they are commonly belonging to B'(3) and the entire band Ω except B(1). In addition, 3 can be selectively used since it is commonly belonging to B'(1) and B'(3). Moreover, 0, 1, and 2 can be selectively used since they are belonging to AXB. Consequently, resources to be allocated to $UE_{1-3, CEU}$ can be 0, 1, 2, 3, 9, 10, and 11. From among these resources, since 9, 10, and 11 are not used by CEU of the cell 3, it may be regarded that the probability of interference occurrence is significantly low, and 0, 1, 2, and 3 may cause interference since they can be selectively used by CEU of the cell 3.

In FIG. 22, in the region where all three dotted-lined circles of the cells 1, 2, and 3, $UE_{2-13, CEU}$ located in the cell 2 can use 3 at all times since it is commonly belonging to B'(1), B'(3) and the entire band Ω except B(2). Additionally a selectively available band may be $C1B_{2-13,CEU}$, as represented by Equation 27, which does not have a corresponding band. Consequently, resources to be allocated to $UE_{2-13, CEU}$ can be 3. Since 3 is not used by CEUs of the other cells, the probability of interference occurrence is significantly low.

In FIG. 22, in the region where all three dotted-lined circles of the cells 1, 2, and 3, $UE_{3-12, CEU}$ located in the cell 3 can use 6 at all times since it is commonly belonging to B'(1), B'(2) and the entire band Ω except B(3). In addition, a selectively available band may be $C1B_{3-12,CEU}$, as represented by Equation 27, which does not have a corresponding band. Consequently, resources to be allocated to $UE_{3-12, CEU}$ can be 6. Since 6 is not used by CEUs of the other cells, it is considered that the probability of interference occurrence is significantly low.

In FIG. 22, in a region the dotted-lined circles of the cells 2 and 3 overlap, except the region where all three dotted-lined circles of the cells 1, 2, and 3, $UE_{2-1, CEU}$ located in the cell 2 can use 3, 4, and 5 at all times since they are commonly belonging to B'(1) and the entire band Ω except B(2). In addition, 6 can be selectively used because it is commonly belonging to B'(2) and B'(1). Also, 0, 1, and 2 which are belonging to AXB can be selectively used. Hence, resources to be allocated to $UE_{2-1, CEU}$ can be 0, 1, 2, 3, 4, 5, and 6. From among these resources, since 3, 4, and 5 are not used by CEU of the cell 1, it is reasonable to consider that the probability of interference occurrence is significantly low, and 0, 1, 2, and 6 may cause interference since they can be selectively used by CEU of the cell 1.

In FIG. 22, in a region the dotted-lined circles of the cells 1 and 3 overlap, except the region where all three dotted-lined circles of the cells 1, 2, and 3, $UE_{3-1, CEU}$ located in the cell 3 can use 4, 5, and 6 at all times since they are commonly belonging to B'(1) and the entire band Ω except B(3). In addition, 3 can be selectively used because it is commonly belonging to B'(3) and B'(1). Also, 0, 1, and 2 which are belonging to AXB can be selectively used. Therefore, resources to be allocated to $UE_{3-1, CEU}$ can be 0, 1, 2, 3, 4, 5, and 6. From among these resources, since 4, 5, and 6 are not used by CEU of the cell 1, it is considered that the probability of interference occurrence is significantly low, and 0, 1, 2, and 3 may cause interference since they can be selectively used by CEU of the cell 1.

In FIG. 22, in a region the dotted-lined circles of the cells 2 and 3 overlap, except the region where all three dotted-lined circles of the cells 1, 2, and 3, $UE_{2-3, CEU}$ located in the cell 2 can use 3, 10, and 11 at all times since they are commonly belonging to B'(3) and the entire band Ω except B(2). In addition, 9 can be selectively used because it is commonly belonging to B'(2) and B'(3). Also, 0, 1, and 2 which are belonging to AXB can be selectively used. Hence, resources to be allocated to $UE_{2-3, CEU}$ can be 0, 1, 2, 3, 9, 10, and 11. From among these resources, since 3, 10, and 11 are not used by CEU of the cell 3, it is considered that the probability of interference occurrence is significantly low, and 0, 1, 2, and 9 may cause interference since they can be selectively used by CEU of the cell 3.

In FIG. 22, in a region the dotted-lined circles of the cells 2 and 3 overlap, except the region where all three dotted-lined circles of the cells 1, 2, and 3, $UE_{3\text{-}2,\ CEU}$ located in the cell 3 can use 6, 7, and 8 at all times since they are commonly belonging to B'(2) and the entire band Ω except B(3). In addition, 9 can be selectively used because it is commonly belonging to B'(3) and B'(2). Also, 0, 1, and 2 which are belonging to AXB can be selectively used. Therefore, resources to be allocated to $UE_{3\text{-}2,\ CEU}$ can be 0, 1, 2, 6, 7, 8, and 9. From among these resources, since 6, 7, and 8 are not used by CEU of the cell 2, it is considered that the probability of interference occurrence is significantly low, and 0, 1, 2, and 9 may cause interference since they can be selectively used by CEU of the cell 2.

In FIG. 22, $UE_{2,\ ICU}$ located at the center of the cell 2 and $UE_{3,\ ICU}$ located at the center of the cell 3 can use the entire band like $UE_{1,\ ICU}$ of the cell 1.

Embodiment 2

Figure 23:
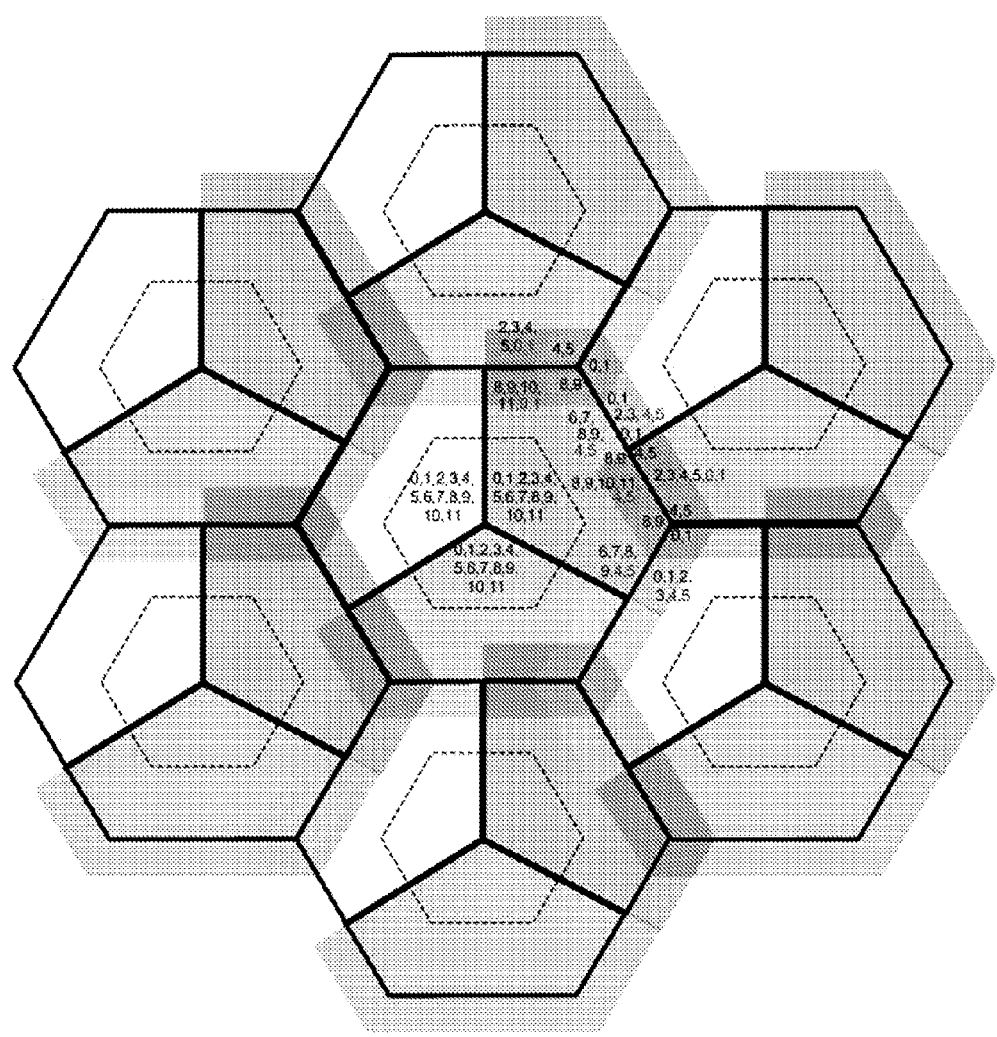
FIG. 23 is a diagram for explaining sectoring and resource allocation scheme according to an exemplary embodiment 2.

The above-described embodiments are implemented on the assumption that sectoring is not performed on the cells. However, the above embodiments are applicable to a case where the sectoring is performed. FIG. 23 illustrates available PRBs to each cell in consideration of sectoring.

Embodiment 3-1

The above-described embodiments are implemented on the assumption that all cells are allocated the entire resource Ω. However, the above embodiments can be implemented where there is a band difference in the entire bands Ω for the respective cells.

FIG. 24 is a table showing available and unavailable bands for the respective cells 1, 2, and 3 in view of PRBs where Ω1≠Ω2, Ω1≠Ω3, Ω2=Ω3.

Referring to FIG. 24, although PRBs from 0 to 11 are commonly allocated to the cell 1, the cell 2, and the cell 3, the cell 1 has more PRBs from 12 to 15. As such, when Ωi for a cell is not identical with the others, the cell 1 may recognize PRBs corresponding to 12 to 15 as B(2) of the cell 2 or B(3) of the cell 3.

Figure 25:
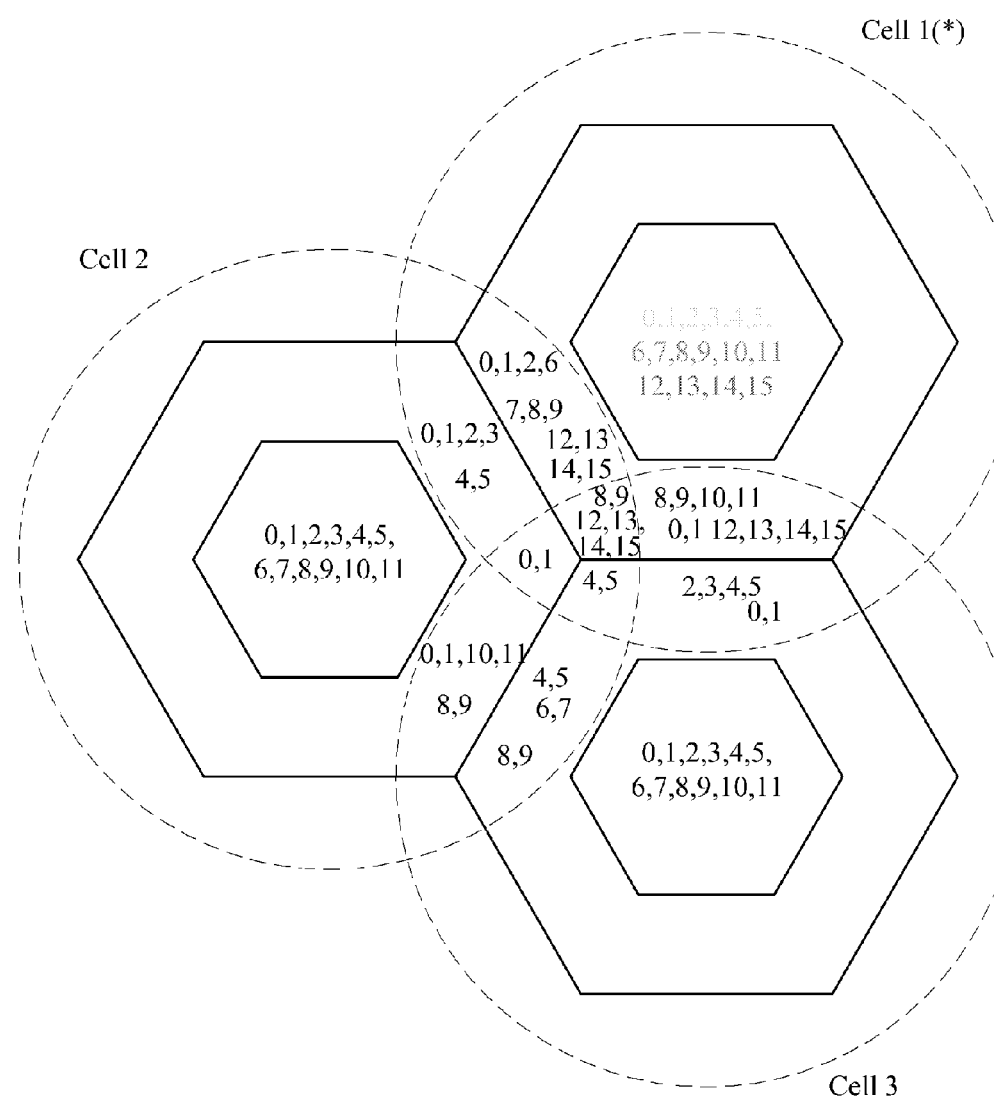
FIG. 25 illustrates available resource bands and interference characteristics for each region according to an exemplary embodiment 3-1.

FIG. 25 illustrates available PRBs of each cell when the embodiment 1-4 is implemented where Ωi for each cell is not identical with the others.

In FIG. 25, $UE_{1,\ ICU}$ located at the center of the cell 1 can use the entire band ranging from 0 to 15. Here, resources from 0 to 11 may be managed with an appropriate power such that interference does not occur, and resources from 12 to 15 are completely free from the interference since they are not used by the other cells.

In FIG. 25, in a region where all three dotted-lined circles of the cells 1, 2, and 3, $UE_{1\text{-}23,\ CEU}$ located in the cell 1 can use 8 and 9 at all times since they are commonly belonging to B(2), B(3) and the entire band Ω except B(1). Additionally, 12, 13, 14, and 15 are not used by the cell 2 and the cell 3, and thus they can be constantly used. In this case, the cell 1 may recognize 12, 13, 14 and 15 as being included in B(2) or B(3). Moreover, a selectively available band may be $C1B_{1\text{-}23,\ CEU}$ as represented by Equation 15, which does not have a corresponding band. Thus, resources to be allocated to $C1B_{1\text{-}23,\ CEU}$ can be 8, 9, 12, 13, 14, and 15, and they are not used by CEUs of other cells, the probability of interference occurrence is significantly low.

In FIG. 25, in the region the dotted-lined circles of the cells 1 and 2 overlap, except the region where all three dotted-lined circles of the cells 1, 2, and 3, $UE_{1\text{-}2,\ CEU}$ located in the cell 1 can use 6, 7, 8, and 9 at all times since they are commonly belonging to B(2) and the entire band Ω except B(1). Additionally, since 12, 13, 14, and 15 are recognized as being included in B(2), they can be used constantly. Also, 4 and 5 can be selectively used since they are commonly belonging to B(1) and B(2). Accordingly, resources to be allocated to $UE_{1\text{-}2,\ CEU}$ can be 4, 5, 6, 7, 8, 9, 12, 13, 14, and 15. From among these resources, since 8, 9, 12, 13, 14, and 15 are not used by CEU of the cell 2, it can be considered that the probability of interference occurrence is significantly low, and 4 and 5 may cause interference since they can be selectively used by CEU of the cell 2.

In FIG. 25, in a region the dotted-lined circles of the cells 1 and 3 overlap, except the region where all three dotted-lined circles of the cells 1, 2, and 3, $UE_{1\text{-}3,\ CEU}$ located in the cell 1 can use 8, 9, 10, and 11 at all times since they are commonly belonging to B(3) and the entire band Ω except B(1). Moreover, 12, 13, 14, and 15 can be used constantly as well since they are recognized as belonging to B(3). Furthermore, 0 and 1 can be selectively used since they are commonly belonging to B(1) and B(3). Hence, resources to be allocated to $UE_{1\text{-}3,\ CEU}$ can be 0, 1, 8, 9, 10, 11, 12, 13, 14, and 15. From among these resources, since 8, 9, 10, 11, 12, 13, 14, and 15 are not used by CEU of the cell 3, the probability of interference occurrence is regarded as considerably low, and 0 and 1 may cause interference since they can be used by CEU of the cell 3.

In FIG. 25, in the region where all three dotted-lined circles of the cells 1, 2, and 3, $UE_{2\text{-}13,\ CEU}$ located in the cell 2 can use 0 and 1 at all times since they are commonly belonging to B(1), B(3) and the entire band Ω except B(2). Additionally, a conditionally available band may be $C1B_{2\text{-}13,\ CEU}$ as represented by Equation 15, which has not a corresponding band in FIG. 25. Hence, resources to be allocated to $UE_{2\text{-}13,\ CEU}$ can be 0 and 1, and since they are not used by CEUs of the other cells, the probability of interference occurrence is very low.

In FIG. 25, in the region where all three dotted-lined circles of the cells 1, 2, and 3, $UE_{3\text{-}12,\ CEU}$ located in the cell 3 can use 4 and 5 at all times since they are commonly belonging to B(1), B(2) and the entire band Ω except B(3). In addition, a selectively available band may be $C1B_{3\text{-}12,\ CEU}$ as represented by Equation 15, but there is no corresponding band in FIG. 25. Thus, resources to be allocated to $UE_{3\text{-}12,\ CEU}$ can be 4 and 5 and because they are not used by CEUs of the other cells, the probability of interference occurrence is significantly low.

In FIG. 25, in a region the dotted-lined circles of the cells 1 and 2 overlap, except the region where all three dotted-lined circles of the cells 1, 2, and 3, $UE_{2\text{-}1,\ CEU}$ located in the cell 2 can use 0, 1, 2, and 3 at all times since they are commonly belonging to B(1) and the entire band Ω except B(2). Additionally, 4 and 5 can be selectively used since they are commonly belonging to B(2) and B(1). Hence, resources to be allocated to $UE_{2\text{-}1,\ CEU}$ can be 0, 1, 2, 3, 4, and 5. From among these resources, because 0, 1, 2, and 3 are not used by CEU of the cell 1, it can be regarded that the probability of interference occurrence is very low, and 4 and 5 may cause interference since they can be selectively used by CEU of the cell 1.

In FIG. 25, in a region the dotted-lined circles of the cells 1 and 3 overlap, except the region where all three dotted-lined circles of the cells 1, 2, and 3, $UE_{3\text{-}1,\ CEU}$ located in the cell 3 can use 2, 3, 4, and 5 at all times since they are commonly belonging to B(1) and the entire band Ω except B(3). Additionally, 0 and 1 can be selectively used since they are commonly belonging to B(3) and B(1). Hence, resources to be allocated to $UE_{3\text{-}1,\ CEU}$ can be 0, 1, 2, 3, 4, and 5. From among these resources, because 2, 3, 4 and 5 are not used by CEU of the cell 1, it can be considered that the probability of interference occurrence is significantly low, and 0 and 1 may cause interference since they can be selectively used by CEU of the cell 1.

In FIG. 25, in a region the dotted-lined circles of the cells 2 and 3 overlap, except the region where all three dotted-lined circles of the cells 1, 2, and 3, $UE_{2-3,\ CEU}$ located in the cell 2 can use 0, 1, 10, and 11 at all times since they are commonly belonging to B(3) and the entire band $\Omega$ except B(2). Additionally, 8 and 9 can be selectively used since they are commonly belonging to B(2) and B(3). Consequently, resources to be allocated to $UE_{2-3,\ CEU}$ can be 0, 1, 8, 9, 10, and 11. From among these resources, 0, 1, 10 and 11 are not used by CEU of the cell 3, and thus it can be regarded that the probability of interference occurrence is very low, and 8 and 9 may cause interference since they can be selectively used by CEU of the cell 3.

In FIG. 25, in a region the dotted-lined circles of the cells 2 and 3 overlap, except the region where all three dotted-lined circles of the cells 1, 2, and 3, $UE_{3-2,\ CEU}$ located in the cell 3 can use 4, 5, 6, and 7 at all times since they are commonly belonging to B(2) and the entire band $\Omega$ except B(3). Additionally, 8 and 9 can be selectively used since they are commonly belonging to B(3) and B(2). Hence, resources to be allocated to $UE_{3-2,\ CEU}$ can be 4, 5, 6, 7, 8, and 9. From among these resources, 4, 5, 6, and 7 are not used by CEU of the cell 2, and hence it can be regarded that the probability of interference occurrence is very low, and 8 and 9 may cause interference since they can be selectively used by CEU of the cell 2.

In FIG. 25, $UE_{2,\ ICU}$ located at the center of the cell 2 and $UE_{3,\ ICU}$ located at the center of the cell 3 can use the entire band like $UE_{1,\ ICU}$ of the cell 1.

Embodiment 3-2

The current embodiment is implemented in a condition where $\Omega 1 \neq \Omega 2$, $\Omega 1 \neq \Omega 3$, $\Omega 2 \neq \Omega 3$.

FIG. 26 is a table showing resources which are available and unavailable to the respective cells in view of PRBs. Referring to FIG. 26, the cell 1 is allocated resources from 0 to 15, the cell 2 is allocated resources from 0 to 13, and the cell 3 is allocated resources from 0 to 11. As such, $\Omega i$ for each cell is not identical with the others, the cell 1 may recognize 14 and 15 as B(2) of the cell 2, and 12, 13, 14, and 15 as B(3) of the cell 3.

Figure 27:
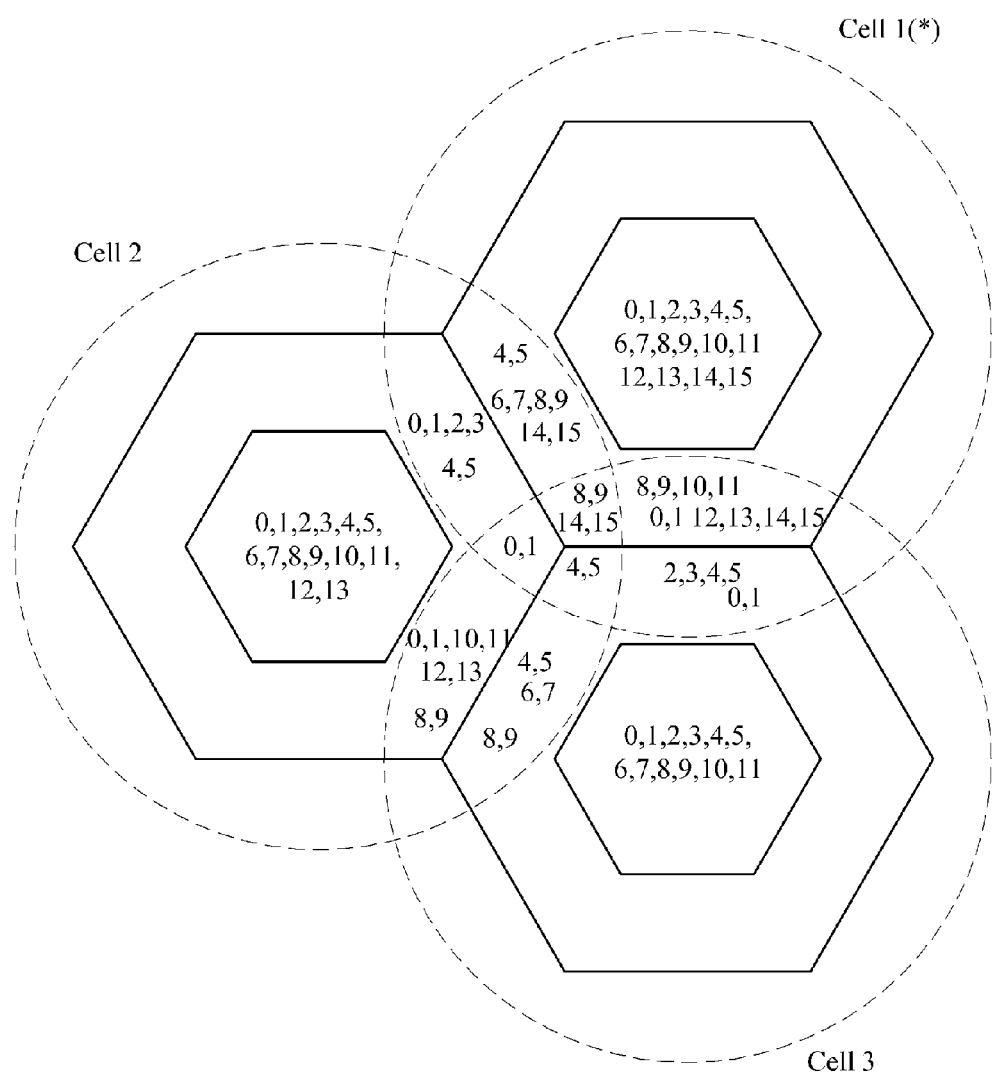
FIG. 27 illustrates available resource bands and interference characteristics for each region according to the exemplary embodiment 3-2.

FIG. 27 illustrates available PRBs of each cell when the embodiment 1-4 is implemented where $\Omega i$ for each cell is not identical with the others.

In FIG. 27, $UE_{1,\ ICU}$ located at the center of the cell 1 can use the entire band ranging from 0 to 15. Here, resources from 0 to 11, and 12 and 13 can be managed with an appropriate power to suppress interference, and 14 and 15 are not used by the other cells, it can be regarded that they are completely free from the interference.

In FIG. 27, in a region where all three dotted-lined circles of the cells 1, 2, and 3, $UE_{1-23,\ CEU}$ located in the cell 1 can use 8 and 9 at all times since they are commonly belonging to B(2), B(3) and the entire band $\Omega$ except B(1). Additionally, since 14 and 15 are not used by the cell 2 and the cell 3, they can be constantly used. In this case, the cell 1 may recognize 14 and 15 as being included in B(2) and recognize 12, 13, 14, and 15 as being included in B(3). Moreover, a selectively available band may be $C1B_{1-23,\ CEU}$ as represented by Equation 15, which does not have a corresponding band in FIG. 27. Thus, resources to be allocated to $C1B_{1-23,\ CEU}$ can be 8, 9, 14, and 15, and they are not used by CEUs of other cells, the probability of interference occurrence is significantly low.

In FIG. 27, in a region the dotted-lined circles of the cells 1 and 2 overlap, except the region where all three dotted-lined circles of the cells 1, 2, and 3, $UE_{1-2,\ CEU}$ located in the cell 1 can use 6, 7, 8, and 9 at all times since they are commonly belonging to B(2) and the entire band $\Omega$ except B(1). Additionally, since 14 and 15 are recognized as being included in B(2), they can be used constantly. Also, 4 and 5 can be selectively used since they are commonly belonging to B(1) and B(2). Accordingly, resources to be allocated to $UE_{1-2,\ CEU}$ can be 4, 5, 6, 7, 8, 9, 14, and 15. From among these resources, since 6, 7, 8, 9, 14, and 15 are not used by CEU of the cell 2, it can be considered that the probability of interference occurrence is significantly low, and 4 and 5 may cause interference since they can be selectively used by CEU of the cell 2.

In FIG. 27, in a region the dotted-lined circles of the cells 1 and 3 overlap, except the region where all three dotted-lined circles of the cells 1, 2, and 3, $UE_{1-3,\ CEU}$ located in the cell 1 can use 8, 9, 10, and 11 at all times since they are commonly belonging to B(3) and the entire band $\Omega$ except B(1). Moreover, 12, 13, 14, and 15 can be used constantly as well since they are recognized as belonging to B(3). Furthermore, 0 and 1 can be selectively used since they are commonly belonging to B(1) and B(3). Hence, resources to be allocated to $UE_{1-3,\ CEU}$ can be 0, 1, 8, 9, 10, 11, 12, 13, 14, and 15. From among these resources, since 8, 9, 10, 11, 12, 13, 14, and 15 are not used by CEU of the cell 3, the probability of interference occurrence is regarded as considerably low, and 0 and 1 may cause interference since they can be used by CEU of the cell 3.

In FIG. 27, in the region where all three dotted-lined circles of the cells 1, 2, and 3, $UE_{2-13,\ CEU}$ located in the cell 2 can use 0 and 1 at all times since they are commonly belonging to B(1), B(3) and the entire band $\Omega$ except B(2). Additionally, a selectively available band may be $C1B_{2-13,\ CEU}$ as represented by Equation 15, which has not a corresponding band in FIG. 27. Hence, resources to be allocated to $UE_{2-13,\ CEU}$ can be 0 and 1, and since they are not used by CEUs of the other cells, the probability of interference occurrence is very low.

In FIG. 27, in the region where all three dotted-lined circles of the cells 1, 2, and 3, $UE_{3-12,\ CEU}$ located in the cell 3 can use 4 and 5 at all times since they are commonly belonging to B(1), B(2) and the entire band $\Omega$ except B(3). In addition, a selectively available band may be $C1B_{3-12,\ CEU}$ as represented by Equation 15, but there is no corresponding band in FIG. 27. Thus, resources to be allocated to $UE_{3-12,\ CEU}$ can be 4 and 5 and because they are not used by CEUs of the other cells, the probability of interference occurrence is significantly low.

In FIG. 27, in the region the dotted-lined circles of the cells 1 and 2 overlap, except the region where all three dotted-lined circles of the cells 1, 2, and 3, $UE_{2-1,\ CEU}$ located in the cell 2 can use 0, 1, 2, and 3 at all times since they are commonly belonging to B(1) and the entire band $\Omega$ except B(2). Additionally, 4 and 5 can be selectively used since they are commonly belonging to B(2) and B(1). Hence, resources to be allocated to $UE_{2-1,\ CEU}$ can be 0, 1, 2, 3, 4, and 5. From among these resources, because 0, 1, 2, and 3 are not used by CEU of the cell 1, it can be regarded that the probability of interference occurrence is very low, and 4 and 5 may cause interference since they can be selectively used by CEU of the cell 1.

In FIG. 27, in a region the dotted-lined circles of the cells 1 and 3 overlap, except the region where all three dotted-lined circles of the cells 1, 2, and 3, $UE_{3-1,\ CEU}$ located in the cell 3 can use 2, 3, 4, and 5 at all times since they are commonly belonging to B(1) and the entire band $\Omega$ except B(3). Additionally, 0 and 1 can be selectively used since they are commonly belonging to B(3) and B(1). Hence, resources to be allocated to $UE_{3-1,\ CEU}$ can be 0, 1, 2, 3, 4, and 5. From among these resources, because 2, 3, 4 and 5 are not used by CEU of the cell 1, it can be considered that the probability of interference occurrence is significantly low, and 0 and 1 may cause interference since they can be selectively used by CEU of the cell 1.

In FIG. 27, in a region the dotted-lined circles of the cells 2 and 3 overlap, except the region where all three dotted-lined circles of the cells 1, 2, and 3, $UE_{2\text{-}3,\ CEU}$ located in the cell 2 can use 0, 1, 10, and 11 at all times since they are commonly belonging to B(3) and the entire band Ω except B(2). Additionally, 8 and 9 can be selectively used since they are commonly belonging to B(2) and B(3). Consequently, resources to be allocated to $UE_{2\text{-}3,\ CEU}$ can be 0, 1, 8, 9, 10, and 11. From among these resources, 0, 1, 10 and 11 are not used by CEU of the cell 3, and thus it can be regarded that the probability of interference occurrence is very low, and 8 and 9 may cause interference since they can be selectively used by CEU of the cell 3.

In FIG. 27, in the region the dotted-lined circles of the cells 2 and 3 overlap, except the region where all three dotted-lined circles of the cells 1, 2, and 3, $UE_{3\text{-}2,\ CEU}$ located in the cell 3 can use 4, 5, 6, and 7 at all times since they are commonly belonging to B(2) and the entire band Ω except B(3). Additionally, 8 and 9 can be selectively used since they are commonly belonging to B(3) and B(2). Hence, resources to be allocated to $UE_{3\text{-}2,\ CEU}$ can be 4, 5, 6, 7, 8, and 9. From among these resources, 4, 5, 6, and 7 are not used by CEU of the cell 2, and hence it can be regarded that the probability of interference occurrence is very low, and 8 and 9 may cause interference since they can be selectively used by CEU of the cell 2.

In FIG. 27, $UE_{2,\ ICU}$ located at the center of the cell 2 can use the resources from 0 to 13, and $UE_{3,\ ICU}$ located at the center of the cell 3 can use the resources from 0 to 11.

Embodiment 4

In the current embodiment, JB bands represented by equations as below are defined, and CEU of a cell i uses the JB band exclusively. Inter-cell signaling is prerequisite for the exclusive use of JB band by CEU of a cell.

$$JB_{1\text{-}2,CEU} = \{UB_{1,CEU} \cap UB_{2,CEU}\} - JB_{1\text{-}23,CEU} \quad \text{Equation 28}$$

$$JB_{1\text{-}3,CEU} = \{UB_{1,CEU} \cap UB_{3,CEU}\} - JB_{1\text{-}23,CEU} \quad \text{Equation 29}$$

$$JB_{1\text{-}23,CEU} = UB_{1,CEU} \cap UB_{2,CEU} \cap UB_{3,CEU} \quad \text{Equation 30}$$

For example, in the above embodiments 1-1 through 1-6, it is possible to selectively designate JB band in a peripheral region of each cell.

Figure 28:
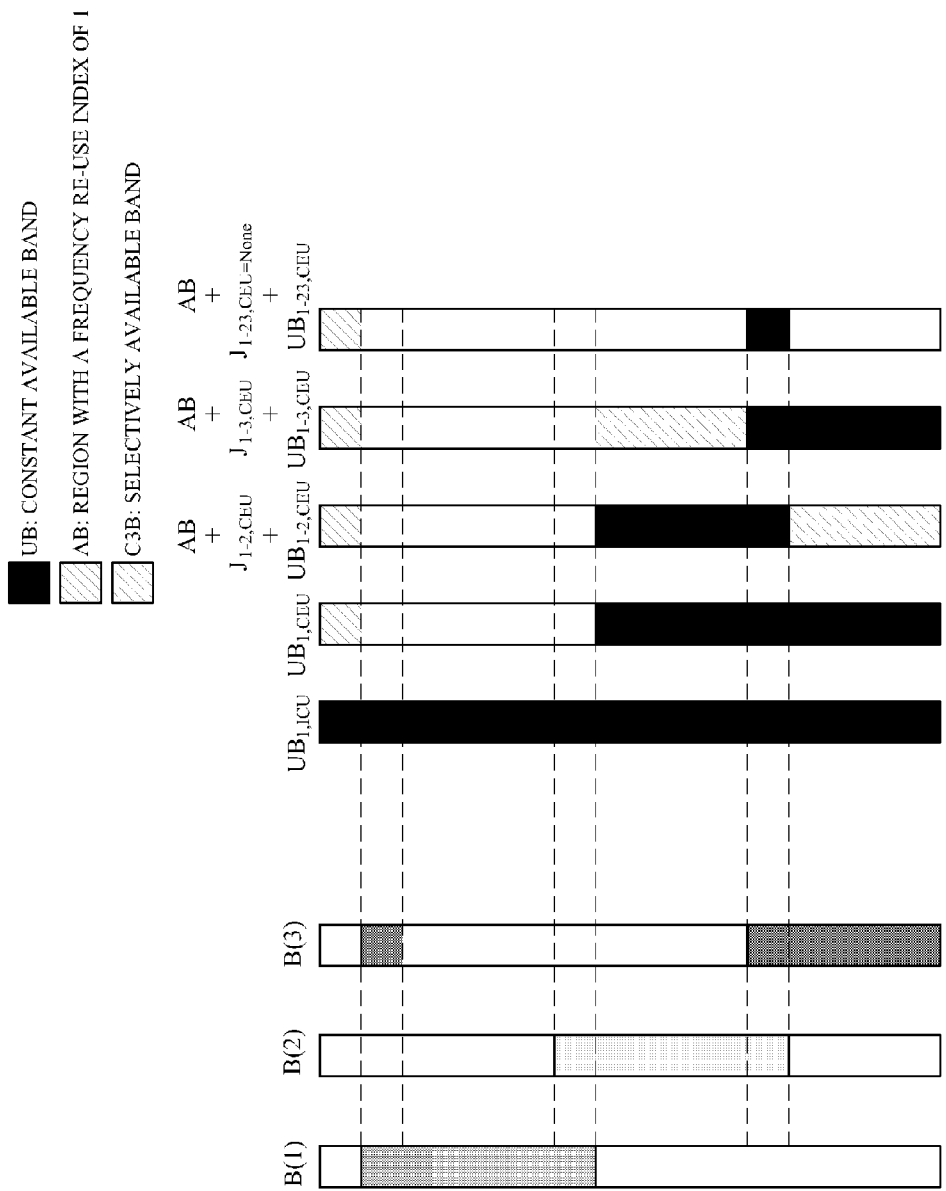
FIGS. 28, 30, 32, 34, and 36 illustrate resource bands available to each region according to an exemplary embodiment 4.
Figure 29:
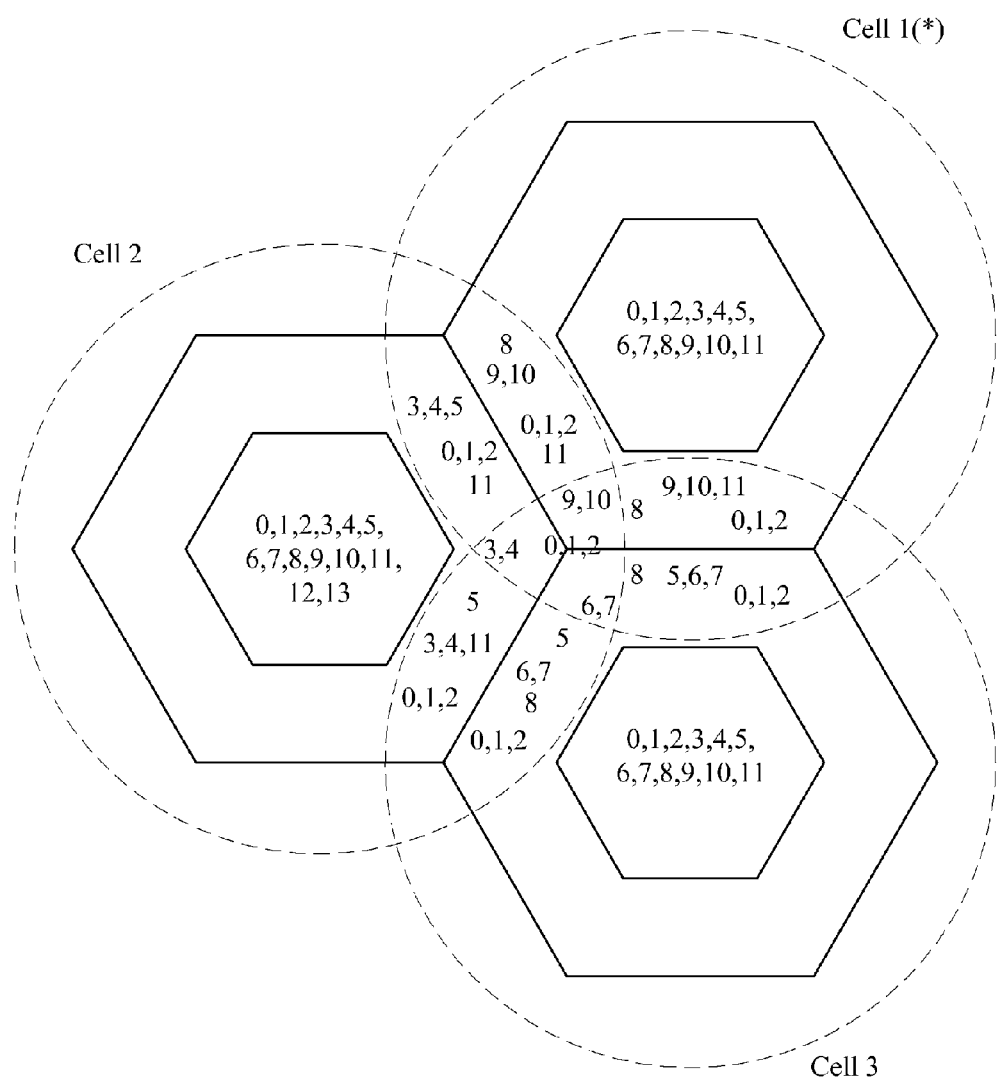
FIGS. 29, 31, 33, 35, and 37 illustrate the available resource bands and interference characteristics for each region according to the exemplary embodiment 4.

FIGS. 28 and 29 illustrate resources for respective cells when JB bands are applied to the embodiment 1-2 in association with PRBs in FIG. 13.

Figure 30:
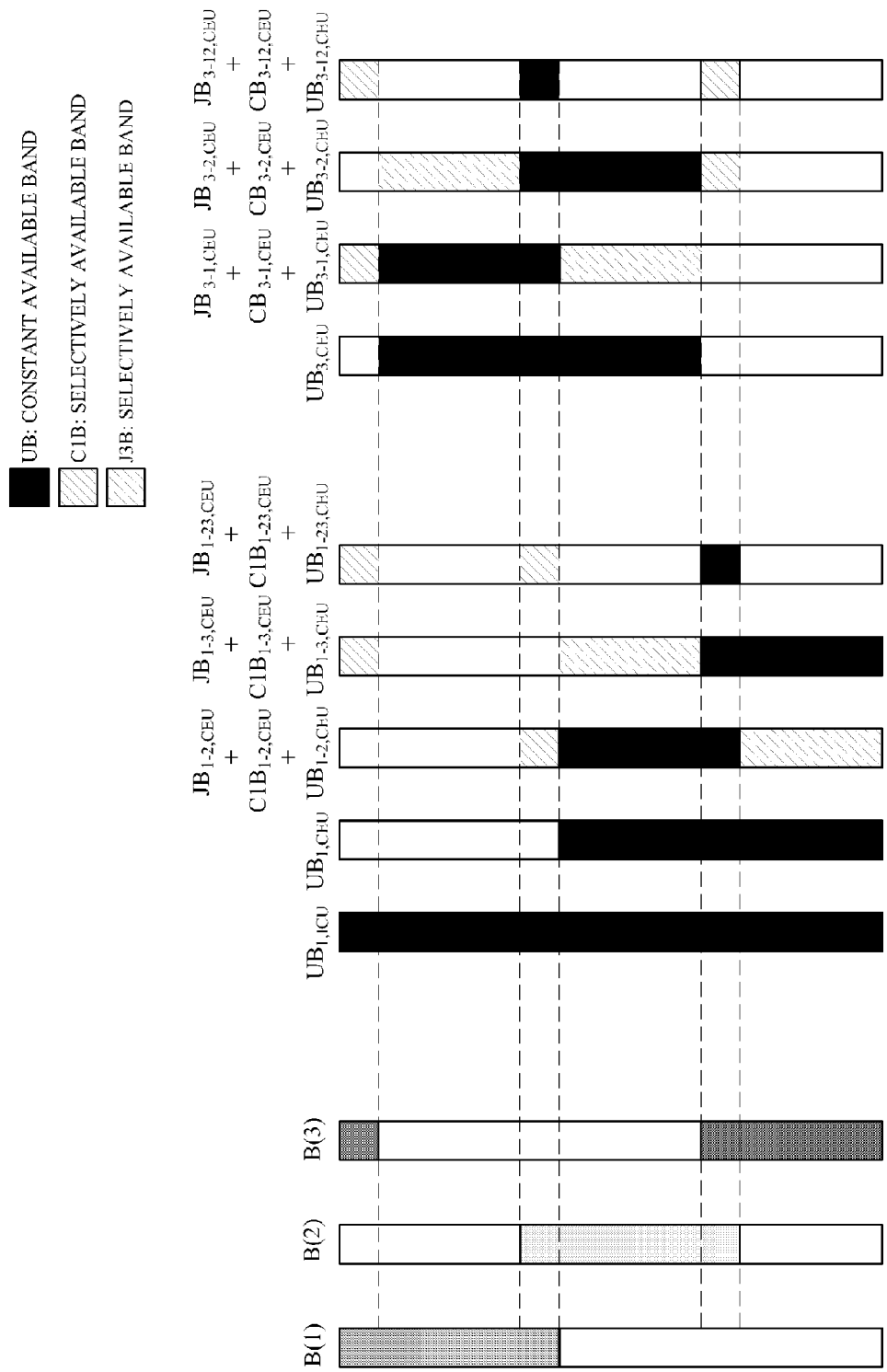
Figure 31:
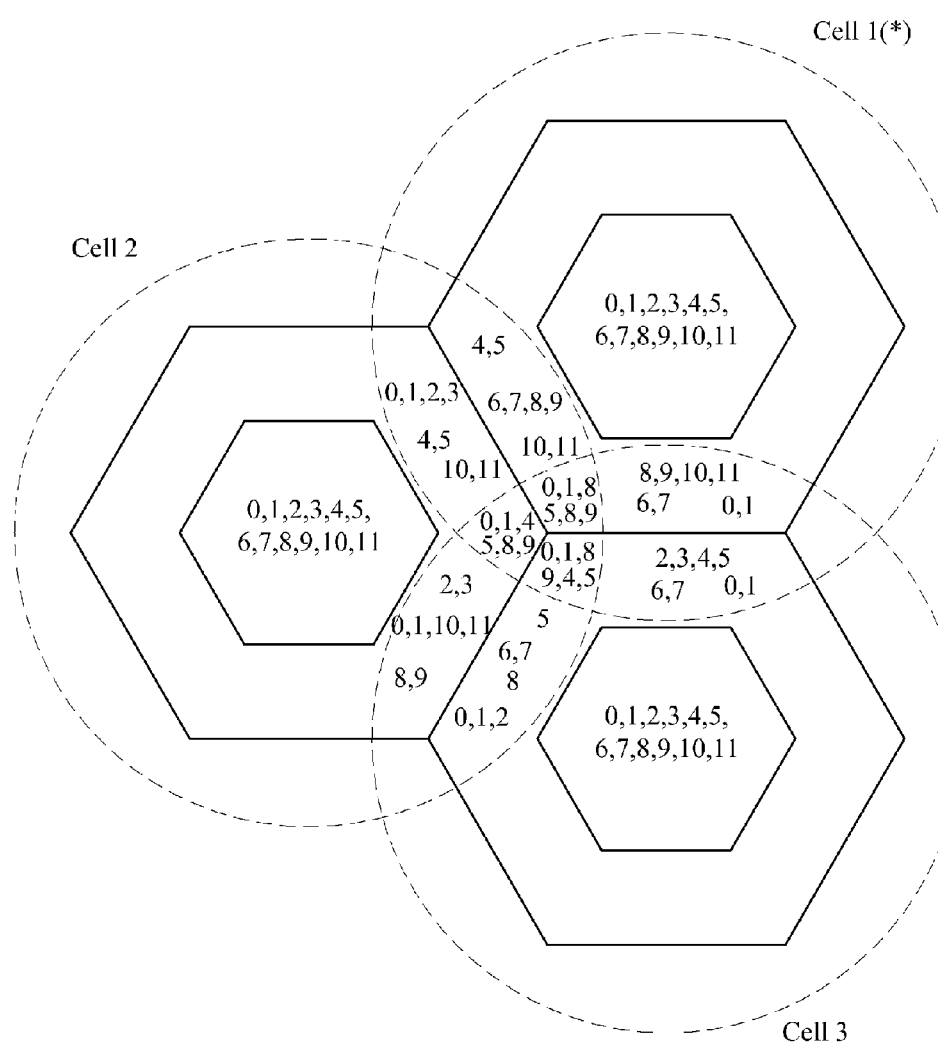

FIGS. 30 and 31 illustrate resources for the respective cells when JB bands are applied to the embodiment 1-3 in association with PRBs in FIG. 8.

Figure 32:
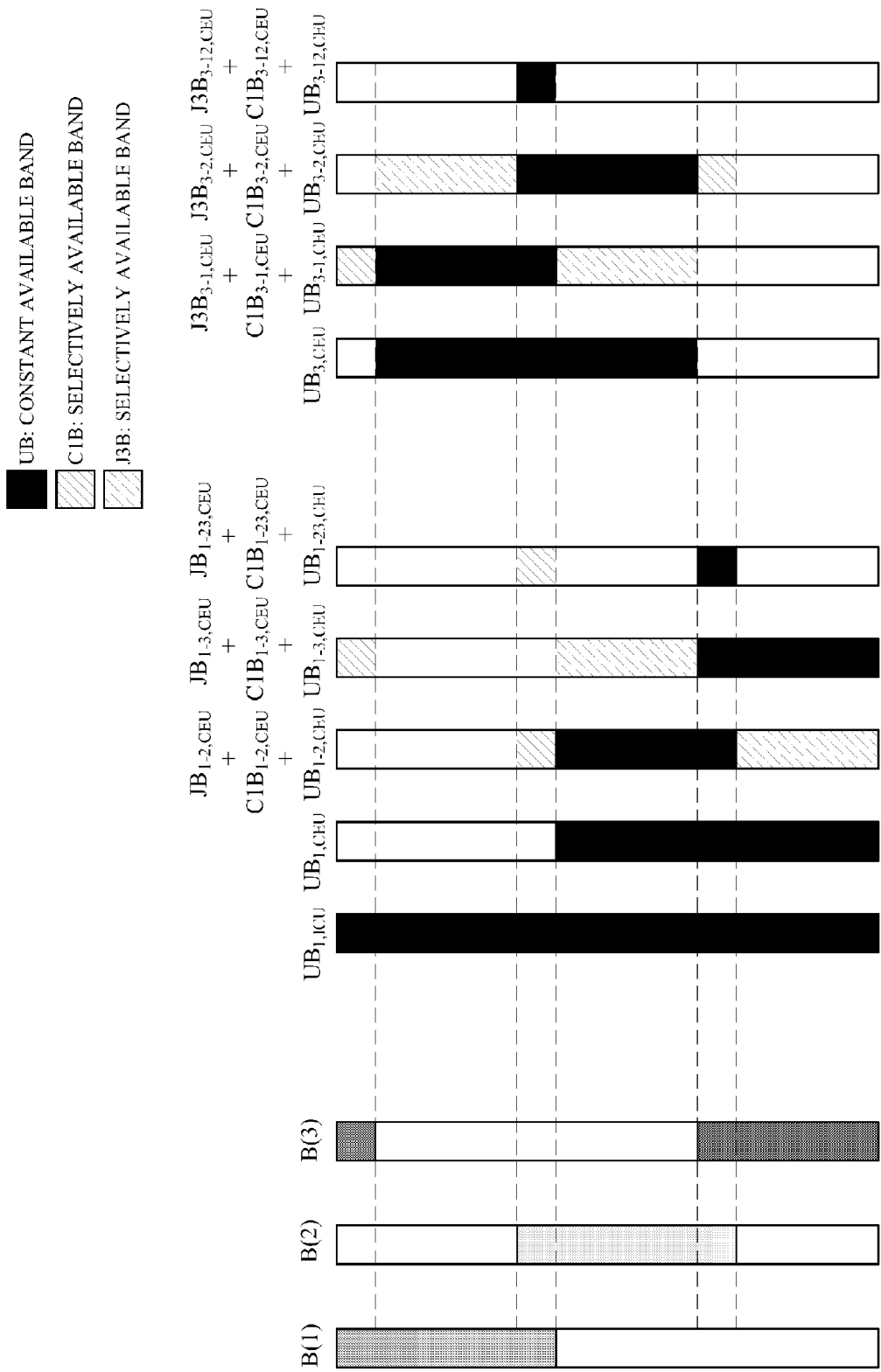
Figure 33:
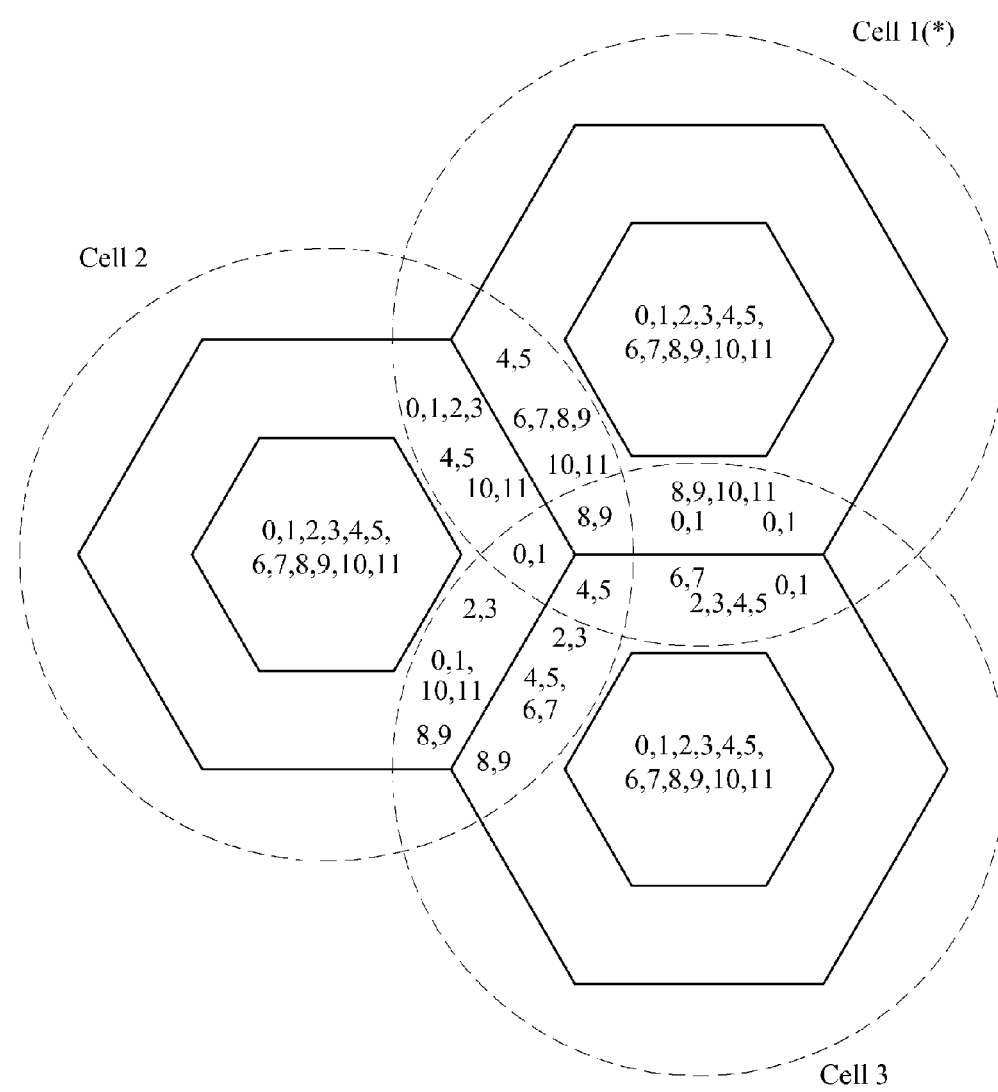

FIGS. 32 and 33 illustrate resources for the respective cells when JB bands are applied to the embodiment 1-4 in association with PRBs in FIG. 8.

Figure 34:
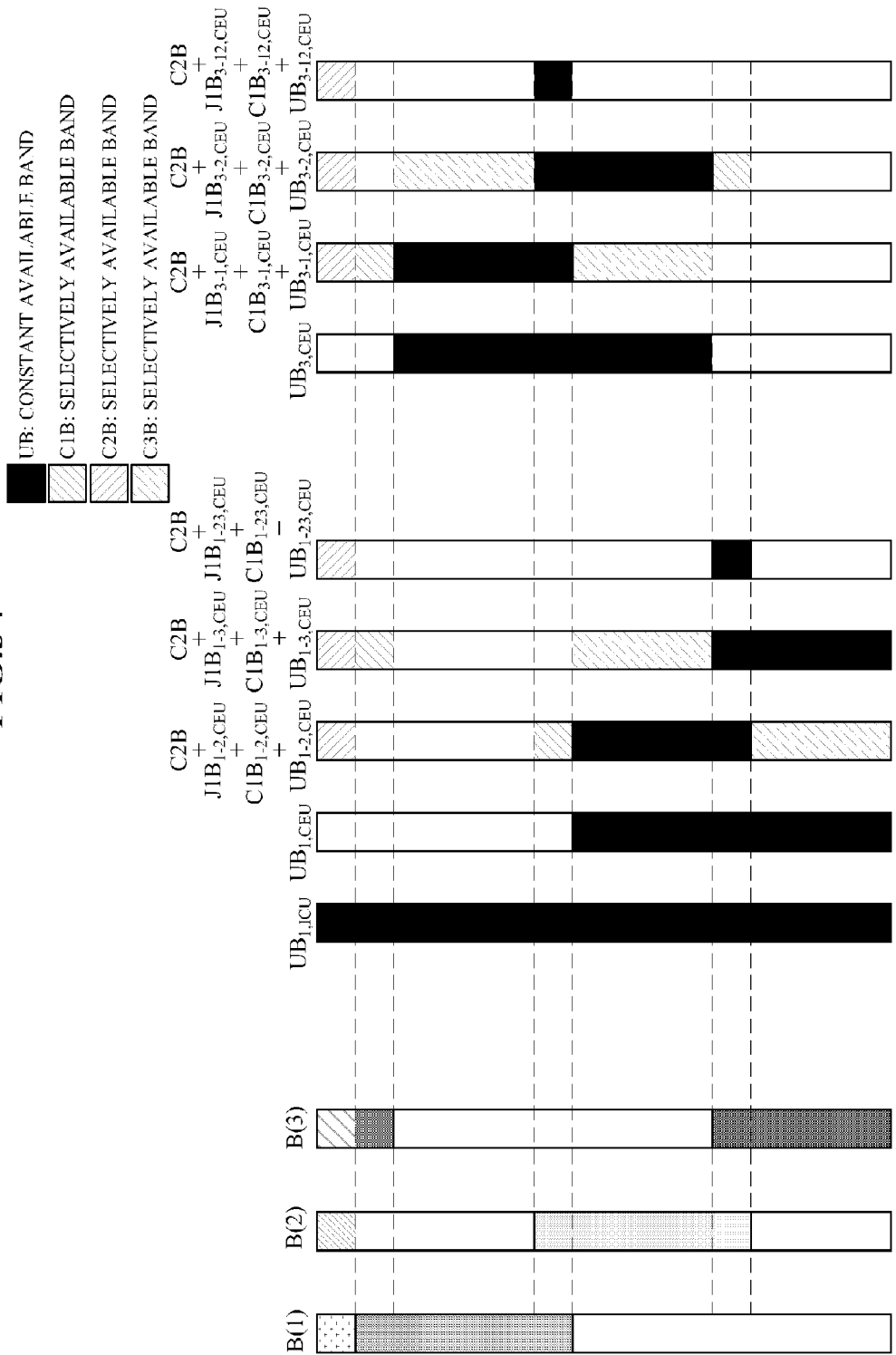
Figure 35:
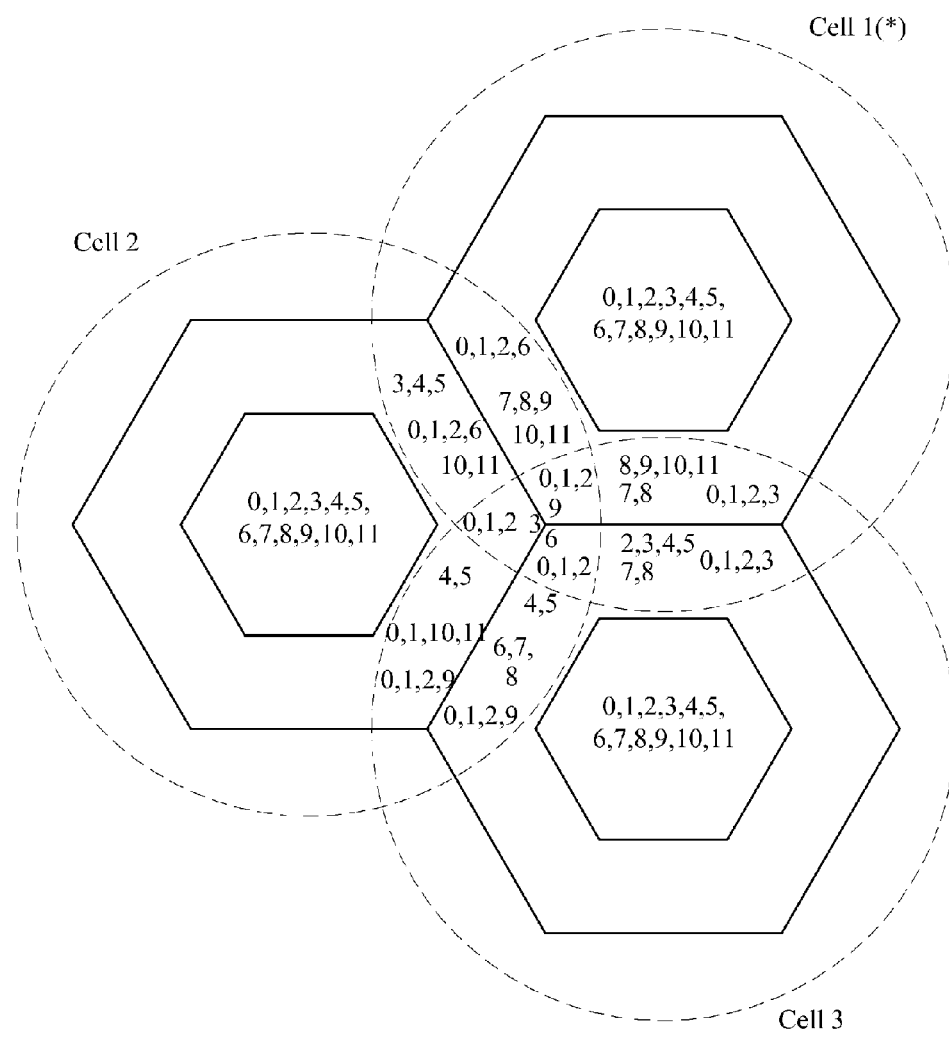

FIGS. 34 and 35 illustrate resources for the respective cells when JB bands are applied to the embodiment 1-5 in association with PRBs in FIG. 20.

Figure 36:
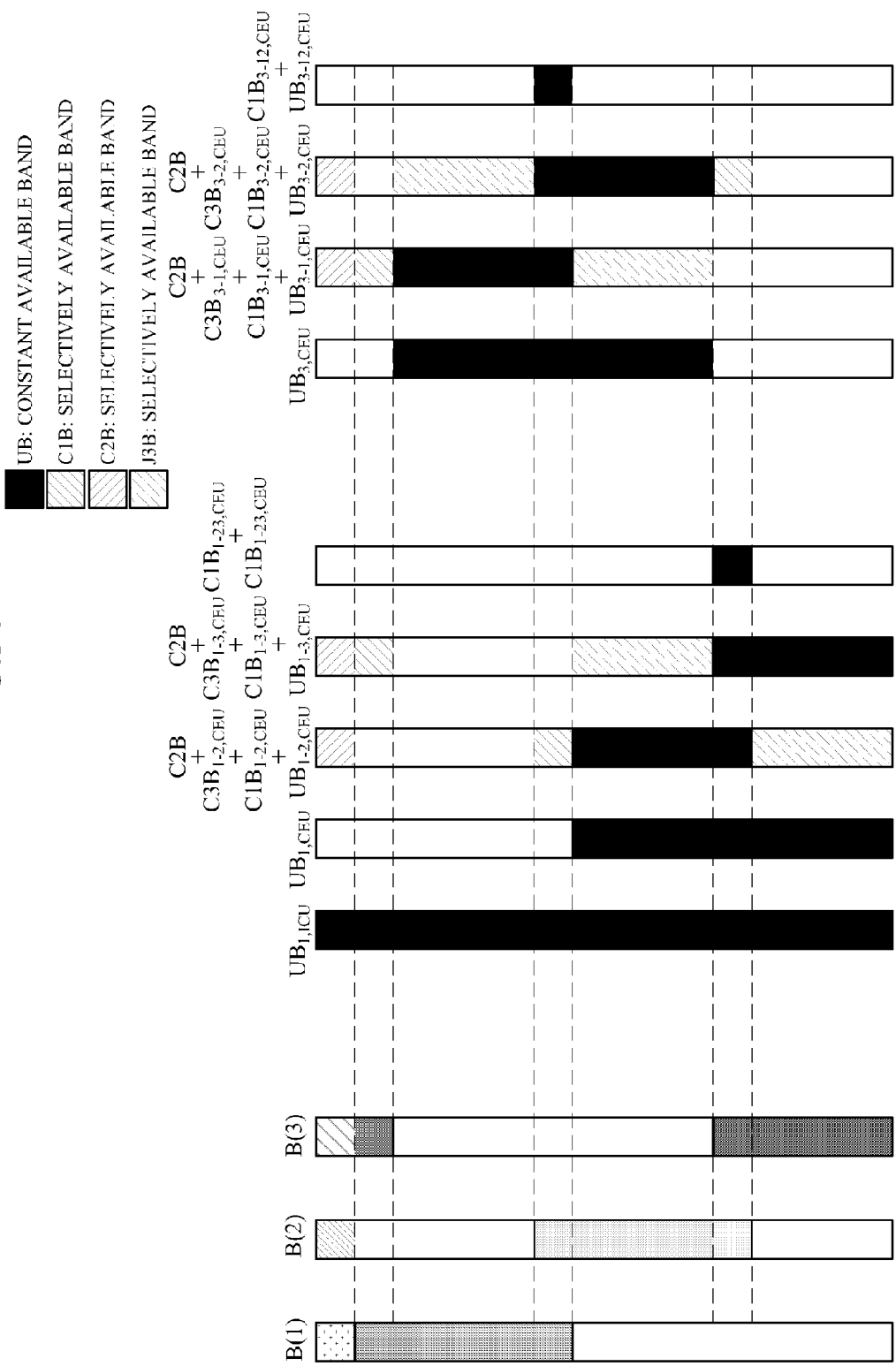
Figure 37:
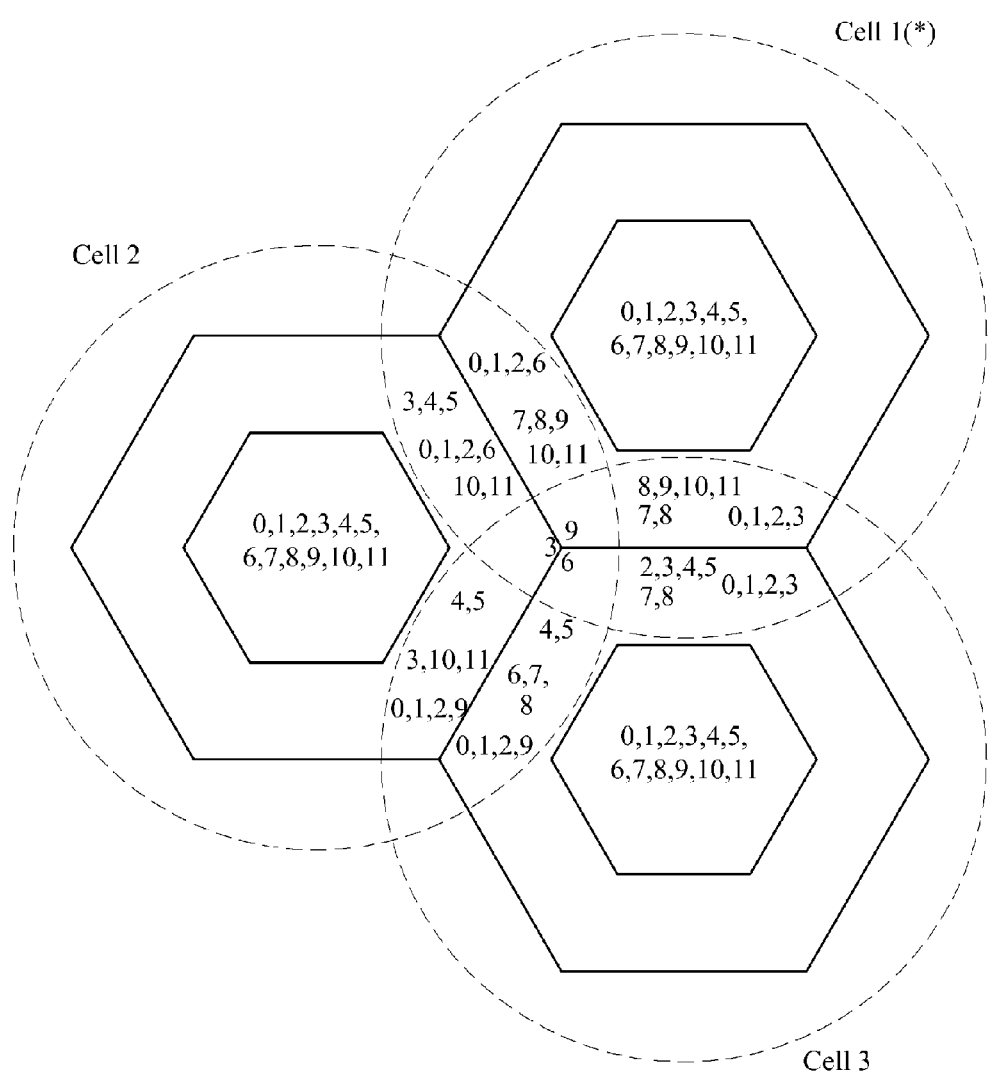

FIGS. 36 and 37 illustrate resources for the respective cells when JB bands are applied to the embodiment 1-6 in association with PRBs in FIG. 20.

In the current embodiment, JB band is additionally described, which can be selectively applied to the embodiment 1, and each case has been described the above, and thus the detailed description thereof will not be reiterated.

Embodiment 5

The current embodiment may be implemented by combining the embodiment 3 and the embodiment 4. That is, the embodiments 3-1 and 3-2 may be implemented the same as the above while JB bands are additionally allocated.

Figure 38:
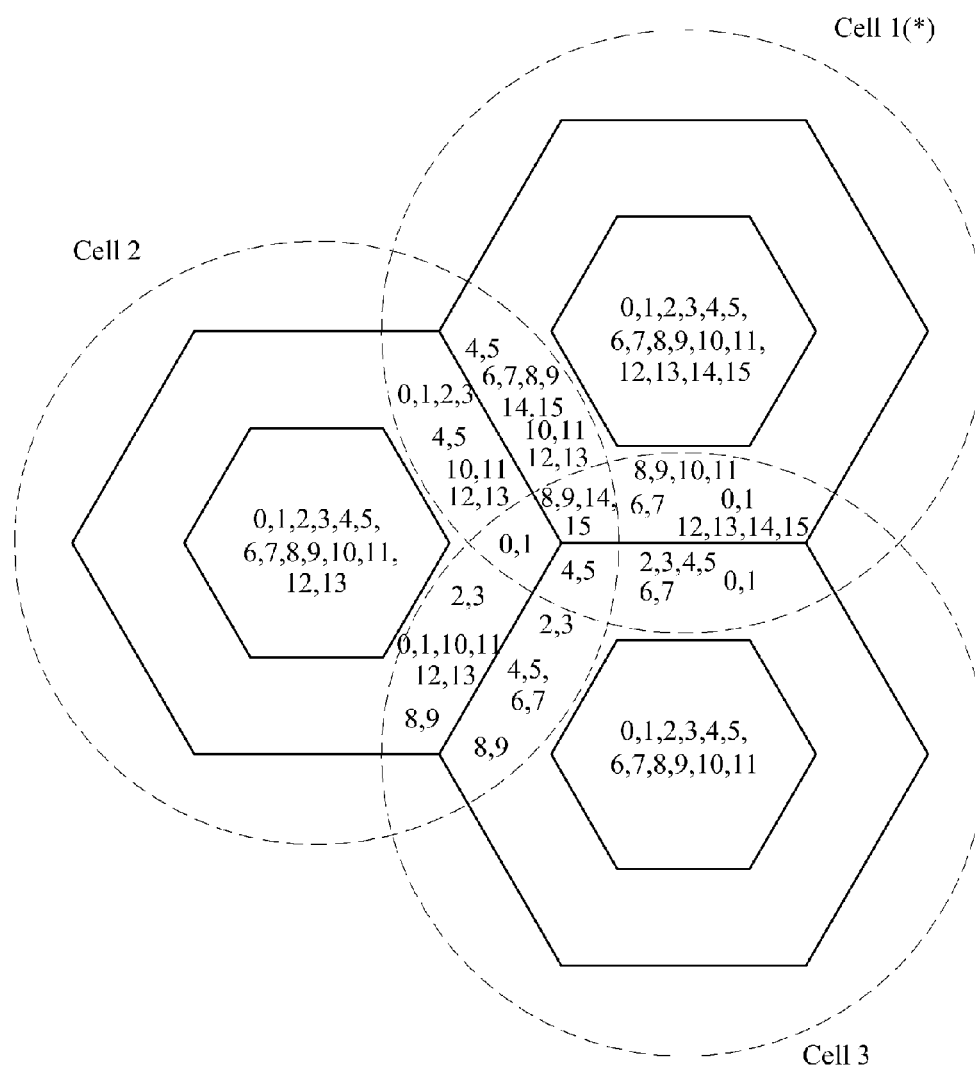
FIG. 38 illustrates available resource bands and interference characteristics for each region according to an exemplary embodiment 5.

For example, referring to FIG. 38, it is understood that even when the bands allocated to the respective cells are different from one another, the constant available bands and the selectively available bands for the respective cells can be allocated and interference characteristics of the respective bands can be determined.

Hitherto, various methods of dividing cells into a plurality of regions and allocating resources to each region and characteristics of the allocated resources have been described. As described above, such procedures may be performed by the obtaining unit 501 (see FIG. 5) which receives messages of type 1, type 2, type 3, and type 4, and the determining unit 502 (see FIG. 5) which allocates resources to each cell and assigns interference characteristic to each resource.

Although the interference characteristic itself is not described in detail in the above embodiment, the probability of interference occurrence with respect to each resource has been described and a variety of interference characteristics may be assigned to the resource according to the probability of interference occurrence.

In one example, a first interference characteristic is assigned to a resource which does not cause interference. A second interference characteristic is assigned to a resource which may have a relatively low probability of interference occurrence which can be avoided by power control. A third interference characteristic is assigned to a resource which may have a relatively high probability of interference occurrence which can be avoided by physical interference cancellation with a UE. A fourth interference characteristic is assigned to a resource which may have a relatively high probability of interference occurrence but can be exclusively used by use of an X2 message.

For example, referring to FIG. 12 again, PRBs allocated to $UE_{1\text{-}2,\ CEU}$ may be 0, 1, 2, 8, 9, and 10 according to the embodiment 1-2. Here, since 9 and 10 are not used by the cell 2 and the cell 3, they have very low probabilities of interference occurrence and thus the first interference characteristic may be assigned thereto. In addition, since the resource 8 is not used by the cell 2, its probability of interference occurrence with respect to the cell 2 is significantly low, and hence 8 may be assigned the first interference characteristic. Alternatively, 8 may have a higher probability of interference occurrence than 9 and 10, 8 can be assigned the second interference characteristic. In addition, for 0, 1, and 2 belonging to a common available band, they can be assigned the third interference characteristic when interference cancellation is possible, or can be assigned the fourth interference characteristic when the exclusive use of the resources is ensured by use of an X2 message.

As such, resource allocation scheduling and power control are performed according to resource for the respective cells and the interference characteristics for the respective cells.

For example, for a UE located at a given region, the controlling unit 503 (see FIG. 5) may resource allocation scheduling according to the interference characteristic assigned to a resource allocated to the corresponding region. In the above example, the resource 8 which has the first interference characteristic may be primarily allocated, and the resources 0, 1, and 2 which have the third or fourth interference characteristic may be allocated later.

Furthermore, in power control, the maximum power for each resource may be managed differently from one another according to the interference characteristic. For example, in the above example, the resource 8 may be managed with the maximum power, and the resources 9 and 10 may be managed with less power.

The resource allocation scheduling and the power control will be described in detail below.

Embodiment 6

There are mainly four types of interference characteristics. For example, in the above-described embodiments, PRBs allocated to the respective regions may be assigned the interference characteristics below according to the regions.

IFZ (Interference Free Zone): a first interference characteristic (no interference)

LIZ (Low Interference Zone): a second interference characteristic (interference is avoidable by use of appropriate power control)

ICZ (Interference Cancellation Zone): a third interference characteristic (a given UE is capable of interference cancellation in a corresponding region)

HIZ (High Interference Zone): a fourth interference characteristic (exclusive use of the resource is ensured by inter-cell exchange of X2 messages)

A table below shows bands available to and unused by CEU of an adjacent cell in view of ICE and CEU of a serving cell according to the above interference characteristics.

|  | Serving Cell - Inner | Serving Cell - Cell Edge |
|---|---|---|
| Band available to CEU of adjacent cell | IFZ or LIZ | IZ (ICZ or HIZ) |
| Band unused by CEU of adjacent cell | IFZ | IFZ or LIZ |

Based on the interference characteristics, transmission power control may be conducted according to a region where a UE is belonging, and as an example, the maximum transmission power may be controlled as below.

IFZ≥ICZ≥LIZ≥HIZ

The maximum transmission power may be limited by selecting a certain value from among predetermined values. For example, a threshold RZTPthreshold may be defined as below, and one of values may be selected for each zone. That is, as an example, IFZ may be set as +3, ICZ may be set as +1, LIZ may be set as −3, and HIZ may be set as −7.

RZTPthreshold={11, −10, −9, −8, −7, −6, −5, −4, −3, −2, −1, 0, +1, +2, +3}

To initialize the RZTPthreshold, there may be various methods. In one method, a central node itself initializes and transmits the RZTPthreshold to individual nodes. Then, later the individual nodes adjust the RZTPthreshold depending on the conditions of the respective nodes. Alternatively, one node adjusts the RZTPthreshold and then notifies the result to the neighboring nodes.

Embodiment 7

Referring to FIG. 6 again, when interference information is provided to L2 by use of D.RRM through CSAPL2 interface, L2 takes into consideration the matters below.

The degree of occurrence of interference in a particular resource region

Interference cancellation capability of a UE

Occurrence of an exclusive use of a particular resource region

In resource allocation scheduling, a weight may be assigned in order to control interference by use of cost function. For example, resource allocation band selection preference Weighted_CQI(i,j) may be defined as the Equation 31 below, and the resource allocation scheduling may be performed according to the Equation 31.

$$\text{Weighted\_CQI}(i,j) = \text{Weight\_1}(i) \times [CQI\_FBS(j) + \text{Weight\_2}(i)] \quad \text{Equation 31}$$

Here, CQI_FBS(j) denotes CQI value of a jth PRB, Weight_1($i$) denotes a band preference weight for an ith UE, and Weight_2($i$) denotes interference cancellation capability contribution for the ith UE.

The weights according to individual interference characteristics may be set as shown in a table below.

| Degree of probability of occurrence of interference | Interference cancellation capability of UE | Indication of exclusive use | Weight_1(i) | Weight_2(i) |
|---|---|---|---|---|
| IFZ | — |  | High | 0 |
| LIZ | — |  | Medium | 0 |
| IZ | ICZ | Off | Medium | Predetermined value |
|  |  | On (by serving cell) | High | Predetermined value |
|  |  | On (by serving cell) | 0 | Predetermined value |
|  | HIZ | Off | Low | 0 |
|  |  | On (by serving cell) | High | 0 |
|  |  | On (by serving cell) | 0 | 0 |

That is, since the interference characteristics reflect the probability of interference occurrence or the probability of interference cancellation, it is possible to schedule resource allocation to prevent interference.

For example, IFZ may be assigned if there is no interference, LIZ may be assigned if interference occurs with respect to one resource, and IZ may be assigned if interference occurs with respect to two or more resources. In specific, when a given UE is capable of interference cancellation for the corresponding resource, IZ may be recognized as ICZ, and otherwise recognized as HIZ. When an exclusive use of a resource is indicated, ICZ may be set as OFF, and otherwise set as ON. That is, a corresponding cell itself may request for an exclusive use of the resource, or the cell may receive a request for an exclusive use of the resource in ICZ from other cells. In addition, when an exclusive use of a resource is indicated, HIZ may be also set as OFF, and otherwise set as ON. That is, a corresponding cell itself may request for an exclusive use of the resource, or the cell may receive a request for an exclusive use of the resource in HIZ from other cells.

Once a location of the UE is determined, constant available bands and selectively available bands are decided according to the location of the UE, IFZ, LIZ, and IZ are determined based on the available bands, ICZ and HIZ are identified according to the capability of the UE, and an exclusive use status of a corresponding band is identified through signaling.

For remaining IFZ band, Weight_1($i$) may be set as high since IFZ band is generally allocated the first, and when there is no IFZ band but only LIZ band, LIZ band is to be normally allocated, and thus Weight_1($i$) may be set as medium. On the other hand, for IZ-ICZ, when an exclusive use is assigned to a corresponding cell itself, Weight_1($i$) may be set as high since IZ-ICZ band is allocated subsequent to IFZ, instead of LIZ. In the same manner, Weight_1($i$) may be set as high when the corresponding cell itself assigns the exclusive use with respect to IZ-HIZ.

A value of Weight_2($i$) may be predefined only for IZ-ICZ in consideration of system optimization, and Weight_2($i$) for IZ-HIZ is set to 0. The resource allocation scheduling may be performed as Equation 31 using the above Weight_1($i$) and Weight_2($i$).

Embodiment 8

When a UE located in a serving cell Cell_i is moved to one of adjacent cells Cell_j and Cell_k, a RSRP threshold is set according to a location and a direction of the UE, and the location of the UE can be detected using the RSRP threshold. For example, it can be determined based on the RSRP whether the UE is located in ICU of the Cell_i or is triggered from ICU to CEU.

Figure 39:
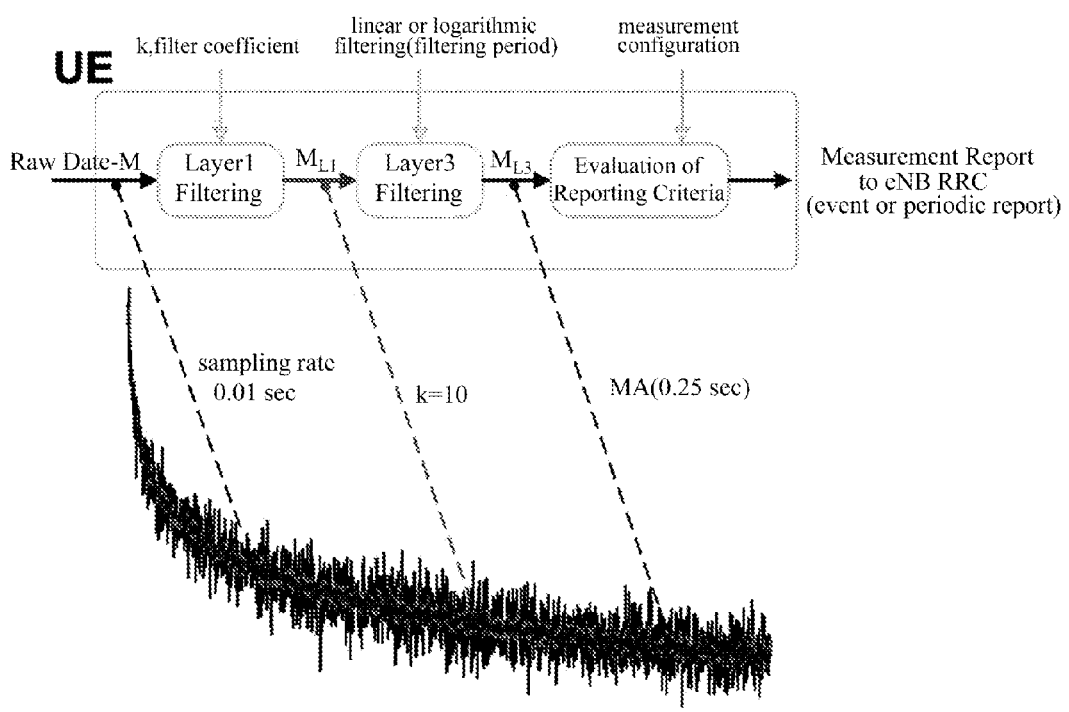
FIG. 39 illustrates a signal received by a base station to detect a location of a UE according to an exemplary embodiment.

Regions where a UE can be located are classified as below.
D1: ICU region of the serving cell Cell_i
D2: a region of CEU region of the serving cell Cell_i which is adjacent to the adjacent cell Cell_j
D3: a region of CEU region of the serving cell Cell_i which is adjacent to the adjacent cell Cell_k
D4: a region of CEU region of the serving cell Cell_i which is adjacent to both the adjacent cells Cell_j and Cell_k FIG. 39 illustrates raw data M of RSRP measured from a UE. In FIG. 39, layer 1 filtering is performed on the raw data M of the Cell_i, Cell_j, and Cell_k, and resultant filtered data ML1 may undergo layer 3 filtering or not. Furthermore, each RSRP of the Cell_i, the Cell_j, and the Cell_k may be reported to a node periodically or an event is defined according to the RSRP reference value (Thr1 or Thr2) and the event may be reported.

When a location of a UE is determined, scheduling may be indicated to use a particular resource at L2 level, or power control may be performed at L1 level.

FIG. 40 is a flowchart illustrating primary procedures for determining a location of a UE, which are executed by a UE or a base station.

Values (of a cell measured at a predetermined time interval may be processed as shown in FIG. 39, and when a finally measured value of a serving cell is denoted by Ms(i) and the Ms(i) is greater than Thr1 (i.e., RSRP reference value 1), it is determined that the UE is located at D1 region. If Ms(i) is smaller than Thr2 (i.e., RSRP reference value 2), the location of the UE is required to be identified whether it belongs to D2, D3, or D4. In specifying the location of the UE, on the assumption of that two largest measured values (i.e., RSRPs) are respectively defined as Mn(j) and Mn(k), if |Mn(j)-Mn(k)| is smaller than Thr2, the location is determined as belonging to D4, and otherwise the location is determined as belonging to D2 when the location is not determined as belonging to D1.

Embodiment 9

The reason of defining interference cancellation characteristics (ICZ) is that interference cancellation may not be conducted effectively in L1 of FIG. 6 when random interference takes place. Thus, if the probability of interference at the current position of the UE with respect to a particular frequency resource is reported to L1, an effective interference cancellation can be achieved.

In conclusion, to improve efficiency of interference cancellation, a physical channel design is required which enables voluntary control of interference occurrence characteristic and probability of interference occurrence based on framework of FIG. 1 and provides information of interference cancellation to the final L1 so that a corresponding receiver can facilitate effective design of interference cancellation. For example, PRBs selected on the assumption that the interference cancellation is possible and PRBs selected on the assumption that the interference cancellation is impossible may be designed to have different physical channel configurations.

In addition, when a particular cell wishes to exclusively use a resource corresponding to ICZ, only the particular cell is allowed to use a corresponding region exclusively, that is, only the particular cell uses the ICZ and the other cells do not use the ICZ. Alternatively, while the particular cell uses the corresponding region exclusively, performance improvement is sought by introducing network multi-input multi-output (MIMO). To realize network MIMO, a central node is required and three points of view may be considered as below.

One UE on a border of a cell utilizes all of ICZ of a current serving cell and ICZes of adjacent cells. The UE utilizes the ICZes of all adjacent cells to divide and transmit data so that transmission data rate can be improved using reception diversity.

One UE on a border of a cell utilizes all of ICZ of a current serving cell and ICZes of adjacent cells. The UE utilizes ICZ of all adjacent cells to multicast transmit the same data so that SNIR can be increased on the border of the cell through soft combining by reception diversity.

Control of ICZ is required by the central node for utilizing ICZ in inter-cell interference control as centralized node resource control is required by multicast coordination entity (MCE) for multi-media broadcast over a single frequency network (MBSFN).

Embodiment 10

The above-described embodiments relate to various schemes, in each of which cells are divided into a plurality of regions, constant available resources and selectively available resources are allocated to each of the regions and interference characteristic is assigned to each allocated resource so that resource allocation scheduling and power control can be performed according to the location of a UE and interference characteristics.

However, fixed operation of resources may cause the resources allocated to particular regions to be placed in inferior environment continuously. Thus, to prevent such condition, resources may be rotated. Specifically, a predetermined amount of resources allocated to the respective regions are rotated between regions on the borders of the cells or resources allocated to ICU and resources allocated to CEU are exchanged to obtain frequency diversity.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An inter-cell interference control apparatus comprising:
    an obtaining unit to obtain information about resources to be used by a serving cell and adjacent cells;
    a determining unit to divide the serving cell into one or more regions, allocate the resources to the respective regions and assign interference characteristics to the respective allocated resources, wherein three or more interference characteristics are assigned to the allocated resources;
    a controlling unit to perform resource allocation scheduling or resource power management using the allocated resources and the interference characteristics according to a location of a user equipment (UE) in the serving cell,
    wherein the regions include a central region and adjacent regions and the resources allocated to the adjacent regions include constantly allocated resources and selectively allocated resources, and
    wherein the constantly allocated resources include a common band of entire band, except for a prohibited band of the serving cell, and a prohibited band of each of the adjacent bands.

2. The inter-cell interference control apparatus of claim 1, wherein the information about the resources includes information about entire resources to be used by the serving cell and the adjacent cells and information about individually defined resources from among the entire resources.

3. The inter-cell interference control apparatus of claim 2, wherein the individually defined resources include at least one of a prohibited band, a common available band, and a common unused band.

4. The inter-cell interference control apparatus of claim 1, wherein the information about the resources is defined for individual sectors of each of the serving cell and the adjacent cells.

5. The inter-cell interference control apparatus of claim 1, wherein the constantly allocated resources include resources defined using some of the entire resources except for the individually defined resources.

6. The inter-cell interference control apparatus of claim 1, wherein the selectively allocated resources include resources defined using some of the entire resources except for the constantly allocated resources of the serving cell.

7. The inter-cell interference control apparatus of claim 1, wherein the interference characteristics include at least one of a first interference characteristic to be assigned to a resource that does not cause interference, a second interference characteristic to be assigned to a resource which may cause interference that can be avoided by power control, a third interference characteristic to be assigned to a resource which may cause interference that can be avoided by physical interference cancellation with a user equipment and a fourth interference characteristic to be assigned to a resource which may cause interference that can be avoided by exchanging messages with the other cells.

8. The inter-cell interference control apparatus of claim 1, wherein the resource allocation scheduling is performed using weights assigned to the respective resources and the weights are set differently from one another according to the interference characteristics.

9. The inter-cell interference control apparatus of claim 1, wherein the resource power management is performed using maximum power values assigned to the respective resources and the maximum power values are set differently from one another according to the interference characteristics.

10. An inter-cell interference control apparatus comprising:
    an obtaining unit to obtain information about resources to be used by a serving cell and adjacent cells;
    a determining unit to divide the serving cell into one or more regions, allocate the resources to the respective regions and assign interference characteristics to the respective allocated resources, wherein three or more interference characteristics are assigned to the allocated resources;
    a controlling unit to perform resource allocation scheduling or resource power management using the allocated resources and the interference characteristics according to a location of a user equipment (UE) in the serving cell,
    wherein the regions include a central region and adjacent regions and the resources allocated to and
    wherein the selectively allocated resources include at least a common band of the prohibited band of the serving cell and the prohibited band of the adjacent cell, a common available band of the serving cell and the adjacent cell, a common unused band of the serving cell and the adjacent cell, and a band defined for either the serving cell or the adjacent cell to use exclusively.

11. An inter-cell interference controlling method comprising:
    obtaining information about resources to be used by a serving cell and adjacent cells;
    dividing the serving cell into one or more regions, allocating the resources to the respective regions and assigning interference characteristics to the respective allocated resources, wherein three or more interference characteristics are assigned to the allocated resources;
    performing resource allocation scheduling and resource power management using the allocated resources and the interference characteristics according to a location of a user equipment (UE) in the serving cell,
    wherein the regions include a central region and adjacent regions and the resources allocated to the adjacent regions include constantly allocated resources and selectively allocated resources,
    wherein the constantly allocated resources include a common band of entire band, except for a prohibited band of the serving cell, and a prohibited band of each of the adjacent bands.

12. The inter-cell interference controlling method of claim 11, wherein the information about the resources includes information about entire resources to be used by the serving cell and the adjacent cells and information about individually defined resources from among the entire resources.

13. The inter-cell interference controlling method of claim 11, wherein the information about the resources is defined for individual sectors of each of the serving cell and the adjacent cells.

14. The inter-cell interference controlling method of claim 11, wherein the selectively allocated resources include resources defined some of the entire resources except for the constantly allocated resources of the serving cell.

15. The inter-cell interference controlling method of claim 11, wherein the interference characteristics include at least one of a first interference characteristic to be assigned to a resource that does not cause interference, a second interference characteristic to be assigned to a resource which may cause interference that can be avoided by power control, a third interference characteristic to be assigned to a resource which may cause interference that can be avoided by physical interference cancellation with a user equipment and a fourth interference characteristic to be assigned to a resource which may cause interference that can be avoided by exchanging messages with the other cells.

\* \* \* \* \*